US009416018B2

(12) United States Patent
Yoon et al.

(10) Patent No.: US 9,416,018 B2
(45) Date of Patent: Aug. 16, 2016

(54) METHOD OF PREPARING VANADOSILICATE MOLECULAR SIEVE AND NOVEL VANADOSILICATE MOLECULAR SIEVE

(75) Inventors: Kyung Byung Yoon, Seoul (KR); Shuvo Jit Datta, Seoul (KR); Mee Kyung Song, Seoul (KR)

(73) Assignee: ZEOEN CO., LTD, Seoul (KR)

( * ) Notice: Subject to any disclaimer, the term of this patent is extended or adjusted under 35 U.S.C. 154(b) by 971 days.

(21) Appl. No.: 13/639,543

(22) PCT Filed: Apr. 4, 2011

(86) PCT No.: PCT/KR2011/002323
§ 371 (c)(1),
(2), (4) Date: Nov. 6, 2012

(87) PCT Pub. No.: WO2011/126245
PCT Pub. Date: Oct. 13, 2011

(65) Prior Publication Data
US 2013/0048907 A1    Feb. 28, 2013

(30) Foreign Application Priority Data
Apr. 7, 2010   (KR) .................. 10-2010-0031999

(51) Int. Cl.
*C01B 39/08*    (2006.01)
*C01B 39/46*    (2006.01)
(Continued)

(52) U.S. Cl.
CPC ............... *C01B 39/46* (2013.01); *B01J 29/076* (2013.01); *B01J 29/78* (2013.01); *C01B 37/005* (2013.01); *C01B 39/08* (2013.01); *C01B 39/48* (2013.01); *B01J 2229/183* (2013.01)

(58) Field of Classification Search
CPC ........ C01B 39/46; C01B 39/48; C01B 39/08; C01B 37/005; B01J 29/076; B01J 29/08; B01J 29/78
See application file for complete search history.

(56) References Cited

U.S. PATENT DOCUMENTS 5,208,006 A * 5/1993 Kuznicki ................. B01J 29/89
208/119
5,244,650 A * 9/1993 Kuznicki ................. B01J 29/89
423/713

(Continued)

FOREIGN PATENT DOCUMENTS

CN    101309752    11/2008
JP    2008-502571    1/2008

(Continued)

OTHER PUBLICATIONS

Guo et al, Structure and Basicioty of Microporous Titanosilicate ETS-10 and Vanadium-Containing ETS-10, Journal of Physical Chemistry C, Jul. 2012, pp. 17124-17133.*

(Continued)

*Primary Examiner* — David M Brunsman
(74) *Attorney, Agent, or Firm* — Brundidge & Stanger, P.C.

(57) ABSTRACT

The present disclosure relates to a novel method of preparing a vanadosilicate molecular sieve, and a vanadosilicate molecular sieve and their derivatives prepared by the same method. The preparing method of a vanadosilicate molecular sieve includes forming a vanadosilicate molecular sieve by a hydrothermal reaction of a reaction mixture containing a silicon source, a base, a $V^{5+}$-containing compound as a vanadium source, a reducing agent, a salt and water.

19 Claims, 56 Drawing Sheets

(51) Int. Cl.
*C01B 39/48* (2006.01)
*B01J 29/076* (2006.01)
*B01J 29/78* (2006.01)
*C01B 37/00* (2006.01)

(56) References Cited

U.S. PATENT DOCUMENTS

| | | | | |
|---|---|---|---|---|
| 6,413,902 | B1 * | 7/2002 | Pinnavaia | B01J 21/04 |
| | | | | 423/326 |
| 7,288,237 | B2 * | 10/2007 | Le-Khac | B01J 23/38 |
| | | | | 423/326 |
| 8,017,825 | B2 * | 9/2011 | Kuznicki | B01D 53/02 |
| | | | | 208/310 Z |
| 2007/0112208 | A1 | 5/2007 | Le-Khac | |
| 2011/0316012 | A1 * | 12/2011 | Hente | H01L 27/3204 |
| | | | | 257/88 |

FOREIGN PATENT DOCUMENTS

| | | |
|---|---|---|
| JP | 2009-515809 | 4/2009 |
| JP | 2011-513170 | 4/2011 |
| TW | 469171 | 12/2001 |
| TW | 200740696 | 11/2007 |

OTHER PUBLICATIONS

Lin et al, Synthesis and characterisation of titanosilicate ETS-10 membranes, Microporous and Mesoporous Materails 67 (2004), pp. 79-86.*

European Search Report for European Application No. 11766096.9 mailed Jun. 1, 2015.

Datta, et al. "A Novel Vanadosilicate with Hexadeca-Coordinated Cs Ions as a Highly Effective Cs Remover", Angewandte Chemie International Edition, vol. 53, No. 28, Jul. 7, 2014, pp. 7203-7208.

Wang, et al. "The Novel Open-Framework Vanadium Silicates K2(VO)Si4O10).H2O(VSH-1) and Cs2(VO)(Si6O14).3H2O(VSH-2)", Angewandte Chemie International Edition, vol. 40, No. 11, Jun. 1, 2001, pp. 2174-2176.

International Search Report for PCT/KR2011/002323 mailed Dec. 7, 2011.

Xianji Guo et al., One-step synthesis and structural characterization of mesoporous vanadosilicates and super-microporous vanadosilicates. Microporous and Mesoporous Materials. 2007, vol. 106, pp. 246-255.

F.Farzaneh et al., Hydrothermal synthesis and characterization of vanadium silicate molecular sieves with analcime, magediite and ZSM-11 structure. Journal of Sciences, Islamic Republic of Iran. 2002, vol. 13, No. 3, pp. 225-235.

Xiqu Wang et al., Open-framework and microporous vanadium silicate. J. Am. Chem. Soc. 2002, vol. 124, pp. 7812-7820.

Mariam N. Ismail et al., First unseeded hydrothermal synthesis of microporous vanadosilicate AM-6, Microporous and Mesoporous Materials. 2009, vol. 120, pp. 454-459.

Japanese Office Action for Japanese Application No. 2013-503662 mailed on Jan. 6, 2014.

Akira Miyamoto et al., Vanadosilicate Catalysts Prepared From Different Vanadium Sources and Their Characteristics in Methanol to Hydrocarbon Conversion, Applied Catalysis, 1986, pp. 89-103, vol. 28, Elsevier Science Publishers B.V., Amsterdam.

Taiwanese Office Action for Taiwanese Patent No. 100110962 mailed on Jan. 14, 2014.

* cited by examiner

METHOD OF PREPARING VANADOSILICATE MOLECULAR SIEVE AND NOVEL VANADOSILICATE MOLECULAR SIEVE

TECHNICAL FIELD

The present disclosure relates to a novel method of preparing a vanadosilicate molecular sieve, and a vanadosilicate molecular sieve and its derivatives prepared by the same method.

BACKGROUND ART

The synthesis and characterization of one-dimensional (1D) semiconductor quantum-confined materials are important since they have great potential to be used as building blocks for nanoscale electronic devices and other novel applications (see Reference Documents 1-9). Among the known 1D semiconductor materials, molecular wires or quantum wires (see Reference Documents 1-5) are the thinnest 1D quantum-confined materials. However, examples of such quantum wires are rare. Recently, the present inventors have elucidated the interesting quantum confinement properties of the titanate ($TiO_3^{2-}$) quantum wires (see Reference Document 10) which are regularly placed within a titanosilicate molecular sieve called ETS-10. It shows a length-dependent quantum confinement effect even at length scales longer than 50 nm (see Reference Documents 10-13). Its estimated effective reduced mass ($\mu_z$) of exciton along the quantum wire was smaller than 0.0006 $m_e$ ($m_e$=rest mass of electron), which are much smaller than the reported smallest values (InSb: 0.014 $m_e$, single-walled carbon nanotube: 0.019 $m_e$) indicating much higher exciton mobility along the titanate quantum wire than those of InSb (0.014 $m_e$) and single-walled carbon nanotube (0.019 $m_e$). The nature of electronic absorption of the titanate quantum wire was oxide-to-$Ti^{IV}$ charge transfer, or ligand-to-metal charge transfer (LMCT)(see Reference Documents 14-16). The stretching frequency of the titanate quantum wire increases as the electron density of the wire increases (see Reference Document 14).

After elucidation of such important properties of the titanate quantum wire, it will be exciting if one could elucidate the physicochemical properties of the closely related vanadate ($VO_3^{2-}$) quantum wire. In that sense, the discovery of a vanadosilicate AM-6 by Rocha, Anderson, and coworkers in 1997 [hereinafter, referred to as "AM-6-(RA)"] was a very important event since its structure adopts that of ETS-10 with vanadate ($VO_3^{2-}$) quantum wires replacing titanate ($TiO_3^{2-}$) quantum wires (see Reference Document 17). However, they had to use ETS-10 crystals as seeds in order to induce ETS-10 structure onto the vanadosilicate. Accordingly, AM-6-(RA) inevitably contains ETS-10 crystals within AM-6. In this respect, AM-6-(RA) should more strictly be defined as ETS-10 core/AM-6 shell. Furthermore, Lobo, Doren, and coworkers revealed that $VO_3^{2-}$ quantum wires in AM-6-(RA) are composed of both a $V^{4+}$ and a $V^{5+}$ (see Reference Documents 18-20). As a result, it is intrinsically unable to elucidate the physicochemical properties of the pure $V^{IV}O_3^{2-}$ quantum wire. Furthermore, their procedure always simultaneously produces substantial amounts of quartz. In this sense, the methods to prepare ETS-10-free, pure AM-6 have long been awaited.

Twelve years after the report of AM-6-(RA), Sacco, Jr., and the coworkers finally developed a method of synthesizing ETS-10-free, pure AM-6 (see Reference Document 21). However, the Sacco, Jr.'s group had to use tetramethylammonium ion ($TMA^+$) as the structure directing agent. Accordingly, this AM-6 contains $TMA^+$ ions within the channels. Herein, the AM-will be referred to as "AM-6-(S)-TMA". The present inventors found that AM-6-(S)-TMA also contains both a $V^{4+}$ and a $V^{5+}$ (see below). Furthermore, the $TMA^+$ ions are tightly encapsulated within the channels and hence completely block the silica channels. As a result, even the ion exchange of other pristine cations ($Na^+$ and $K^+$) with other cations is very difficult (see below), rendering them impossible to study the important physicochemical properties of the pure $V^{IV}O_3^{2-}$ quantum wire or the pure $V^{IV}$ vanadosilicate molecular sieve. The Sacco, Jr.'s group removed the $TMA^+$ ions by treating AM-6-(S)-TMA with $NH_3$ gas for about 3 to 4 hours at about 350° C. to 400° C. This harsh condition destroys all the vanadate ($VO_3^{2-}$) quantum wires since they are not stable at temperatures higher than about 180° C. under vacuum (see below). Hereinafter, the $NH_3$-treated AM-6-(S)-TMA will be referred to as "AM-6-(S)—$NH_3$".

Thus, there have been no methods to synthesize an ideal $V^{IV}$ vanadosilicate AM-6 having well preserved $V^{IV}O_3^{2-}$ quantum wires and free from ETS-10 core and channel-blocking $TMA^+$ cations. Furthermore, the reaction periods for the synthesis of AM-6-(RA) and AM-6-(S)-TMA are usually three days or longer, and vanadyl sulfate ($VOSO_4$) has been used as the vanadium source, which is significantly (>5 times) more expensive than vanadium pentoxide ($V_2O_5$). Therefore, the development of rapid and inexpensive synthetic methods to produce an ideal $V^{IV}$ AM-6 vanadosilicate will be an important contribution to the nano and nanoporous materials science as well as to catalysis.

Many theses and patent documents have been referred to and indicated as references through the whole specification. The disclosures of the theses and patent documents referred to are incorporated herein to more clearly explain standards of the technical field pertinent to the present disclosure and the content of the present disclosure.

DISCLOSURE OF THE INVENTION

Problems to be Solved by the Invention

The present inventors studied to develop a rapid and inexpensive synthetic method of producing a vanadosilicate. As a result, the present inventors found that it is possible to rapidly and inexpensively prepare a vanadosilicate by a method in which a $V^{5+}$-containing compound is used as a vanadium source and the $V^{5+}$-containing compound is reduced to $V^{4+}$ using a reducing agent without using seeds and templates, and completed the present disclosure.

Thus, the present disclosure provides a novel method of preparing a vanadosilicate molecular sieve and a vanadosilicate molecular sieve and its derivatives prepared by the same method, and the present disclosure also provides novel a vanadosilicate molecular sieve and its derivatives.

Problems to be solved by the present disclosure are not limited to the above descriptions, and other problems would be understood by those skilled in the art from the below descriptions.

Means for Solving the Problems

In accordance with an aspect of the present disclosure, there is provided a preparing method of a vanadosilicate molecular sieve, including: forming a vanadosilicate molecular sieve by making a hydrothermal reaction in a reaction mixture containing a silicon source, a base, a $V^{5+}$-containing compound as a vanadium source, a reducing agent, a salt and water.

In accordance with another aspect of the present disclosure, there is provided a vanadosilicate molecular sieve prepared by the above-described method in accordance with the present disclosure, wherein the vanadosilicate molecular sieve having a structure in which a $SiO_4$ tetrahedron is connected with a $VO_6$ octahedron and not substantially containing a $V^{5+}$ ion.

In accordance with still another aspect of the present disclosure, there is provided a vanadosilicate molecular sieve, which is obtained by oxidizing a $V^{4+}$ ion in the vanadosilicate molecular sieve prepared by the method in accordance with the present disclosure to a $V^{5+}$ ion.

In accordance with still another aspect of the present disclosure, there is provided a vanadosilicate molecular sieve that have a composition represented by the following formula 1, have a structure in which a $SiO_4$ tetrahedron is connected with a $VO_6$ octahedron, and a powder X-ray diffraction pattern including one or more peaks at a diffraction angle (2θ) in a range of from about 5° to about 10°:

$A_r[(VO)_s(Si_nO_{2n+2})]\cdot tH_2O$;  [Formula 1]

wherein, in the formula 1, A denotes an univalent or a bivalent metal cation selected from a group consisting of an alkali metal, an alkali earth metal and a combination thereof, and r is between about 0.5 to about 3, s is between about 0.5 to about 2, n is between about 1 to about 6, and t is between about 0.1 to about 2.

In accordance with still another aspect of the present disclosure, there are provided a vanadosilicate molecular sieve obtained by oxidizing a $V^{4+}$ ion within the vanadosilicate molecular sieve represented by the formula 1 to a $V^{5+}$ ion.

Effect of the Invention

In accordance with the present disclosure, it is possible to rapidly and cheaply synthesize a pure vanadosilicate molecular sieve using a $V^{5+}$-containing compound as a vanadium source without using seeds and templates. Further, since a treatment with $NH_3$ is not needed, it is possible to preserve $V^{IV}O_3^{2-}$ quantum wire within the prepared a vanadosilicate molecular sieve, possible to prepare a pure vanadosilicate molecular sieve having all V atoms in +4 oxidation state, and also possible to synthesize a vanadosilicate molecular sieve having AM-6 and various novel structures. Thus, it is possible to study important physicochemical properties of the vanadosilicate molecular sieve prepared by the method of the present disclosure, or the pure $V^{IV}O_3^{2-}$ quantum wire within the vanadosilicate molecular sieve. Furthermore, the vanadosilicate molecular sieve of the present disclosure including the pure $V^{IV}O_3^{2-}$ quantum wire can be applied to various technical fields such as electronic devices, nano devices, catalysts, nano materials, and nanoporous materials.

BEST MODE FOR CARRYING OUT THE INVENTION

Figure 1A:
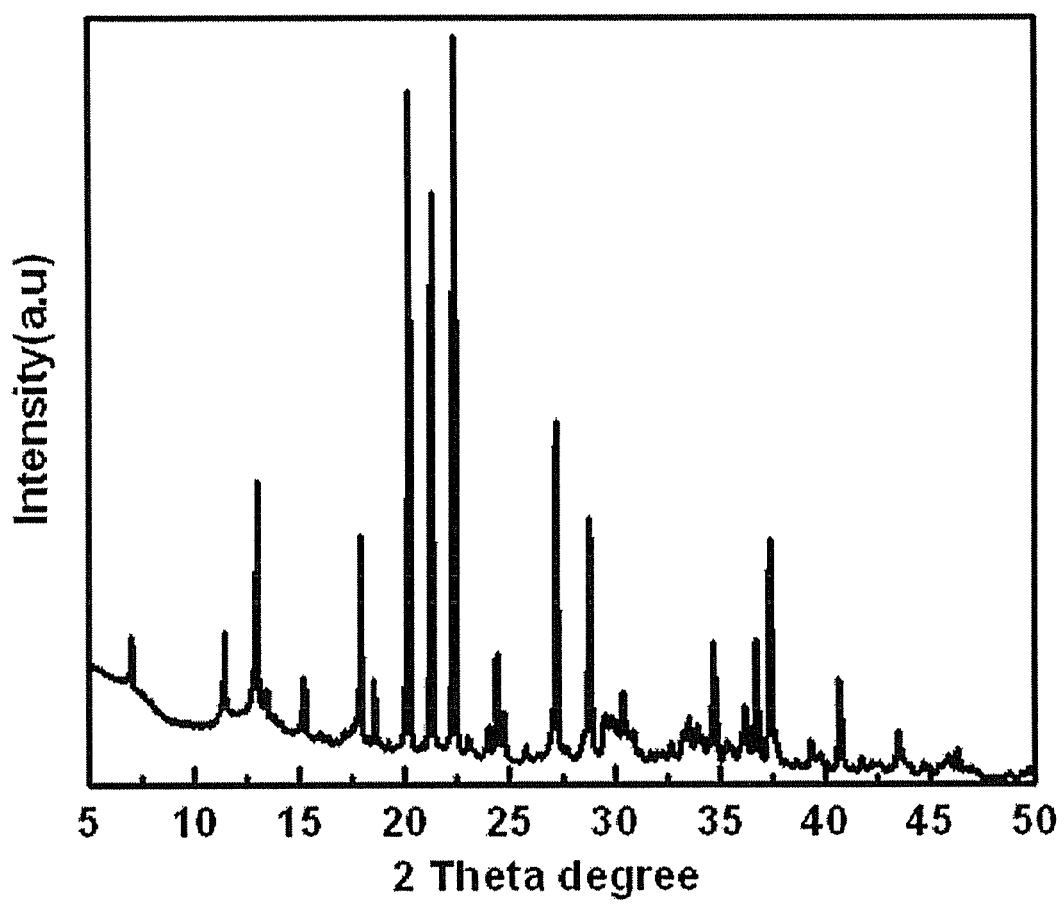
FIGS. 1A to 1C provide (A) powder X-ray diffraction spectrum, (B) IR spectrum and (C) SEM image of a vanadosilicate molecular sieve SVS-1 in accordance with an example of the present disclosure.

Hereinafter, embodiments and examples of the present invention will be described in detail with reference to the accompanying drawings in order for those skilled in the pertinent art to easily implement it.

However, it is to be noted that the present disclosure is not limited to the embodiments and the examples but can be implemented in various other ways.

Through the whole specification, the term "comprises or includes" and/or "comprising or including" used in the document means that one or more other components, steps, operation and/or existence or addition of elements are not excluded from the described components, steps, operation and/or elements but further included unless stated otherwise. The terms "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party. Further, through the whole specification, the term "step in" or "step of" does not mean "step for".

Through the whole specification, the term "alkyl", alone or in combination, denotes a linear or branched radical containing from 1 to about 22 carbon atoms or from 1 to about 20 carbon atoms or from 1 to about 10 carbon atoms or from 1 to about 6 carbon atoms if used alone or in combination with "alkoxy", "arylalkyl", "haloalkyl" and "alkylamino" unless stated otherwise. Any one or more carbon atoms of about 1 to about 22 carbon atoms or 1 to about 20 carbon atoms or 1 to about 10 carbon atoms or 1 to about 6 carbon atoms or an alkyl group may be substituted with a substituent. By way of example, the alkyl group may include, but is not limited to, methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, and isomers thereof.

Through the whole specification, the term "alkenyl", alone or in combination, denotes a straight-chain, branched-chain or cyclic hydrocarbon radical containing from 2 to about 12 carbon atoms or from 2 to about 20 carbon atoms or from 2 to about 10 carbon atoms or from 2 to about 6 carbon atoms and having at least one carbon-carbon double bond. An alkenyl group may be substituted at any available attachment point. By way of example, the alkenyl radical may include, but is not limited to, ethenyl, propenyl, allyl, butenyl and 4-methylbutenyl, pentenyl, hexenyl, isohexenyl, heptenyl, 4,4-dimethylpentenyl, octenyl, 2,2,4-trimethylpentenyl, nonenyl, decenyl, and isomers thereof. The terms "alkenyl" and "low-level alkenyl" include radicals having "cis" and "trans" orientations or alternatively, "E" and orientations.

Through the whole specification, the term "alkynyl", alone or in combination, denotes a straight-chain, branched-chain or cyclic hydrocarbon radical containing from 2 to about 12 carbon atoms or from 2 to about 20 carbon atoms or from 2 to about 10 carbon atoms or from 2 to about 6 carbon atoms and having at least one carbon-carbon triple bond. An alkynyl group may be substituted at any available attachment point. By way of example, the radical may include, but is not limited to, ethynyl, propynyl, butynyl, 4-methylbutynyl, pentynyl, hexynyl, isohexynyl, heptynyl, 4,4-dimethylpentynyl, octynyl, 2,2,4-trimethylpentynyl, nonynyl, decynyl, and isomers thereof. By way example, amino or alkylamino mentioned with respect to the alkyl group may be used as representative substituents for the alkynyl group.

Through the whole specification, the term "alkoxy" or "alkylthio", alone or in combination, denotes an alkyl group which is linked by an oxygen (—O—) or sulfur (—S—) atom, respectively.

Through the whole specification, the term "arylalkyl [aralkyl]", alone or in combination, includes an aromatic ring bonded by an alkyl group as described above, i.e., an aryl-substituted alkyl radical. Desirably, an arylalkyl radical may have an aryl radical attached to an alkyl radical containing from 1 to 6 carbon atoms. By way of example, the arylalkyl radical may include, but is not limited to, benzyl, biphenylmethyl, naphthyl and phenylethyl.

Through the whole specification, the term "aryl", alone or in combination, may include a bonded group such as naphtyl, phenanthrenyl, indenyl, tetrahydronaphtyl and indanyl as well as a monocyclic or non-cyclic aromatic ring such as phenyl and substituted phenyl. Therefore, an aryl group has one or more rings containing 6 or more carbon atoms, and the aryl group may have 5 or less rings containing 22 or less atoms and may have alternating (resonating) double bonds between adjacent carbon atoms or suitable hetero atoms. The aryl group may be randomly substituted with, but not limited to, one or more groups including halogen such as F, Br, Cl or I, alkyl such as methyl, ethyl or propyl, alkoxy such as methoxy, ethoxy, hydrorxy, carboxy, carbamoyl, alkyloxycarbonyl, nitro, alkenyloxy, trifluoromethyl, amino, cycloalkyl, aryl, heteroaryl, cyano, alkyl $S(O)_m$ (m=0, 1, 2) or thiol. Desirably, aryl is randomly substituted phenyl.

Through the whole specification, the term "amino", alone or in combination, denotes —$NH_2$. "Amino" may be randomly substituted with one or two identical or different substitutents such as alkyl, aryl, arylalkyl, alkenyl, alkynyl, heteroaryl, heteroarylalkyl, cycloheteroalkyl, cycloheteroalkylalkyl, cycloalkyl, cycloalkylalkyl, haloalkyl, hydroxyalkyl, alkoxyalkyl, thioalkyl, carbonyl or carboxyl. Such substituents may be further substituted with carboxylic acid and alkyl or aryl substituent described above. In some embodiments, an amino group may be substituted with carboxyl or carbonyl to form N-acyl or N-carbamoyl derivatives.

Through the whole specification, the term "cycloalkyl", alone or in combination, denotes a totally saturated or partially unsaturated hydrocarbon ring of 3 to about 20 carbon atoms or 3 to about 9 carbon atoms or 3 to about 7 carbon atoms. Further, cycloalkyl may be substituted. The substituted cycloalkyl denotes a ring having one, two or three substituents selected from a group consisting of halo, alkyl, substituted alkyl, alkenyl, alkynyl, nitro, cyano, oxo(=O), hydroxyl, alkoxy, thioalkyl, —$CO_2H$, —C(=O)H, $CO_2$-alkyl, —C(=O)alkyl, keto, =N—OH, =N—O-alkyl, aryl, heteroaryl, heterocyclo, 5 or 6-one ketal (for example, 1,3-dioxolane or 1,3-dioxane), —NR'R", —C(=O)NR'R", —$CO_2$NR'R", —C(=O)NR'R", —NR'$CO_2$R", —NR'C(=O)R", —$SO_2$NR'R" and —NR'$SO_2$R" (here, each of R' and R" is independently selected from hydrogen, alkyl, substituted alkyl and cycloalkyl or R' and R" form a heterocyclo or heteroaryl ring together).

Through the whole specification, the term "halogen" or "halo" denotes chlorine, bromine, fluorine or iodine selected on an independent basis.

Through the whole specification, the term "cycloalkenyl" may include a carbocyclic group having one or more carbon-carbon double bonds. A cycloalkenyl group may include $C_3$ to $C_{20}$ rings, $C_3$ to $C_9$ rings or $C_3$ to $C_6$ rings. By way of example, the cycloalkenyl group may include, but is not limited to, cyclopropenyl, cyclobutenyl, cyclopentenyl, cyclopentadienyl, cyclohexenyl, cycloheptenyl and cycloheptadienyl.

Through the whole specification, the term "cycloalkynyl" may include a carbocyclic group having one or more carbon-carbon triple bonds. A cycloalkynyl group may include $C_3$ to $C_{20}$ rings, $C_3$ to $C_9$ rings or $C_3$ to $C_6$ rings, for example, but not limited to, cyclopropynyl, cyclobutynyl, cyclopentynyl, cyclohexynyl and cycloheptynyl.

Through the whole specification, the term "alkali metal" denotes Na, K, Rb, Cs, Fr or the like, and the term "alkali earth metal" denotes Be, Mg, Ca, Sr, Ba, Ra or the like.

Hereinafter, there will be explained a novel method of preparing a vanadosilicate molecular sieve, a vanadosilicate molecular sieve and its derivatives prepared by the same method, and a novel vanadosilicate molecular sieve and its derivatives in detail with reference to embodiments, examples and accompanying drawings. However, the present disclosure is not limited to such embodiments, examples and drawings.

In accordance with an aspect of the present disclosure, a preparing method of a vanadosilicate molecular sieve includes forming a vanadosilicate molecular sieve by making a hydrothermal reaction in a reaction mixture containing a silicon source, a base, a $V^{5+}$-containing compound as a vanadium source, a reducing agent, a salt and water.

In accordance with the method of preparing a vanadosilicate molecular sieve, pure vanadosilicate molecular sieve can be prepared rapidly at low cost. To be specific, in the method of preparing a vanadosilicate molecular sieve, it is possible to rapidly and inexpensively prepare a pure vanadosilicate sieve by using inexpensive $V^{5+}$-containing compound as a vanadium source and reducing the $V^{5+}$-containing compound to $V^{4+}$ without using a seed and a template.

When the reaction mixture containing the silicon source, the base, the $V^{5+}$-containing compound as a vanadium source, the reducing agent, the salt and the water is prepared, each of these components may be mixed with each other simultaneously or sequentially, if necessary, under, but not limited to, heating, cooling, reflux and/or vacuum condition.

In the embodiment, $V^{5+}$ contained in the $V^{5+}$-containing compound as a vanadium source may be reduced to $V^{4+}$ with the reducing agent, and thus, the vanadosilicate sieve prepared by the above-described method may be, but not limited to, a pure $V^{IV}$ vanadosilicate molecular sieve which does not substantially contain a $V^{5+}$ ion.

In the embodiment, the reducing agent includes, but is not limited to, an organic reducing agent, an inorganic reducing agent or a combination thereof.

In the embodiment, the organic reducing agent includes, but is not limited to, one or more organic reducing agents having a functional group selected from a group consisting of a carboxyl group, a hydroxyl group, an aldehyde group, an amine group, a sulfite group, a bisulfite group, a carbonate group, a bicarbonate group, a phosphorous acid group, a hypophosphorous acid group, a thiol group, a cyan group, a thiocyan group, an ammonium group, a hydrazinyl group, a borohydride group, an amide group, a silane group, a amino group, a carbamoyl group, an urea group and combinations thereof.

In the embodiment, the organic reducing agent is selected from a group consisting of, but not limited to, an carboxylic acid having about 1 to about 20 carbon atoms and its derivatives, a dicarboxylic acid having about 1 to about 20 carbon atoms and its derivatives, a polycarboxylic acid having about 1 to about 20 carbon atoms and its derivatives, an amino acid having about 1 to about 20 carbon atoms and its derivatives, univalent or polyvalent alcohol having about 1 to about 20 carbon atoms, an aldehyde-based compound having about 1 to about 20 carbon atoms and its derivatives, an carbamoyl acid having about 1 to about 20 carbon atoms and its derivatives, an amino acid and its derivatives, a boric acid, a boran-based compound, a hydrazine-based compound, a silane-based compound, a hydroxylacton-based compound, a hydroquinone-based compound, an ammonium salt of an organic acid, a carbonate-based compound, an amide-based compound, an amine-based compound, a hydroxylamine-based compound, ammonia and a precursor of ammonia, urea and a precursor of urea, a hydrolysate of urea and combinations thereof.

In the embodiment, the organic reducing agent includes a compound represented by the following chemical formula 1 or 2, but not limited thereto:

  [Chemical formula 1]

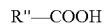  [Chemical formula 2]

wherein, in the chemical formulas 1 and 2, R and R' independently include hydrogen; or a linear or branched alkyl group having about 1 to about 20 carbon atoms, a linear or branched alkenyl group having about 1 to about 20 carbon atoms, a linear or branched alkynyl group having about 1 to about 20 carbon atoms, a cycloalkyl group having about 3 to about 20 carbon atoms, a cycloalkenyl group having about 3 to about 20 carbon atoms, a cycloalkynyl group having about 3 to about 20 carbon atoms, a linear or branched alkoxy group having about 1 to about 20 carbon atoms, an amine group, an aryl group or aralkyl group having about 6 to about 20 carbon atoms, a carboxyl group, a hydroxyl group, an aldehyde group, a sulfite group, a bisulfite group, a carbonate group, a bicarbonate group, a phosphorous acid group, a hypophosphorous acid group, a thiol group, a cyan group, a thiocyan group, an ammonium group, a hydrazinyl group, a borohydride group, an amide group, a silane group, an amino group, a carbamoyl group or an urea group containing one or more substituents selected from the following group A:

[Group A]

A substituent group consisting of a linear or branched alkyl group having about 1 to about 20 carbon atoms, a linear or branched alkenyl group having about 1 to about 20 carbon atoms, a cycloalkyl group having about 3 to about 20 carbon atoms, a cycloalkenyl group having about 3 to about 20 carbon atoms, a cycloalkynyl group having about 3 to about 20 carbon atoms, a linear or branched alkynyl group having about 1 to about 20 carbon atoms, a linear or branched alkoxy group having about 1 to about 20 carbon atoms, an aryl group or aralkyl group having about 6 to about 20 carbon atoms, a carboxyl group, a hydroxyl group, an aldehyde group, an amine group, a sulfite group, a bisulfite group, a carbonate group, a bicarbonate group, a phosphorous acid group, a hypophosphorous acid group, a thiol group, a cyan group, a thiocyan group, an ammonium group, a hydrazinyl group, a borohydride group, an amide group, a silane group, an amino group, a carbamoyl group and an urea group.

In the embodiment, the organic reducing agent include a compound represented by the following chemical formula 3, but not limited thereto:

$$R''-OH \qquad \text{[Chemical formula 3]}$$

wherein, in the chemical formula 3, R" includes a linear or branched alkyl group having about 1 to about 20 carbon atoms, a linear or branched alkenyl group having about 1 to about 20 carbon atoms, a linear or branched alkynyl group having about 1 to about 20 carbon atoms, a cycloalkyl group having about 3 to about 20 carbon atoms, a cycloalkenyl group having about 3 to about 20 carbon atoms, a cycloalkynyl group having about 3 to about 20 carbon atoms, a linear or branched alkoxy group having about 1 to about 20 carbon atoms, an amine group, an aryl group or an aralkyl group having about 6 to about 20 carbon atoms, a carboxyl group, a hydroxyl group, an aldehyde group, a sulfite group, a bisulfite group, a carbonate group, a bicarbonate group, a phosphorous acid group, a hypophosphorous acid group, a thiol group, a cyan group, a thiocyan group, an ammonium group, a hydrazinyl group, a borohydride group, an amide group, a silane group, a amino group, a carbamoyl group or an urea group containing one or more substituents selected from the following group B:

[Group B]

A substituent group consisting of a linear or branched alkyl group having about 1 to about 20 carbon atoms, a linear or branched alkenyl group having about 1 to about 20 carbon atoms, a cycloalkenyl group having about 3 to about 20 carbon atoms, a cycloalkynyl group having about 3 to about 20 carbon atoms, a linear or branched alkynyl group having about 1 to about 20 carbon atoms, a cycloalkyl group having about 3 to about 10 carbon atoms, a linear or branched alkoxy group having about 1 to about 20 carbon atoms, halogen, a carboxyl group, a hydroxyl group, an aldehyde group, an amine group, a sulfite group, a bisulfite group, a carbonate group, a bicarbonate group, a phosphorous acid group, a hypophosphorous acid group, a thiol group, a cyan group, a thiocyan group, an ammonium group, a hydrazinyl group, a borohydride group, an amide group, a silane group, an amino group, a carbamoyl group and an urea group.

By way of example, the organic reducing agent may include, but is not limited to, formic acid, oxalic acid, tartaric acid, citric acid, gluconic acid, glutaric acid, hydroxyl glutaric acid, ascorbic acid, succinic acid, maleic acid, fumaric acid, acetic acid, aminoacetic acid, propionic acid, aminopropionic acid, 3-aminopropionic acid, butanoic acid, aminobutanoic acid, carbamic acid, 2,3,4-trihydroxyglutaric acid, isocitric acid, trans-aconitic acid, cis-aconitic acid, homocitric acid, carbonic acid, ethanol, propanol and its isomer, butanol and its isomer, pentanol and its isomer, hexanol and its isomer, hydrazine and its derivatives, urea and its derivatives and precursor, carbamethanol, glycol, glycerol, glucose, ribose, trihydroxybenzene, boran, dimethylamine boran, lactic acid, malonic acid, hydroxylamine, polycarboxylic acid, amino acid and its derivatives, polyacrylic acid, alanine, glycine, hydroquinone and its derivatives, hydroquinone sulfonic acid, and their salts and mixture thereof.

In the embodiment, the inorganic reducing agent includes a compound selected from a group consisting of, but not limited to, an inorganic acid, a halide of metal, thiosulfate of metal, sulfite of metal, bisulfite of metal, ferrite, sulfate of metal, metal hydride, metal borohydride, an ammonium salt of metal, persulfate of metal, periodate of metal, a hypophosphorous acid, ammonium hypophosphite, hypophosphite of metal, an ethylenediaminetetraacetic acid salt of metal, and combinations thereof.

By way of example, the inorganic reducing agent may be selected from a group consisting of, but not limited to, sodium salt or potassium salt of ethylenediaminetetraacetic acid, sodium aldehyde sulfoxinate, potassium aldehyde sulfoxinate, sodium formaldehyde sulfoxinate, potassium formaldehyde sulfoxinate, sodium pyrophosphate, potassium pyrophosphate, sodium phosphate, potassium phosphate, sodium hydroulfite, ferrous sulfate, sodium bisulfite, potassium bisulfite, sulfite of alkali metal or alkali earth metal, bisulfite of alkali metal or alkali earth metal, halide of alkali metal or alkali earth metal, thiosulfate of alkali metal or alkali earth metal, hydride of alkali metal or alkali earth metal, borohydride of alkali metal or alkali earth metal, ammonium salt of alkali metal or alkali earth metal, persulfate of alkali metal or alkali earth metal, periodate of alkali metal or alkali earth metal, hypophosphite of alkali metal or alkali earth metal and combinations thereof.

In the embodiment, the reaction mixture further includes, but is not limited to, an acid. In the embodiment, the acid is selected from a group consisting of, but not limited to, an inorganic acid, an organic acid and a combination thereof. By way of example, the acid may include, but is not limited to, sulfuric acid, hydrochloric acid, bromic acid, boronic acid, iodic acid, nitric acid, phosphoric acid, phosphorous acid, hypophosphorous acid, superphosphoric acid, chlorous acid, hypochlorous acid, perchloric acid, bromous acid, hypobromous acid, perbromic acid, hypoiodous acid, periodic acid, nitrous acid, hydrogen fluoride, boron trifluoride, tetrafluoroboric acid or phosphorus hydrofluoric acid.

In the embodiment, a preparing method of a vanadosilicate molecular sieve further includes, but is not limited to, aging the reaction mixture before the hydrothermal reaction. By way of example, the aging process may be performed by stirring the reaction mixture at room temperature or higher. Through the aging process, the reaction mixture can be formed into a gel.

In the embodiment, a preparing method of a vanadosilicate molecular sieve includes, but is not limited to, preparing a first solution containing the silicon source, the base and water; preparing a second solution containing the $V^{5+}$-containing compound as the vanadium source, the reducing agent and water; preparing the reaction mixture by mixing the first and second solutions and the salt; and forming the vanadosilicate molecular sieve by making a hydrothermal reaction in the reaction mixture. In an embodiment, in the process of preparing the second solution, if an acid is used as the reducing agent, the solution containing the acid is heated and the $V^{5+}$-containing compound as a vanadium source is added therein such that the $V^{5+}$-containing compound can be dissolved well, but the present disclosure is not limited thereto.

In the embodiment, in the reaction mixture, a mole ratio of $SiO_2$ derived from the silicon source:$V_2O_5$ derived from the $V^{5+}$-containing compound:the reducing agent:the base:the salt:water ($H_2O$) is, but not limited to, about 4 to about 10:about 0.1 to about 1:about 1 to about 50:about 1 to about 20:about 1 to about 20:about 30 to about 450.

In the embodiment, in the reaction mixture, a mole ratio of $SiO_2$ derived from the silicon source:$V_2O_5$ derived from the $V^{5+}$-containing compound:the reducing agent:the acid:the base:the salt:water ($H_2O$) is, but not limited to, about 4 to about 10:about 0.1 to about 1:about 1 to about 50:about 1 to about 20:about 1 to about 20:about 1 to about 20:about 30 to about 450.

In the embodiment, the formed vanadosilicate molecular sieve does not substantially contain $V^{5+}$ ions but are not limited thereto. By way of example, the prepared vanadosilicate sieve is obtained by reducing the $V^{5+}$-containing compound as a vanadium source, and thus, the vanadosilicate sieve may be a pure $V^{IV}$ vanadosilicate molecular sieve which does not substantially contain a $V^{5+}$ ion.

In the embodiment, the silicon source includes, but is not limited to, a silicate salt, a silicon oxide or a silicon compound represented by the following chemical formula 4:

[Chemical formula 4]

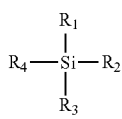

wherein, in the chemical formula 4, $R_1$ to $R_4$ independently represent hydrogen, a hydroxyl group, a carboxyl group, an element of a halogen family, an alkyl group or an alkoxy group having $C_1$ to $C_{22}$, an aralkyl group or aryl group, and $R_1$ to $R_4$ respectively include, but not limited to, one or more oxygen, nitrogen, sulfur or metal atoms. By way of example, the alkyl group or an alkyl group contained in the alkoxy group may include, but is not limited to, a linear or branched alkyl group containing $C_1$ to $C_{22}$.

In the embodiment, the silicon source includes a compound selected from a group consisting of, but not limited to, a silicate salt of alkali metal or alkali earth metal, colloidal silica, silica hydrogel, silicic acid, fumed silica, tetraalkylorthosilicate, a silicon hydroxide and combinations thereof.

In the embodiment, the $V^{5+}$-containing compound includes a compound selected from a group consisting of, but not limited to, $V_2O_5$, $VOCl_3$, $VOBr_3$, $VOF_3$, $VOI_3$, $VOCl_3$, $VOSO_4$, $NaVO_3$, $Na_3VO_4$, $NH_4VO_3$ and combinations thereof.

In the embodiment, the base includes, but is not limited to, a compound containing alkali metal or alkali earth metal. The alkali metal or alkali earth metal may be selected from metal elements included in an alkali metal group and an alkali earth metal group of a periodic table.

In the embodiment, the salt contains, but is not limited to, a salt of alkali metal or a salt of alkali earth metal. By way of example, a salt of the alkali metal or alkali earth metal may be selected from a group consisting of, but not limited to, halide, ammonium salt, carbonate, sulfate, nitrate, phosphate and combinations thereof.

In the embodiment, the hydrothermal reaction is carried out at, but not limited to, room temperature or higher, for example, about 100° C. or higher. By way of example, the hydrothermal reaction may be carried out by introducing the reaction mixture into a high pressure reactor such as an autoclave and heating the reaction mixture at a certain temperature in a sealed condition.

In accordance with another aspect of the present disclosure, there may be provided a vanadosilicate sieve which does not actually contain $V^{5+}$ ions according to the above-described method of preparing a vanadosilicate sieve. The vanadosilicate molecular sieve may be a pure $V^{IV}$ vanadosilicate molecular sieve having a structure in which a $SiO_4$ tetrahedron is connected with a $VO_6$ octahedron and not substantially containing $V^{5+}$ ions. If a vanadosilicate sieve having a well-known structure is prepared by the above-described novel method of preparing a vanadosilicate sieve in accordance with the present disclosure, crystalline properties can be improved and a pure $V^{IV}$ vanadosilicate molecular sieve which does not substantially contain $V^{5+}$ ions can be obtained. Therefore, physicochemical properties thereof can be improved.

In the embodiment, a vanadosilicate molecular sieve prepared in accordance with the preparing method of a novel vanadosilicate molecular sieve in accordance with the present disclosure have, but not limited to, a powder X-ray diffraction pattern including peaks at the diffraction angles (2θ) as shown in Table 1:

TABLE 1

| 2θ | d/Å | Relative Intensity |
|---|---|---|
| 5.90 | 14.96 | 54.00 |
| 12.24 | 7.22 | 22.25 |
| 12.86 | 6.87 | 6.11 |
| 17.96 | 4.93 | 4.46 |
| 20.06 | 4.42 | 38.92 |
| 24.70 | 3.60 | 100.00 |
| 25.76 | 3.45 | 30.67 |
| 27.18 | 3.27 | 21.87 |
| 28.42 | 3.13 | 5.25 |
| 29.94 | 2.98 | 8.42 |
| 31.68 | 2.82 | 4.63 |
| 35.54 | 2.52 | 16.91 |
| 36.46 | 2.46 | 6.86 |
| 36.94 | 2.43 | 3.91 |
| 38.04 | 2.36 | 4.01 |
| 40.80 | 2.20 | 2.29 |
| 43.26 | 2.08 | 2.05 |
| 46.72 | 1.94 | 2.15 |
| 48.80 | 1.86 | 5.29 |

In accordance with still another aspect of the present disclosure, there may be provided a vanadosilicate molecular sieve which can be obtained by oxidizing a $V^{4+}$ ion in the vanadosilicate molecular sieve to a $V^{5+}$ ion. Such vanadosilicate sieves can be usefully employed in various technical fields such as catalysts and nano materials.

In the embodiment, a $V^{4+}$ ion in the vanadosilicate molecular sieve are oxidized to a $V^{5+}$ ion by an oxidizing agent including, but not limited to, an organic oxidizing agent, an inorganic oxidizing agent or a combination thereof. By way of example, the oxidizing agent may be selected from a group consisting of, but not limited to, hydrogen peroxide, peroxide class, oxyacid class, halogen class, halide of metal, nitrate, bromine, $N_2O$, compound containing —$NO_2$ group, compound containing —NO group, N-oxide class, perbenzoic acid, ozone, oxygen, sulfuric acid, nitric acid, nitrous acid, persulfuric acid, sulfurous acid, hyposulfurous acid, hydrochloric acid, bromic acid, boronic acid, iodic acid, phosphoric acid, phosphorous acid, hypophosphorous acid, superphosphoric acid, chlorous acid, hypochlorous acid, perchloric acid, bromous acid, hypobromous acid, perbromic acid, hypoiodous acid, periodic acid, hydrogen fluoride, percarboxylic acid, boron trifluoride, tetrafluoroboric acid, phosphorus hydrofluoric acid and metallic salts thereof.

In accordance with still another aspect of the present disclosure, there may be provided a novel vanadosilicate molecular sieve that has a composition represented by the following formula 1, a structure in which a $SiO_4$ tetrahedron is connected with a $VO_6$ octahedron, and a powder X-ray diffraction pattern including one or more peaks at a diffraction angle (2θ) in a range of from about 5° to about 10°:

$A_r[(VO)_s(Si_nO_{2n+2})] \cdot tH_2O$; [Formula 1]

wherein, in the formula 1, A denotes an univalent or bivalent metal cation selected from a group consisting of alkali metal, alkali earth metal and a combination thereof, and r is between about 0.5 to about 3, s is between about 0.5 to about 2, n is between about 1 to about 6, and t is between about 0.1 to about 2.

By way of example, in the above formula 1, A may include one or more univalent or bivalent metal cations selected from a group consisting of alkali metal, alkali earth metal and combinations thereof. In an embodiment, in the above formula 1, A may include, but is not limited to, Na, K, Rb, Cs, Mg, Ca, Sr, Ba or combinations thereof.

In the embodiment, the novel vanadosilicate molecular sieve may have the powder X-ray diffraction pattern including peaks at the diffraction angle (2θ) of, but not limited to, 5.26°, 5.90°, 5.92°, 5.98°, 6.65°, 7.04°, 7.48°, 7.60° or 7.64°.

In the embodiment, the novel vanadosilicate molecular sieve may have, but not limited to, the powder X-ray diffraction pattern including peaks at the diffraction angles (2θ) as shown in Table 2:

TABLE 2

| 2θ | d/Å | Relative Intensity |
|---|---|---|
| 7.04 | 12.55 | 21.75 |
| 11.46 | 7.72 | 22.29 |
| 12.82 | 6.89 | 16.18 |
| 13.00 | 6.8 | 41.86 |
| 15.24 | 5.81 | 16.40 |
| 17.92 | 4.94 | 34.95 |
| 18.58 | 4.77 | 16.02 |
| 20.20 | 4.39 | 92.87 |
| 21.32 | 4.16 | 79.64 |
| 22.38 | 3.96 | 100.0 |
| 27.22 | 3.27 | 49.62 |
| 28.82 | 3.09 | 37.26 |
| 29.50 | 3.02 | 11.56 |
| 30.40 | 2.93 | 14.26 |
| 33.52 | 2.67 | 10.67 |
| 34.72 | 2.58 | 20.98 |
| 36.20 | 2.48 | 12.62 |
| 36.74 | 2.44 | 21.11 |

TABLE 2-continued

| 2θ | d/Å | Relative Intensity |
|---|---|---|
| 37.40 | 2.40 | 34.25 |
| 40.68 | 2.21 | 16.11 |

In the embodiment, the novel vanadosilicate molecular sieve may have, but not limited to, the powder X-ray diffraction pattern including peaks at the diffraction angles (2θ) as shown in Table 3:

TABLE 3

| 2θ | d/Å | Relative Intensity |
|---|---|---|
| 5.26 | 16.78 | 33.01 |
| 12.08 | 7.32 | 34.67 |
| 13.48 | 6.56 | 40.88 |
| 15.90 | 5.56 | 10.17 |
| 17.18 | 5.15 | 26.74 |
| 19.32 | 4.59 | 25.78 |
| 20.18 | 4.39 | 72.12 |
| 21.26 | 4.17 | 97.82 |
| 22.34 | 3.97 | 100.00 |
| 24.36 | 3.65 | 17.42 |
| 26.42 | 3.37 | 14.37 |
| 27.20 | 3.27 | 50.85 |
| 28.82 | 3.09 | 20.71 |
| 29.58 | 3.01 | 14.13 |
| 32.86 | 2.72 | 10.12 |
| 34.28 | 2.61 | 10.71 |
| 36.66 | 2.44 | 14.16 |
| 37.36 | 2.42 | 56.83 |
| 39.28 | 2.29 | 10.27 |
| 40.64 | 2.21 | 11.12 |
| 43.98 | 2.05 | 12.33 |

In the embodiment, the novel vanadosilicate molecular sieve may have, but not limited to, the powder X-ray diffraction pattern including peaks at the diffraction angles (2θ) as shown in Table 4:

TABLE 4

| 2θ | d/Å | Relative Intensity |
|---|---|---|
| 7.64 | 11.56 | 43.36 |
| 11.24 | 7.86 | 63.86 |
| 13.62 | 6.49 | 52.42 |
| 15.32 | 5.77 | 48.92 |
| 15.62 | 5.66 | 29.94 |
| 17.14 | 5.17 | 43.97 |
| 19.02 | 4.66 | 30.27 |
| 20.58 | 4.31 | 93.31 |
| 21.76 | 4.08 | 19.99 |
| 23.08 | 3.85 | 100.00 |
| 23.88 | 3.72 | 14.87 |
| 24.52 | 3.62 | 27.52 |
| 25.18 | 3.53 | 15.43 |
| 25.74 | 3.45 | 18.79 |
| 26.90 | 3.31 | 73.08 |
| 27.46 | 3.24 | 25.50 |
| 27.84 | 3.20 | 78.98 |
| 28.52 | 3.12 | 16.69 |
| 30.96 | 2.88 | 71.45 |
| 31.62 | 2.82 | 40.02 |
| 33.06 | 2.70 | 25.29 |
| 34.28 | 2.61 | 24.02 |
| 34.86 | 2.57 | 17.43 |
| 36.14 | 2.48 | 12.06 |
| 38.98 | 2.30 | 19.75 |
| 39.80 | 2.26 | 16.03 |
| 40.68 | 2.21 | 16.62 |
| 47.22 | 1.92 | 14.42 |

In the embodiment, the novel vanadosilicate molecular sieve may have, but not limited to, the powder X-ray diffraction pattern including peaks at the diffraction angles (2θ) as shown in Table 5:

TABLE 5

| 2θ | d/Å | Relative Intensity |
|---|---|---|
| 7.60 | 11.62 | 39.26 |
| 11.26 | 7.85 | 73.70 |
| 13.60 | 6.50 | 100.00 |
| 15.32 | 5.77 | 39.41 |
| 15.36 | 5.76 | 31.12 |
| 17.14 | 5.16 | 45.60 |
| 19.00 | 4.66 | 18.26 |
| 20.58 | 4.32 | 91.38 |
| 21.74 | 4.08 | 16.16 |
| 23.08 | 3.85 | 61.28 |
| 23.92 | 3.71 | 29.24 |
| 24.52 | 3.62 | 43.25 |
| 25.20 | 3.53 | 21.36 |
| 25.74 | 3.45 | 25.01 |
| 26.90 | 3.31 | 69.70 |
| 27.46 | 3.24 | 41.82 |
| 27.82 | 3.20 | 92.81 |
| 28.50 | 3.12 | 30.36 |
| 30.94 | 2.88 | 42.52 |
| 31.64 | 2.82 | 37.04 |
| 32.56 | 2.74 | 27.91 |
| 33.04 | 2.70 | 34.08 |
| 34.28 | 2.61 | 34.42 |
| 34.90 | 2.56 | 22.69 |
| 36.10 | 2.48 | 15.81 |
| 37.74 | 2.38 | 12.83 |
| 38.62 | 2.32 | 18.41 |
| 39.78 | 2.26 | 17.75 |
| 40.66 | 2.21 | 17.56 |
| 41.74 | 2.16 | 18.09 |
| 42.54 | 2.12 | 13.19 |
| 43.78 | 2.06 | 9.46 |
| 45.58 | 1.98 | 10.62 |
| 47.26 | 1.92 | 12.21 |
| 49.32 | 1.84 | 12.52 |

In the embodiment, the novel vanadosilicate molecular sieve may have, but not limited to, the powder X-ray diffraction pattern including peaks at the diffraction angles (2θ) as shown in Table 6:

TABLE 6

| 2θ | d/Å | Relative Intensity |
|---|---|---|
| 7.60 | 11.62 | 27.65 |
| 11.24 | 7.86 | 42.58 |
| 13.60 | 6.50 | 71.46 |
| 15.28 | 5.79 | 27.41 |
| 15.60 | 5.67 | 27.67 |
| 17.10 | 5.18 | 46.06 |
| 19.04 | 4.65 | 21.34 |
| 20.54 | 4.32 | 85.64 |
| 21.90 | 4.05 | 12.49 |
| 23.02 | 3.86 | 50.89 |
| 23.94 | 3.71 | 20.40 |
| 24.48 | 3.63 | 57.57 |
| 25.18 | 3.53 | 21.49 |
| 25.68 | 3.46 | 26.77 |
| 26.88 | 3.31 | 77.13 |
| 27.46 | 3.24 | 64.81 |
| 27.78 | 3.20 | 100.00 |
| 28.50 | 3.12 | 24.29 |
| 30.90 | 2.89 | 47.07 |
| 31.62 | 2.82 | 56.56 |
| 32.54 | 2.75 | 32.12 |
| 33.00 | 2.71 | 27.77 |
| 34.28 | 2.61 | 26.75 |
| 34.82 | 2.57 | 22.68 |

TABLE 6-continued

| 2θ | d/Å | Relative Intensity |
|---|---|---|
| 36.08 | 2.48 | 21.60 |
| 37.72 | 2.38 | 9.39 |
| 38.62 | 2.32 | 16.69 |
| 39.70 | 2.26 | 12.46 |
| 40.66 | 2.21 | 18.69 |
| 41.72 | 2.16 | 21.46 |
| 42.52 | 2.12 | 14.03 |
| 43.66 | 2.07 | 9.48 |
| 45.56 | 1.98 | 16.15 |
| 47.24 | 1.92 | 12.86 |
| 49.24 | 1.84 | 10.53 |

In the embodiment, the novel vanadosilicate molecular sieve may have, but not limited to, the powder X-ray diffraction pattern including peaks at the diffraction angles (2θ) as shown in Table 7:

TABLE 7

| 2θ | d/Å | Relative Intensity |
|---|---|---|
| 7.48 | 11.81 | 100.00 |
| 9.64 | 9.16 | 22.55 |
| 11.80 | 7.49 | 20.70 |
| 12.40 | 7.13 | 21.85 |
| 13.72 | 6.45 | 22.90 |
| 15.08 | 5.87 | 24.24 |
| 16.08 | 5.50 | 20.05 |
| 17.36 | 5.10 | 17.52 |
| 18.02 | 4.91 | 16.72 |
| 19.58 | 4.53 | 94.20 |
| 19.92 | 4.45 | 27.28 |
| 20.98 | 4.23 | 20.78 |
| 22.76 | 3.90 | 21.38 |
| 23.90 | 3.72 | 25.31 |
| 24.20 | 3.67 | 25.28 |
| 24.82 | 3.58 | 25.75 |
| 26.24 | 3.39 | 35.31 |
| 27.80 | 3.20 | 39.28 |
| 29.24 | 3.05 | 17.43 |
| 30.48 | 2.93 | 27.44 |
| 31.64 | 2.82 | 11.92 |
| 33.56 | 2.66 | 19.08 |
| 36.38 | 2.46 | 18.97 |

In the embodiment, the novel vanadosilicate molecular sieve may have, but not limited to, the powder X-ray diffraction pattern including peaks at the diffraction angles (2θ) as shown in Table 8:

TABLE 8

| 2θ | d/Å | Relative Intensity |
|---|---|---|
| 5.98 | 14.76 | 100 |
| 7.36 | 12.00 | 27.22 |
| 7.69 | 11.48 | 37.08 |
| 9.59 | 9.21 | 22.18 |
| 11.60 | 7.62 | 12.69 |
| 23.20 | 3.83 | 15.63 |
| 24.07 | 3.69 | 12.79 |
| 28.16 | 3.16 | 7.34 |

In the embodiment, the novel vanadosilicate molecular sieve may have, but not limited to, the powder X-ray diffraction pattern including peaks at the diffraction angles (2θ) as shown in Table 9:

TABLE 9

| 2θ | d/Å | Relative Intensity |
|---|---|---|
| 6.65 | 13.28 | 100.00 |
| 13.35 | 6.62 | 12.16 |
| 19.70 | 4.50 | 12.57 |
| 20.25 | 4.38 | 8.56 |
| 24.80 | 3.58 | 7.64 |
| 26.35 | 3.37 | 10.13 |
| 26.95 | 3.30 | 22.53 |
| 29.85 | 2.99 | 6.60 |

In the embodiment, the novel vanadosilicate molecular sieve may have, but is not limited to, cubic-, truncated cubic- or brick-shaped crystals.

In accordance with still another aspect of the present disclosure, a novel vanadosilicate molecular sieve which is obtained by oxidizing a $V^{4+}$ ion in the vanadosilicate molecular sieve to a $V^{5+}$ ion. In the embodiment, the $V^{4+}$ ion can be oxidized to a $V^{5+}$ ion with an oxidizing agent including, but not limited to, an organic oxidizing agent, an inorganic oxidizing agent or a combination thereof. By way of example, the oxidizing agent may be selected from a group consisting of, but not limited to, hydrogen peroxide, peroxide class, oxyacid class, halogen class, halide of metal, nitrate, bromine, $N_2O$, compound containing —$NO_2$ group, compound containing —NO group, N-oxide class, perbenzoic acid, ozone, oxygen, sulfuric acid, nitric acid, nitrous acid, persulfuric acid, sulfurous acid, hyposulfurous acid, hydrochloric acid, bromic acid, boronic acid, iodic acid, phosphoric acid, phosphorous acid, hypophosphorous acid, superphosphoric acid, chlorous acid, hypochlorous acid, perchloric acid, bromous acid, hypobromous acid, perbromic acid, hypoiodous acid, periodic acid, hydrogen fluoride, percarboxylic acid, boron trifluoride, tetrafluoroboric acid, phosphorus hydrofluoric acid and metallic salts thereof.

Hereinafter, some examples will be provided to explain the present disclosure. However, the present disclosure is not limited to these examples.

EXAMPLE

<Reagent Used for Preparing a Vanadosilicate>

Sodium silicate ($Na_2SiO_3$, from about 17 wt % to about 19 wt % of $Na_2O$ and from about 35 wt % to about 38 wt % of $SiO_2$, Kanto), sodium silicate ($Na_2SiO_3$, about 8 wt % of $Na_2O$ and about 27 wt % of $SiO_2$, Sigma-Aldrich), sodium silicate (N-brand $Na_2SiO_3$, about 8.89 wt % of $Na_2O$ and 28.89 wt % of $SiO_2$, PQ Corp.), Ludox (HS-40 colloidal silica, water suspension of about 40 wt %, Sigma-aldrich), vanadyl sulfate ($VOSO_4$, about 97%, Aldrich), vanadium pentoxide ($V_2O_5$, about 99%, Sigma-aldrich), oxalic acid ($H_2O_4C_2$, about 99%, Sigma-aldrich), sulfuric acid ($H_2SO_4$, 95%, Duksan), sodium hydroxide (NaOH, from about 93% to about 100%, Samchun), sodium chloride (NaCl, about 99.5%, Samchun), potassium hydroxide (KOH, about 95%, Samchun), potassium chloride (KCl, about 99%, Oriental), potassium fluoride (KF, about 95%, Samchun), cesium hydroxide (CsOH, about 99.5%, Aldrich), cesium chloride (CsCl, about 99%, Aldrich), rubidium chloride (RbCl, about 99%, Aldrich), and ethanol (EtOH, about 95%, Sk) were used.

The following Tables 10 and 11 show each kind of silicon sources, vanadium sources, reducing agents (oxalic acid and ethanol), acids, bases and salts, amounts thereof, amounts of water, reaction temperature and reaction time.

TABLE 10

| Vanado-silicate | | Silicon Source | | | | Vanadium source | | Reducing agent | Acid | Reducing agent |
|---|---|---|---|---|---|---|---|---|---|---|
| | | $SiO_2^a$ | $SiO_2^b$ | $SiO_2^c$ | Ludox | $V_2O_5$ | $VOSO_4$ | $H_2C_2O_4$ | $H_2SO_4$ | EtOH |
| Ex 1 | SVS-1 | 6.7 | | | | 1 | | 4.12 | | 40 |
| Ex 2 | SVS-2 | 5.4 | | | | 1 | | 2.5 | | 24 |
| Ex 3 | SVS-3 | 6.7 | | | | 1 | | 4 | | 40 |
| Ex 4 | SVS-X | 4.3 | | | | 1 | | 1.9 | | 26 |
| Ex 5 | SVS-Y | 6 | | | | 1 | | 3.26 | | |
| Ex 6 | SVS-Z | 5.34 | | | | 1 | | 3.44 | | |
| Ex 7 | AM-6-(Y) | 6.07 | | | | 1 | | | 3.61 | 7.2 |
| Comp. Ex 1 | AM-6-(RA) | | 0.97 | | | | 0.2 | | | |
| Comp. Ex 2 | AM-6-(S)-TMA | | | 4.85 | | | 0.5 | | | |
| Ex 8 | VSH-1 | | | | 4.31 | 1 | | 3.05 | | 20 |
| Ex 9 | VSH-2 | | | | 5.4 | 1 | | 4 | | |
| Ex 10 | VSH-3 | 2.6 | | | 2.6 | 1 | | | 3.25 | 8 |
| Ex 11 | VSH-4 | | | | 4 | 1 | | 2.17 | | |
| Ex 12 | VSH-9 | 6.7 | | | | 1 | | 4 | | 40 |
| Ex 13 | VSH-12 | | | | 6.7 | 1 | | 4 | | |
| Ex 14 | VSH-13 | 7.4 | | | | 1 | | 4 | | 44 |
| Ex 15 | VSH-16 | 6 | | | | 1 | | 3.26 | | 36 |

TABLE 11

| Vanado-silicate | | Base | | | | Salt | | | | $H_2O$ | RT (° C.) | Time (h) |
|---|---|---|---|---|---|---|---|---|---|---|---|---|
| | | $Na_2O$ | $K_2O$ | $Cs_2O$ | TMA | NaCl | KCl | KF | CsCl | | | |
| Ex 1 | SVS-1 | 7.7 | | | | | | 6.72 | | 315 | 220 | 36 |
| Ex 2 | SVS-2 | 6.2 | | | | | | 0.95 | | 254 | 210 | 48 |
| Ex 3 | SVS-3 | 7.7 | | | | | | 1.6 2.4 3.25 | | 314 | 210 | 36 |

TABLE 11-continued

| | Vanado-silicate | Base | | | | Salt | | | | H$_2$O | RT (° C.) | Time (h) |
|---|---|---|---|---|---|---|---|---|---|---|---|---|
| | | Na$_2$O | K$_2$O | Cs$_2$O | TMA | NaCl | KCl | KF | CsCl | | | |
| Ex 4 | SVS-X | 4.7 | | | | | | 2.9 | | 197 | 220 | 48 |
| Ex 5 | SVS-Y | 6.6 | | | | 11 | | | | 285 | 220 | 48 |
| Ex 6 | SVS-Z | 5.84 | | | | | | 5.37 | | 251 | 220 | 36 |
| Ex 7 | AM-6-(Y) | 2.94 | 3.1 | | | | | | | 415 | 230 | 24 |
| Comp. Ex 1 | AM-6-(RA) | 0.5 | | | | 1 | 0.46 | | | 30 | 230 | 72 |
| Com Ex 2 | AM-6-(S)-TMA | | | | 2.2 | 9 | 2.6 | | | 209 | 230 | 72 |
| Ex 8 | VSH-1 | | 5.19 | | | | | 3.16 | | 360 | 210 | 30 |
| Ex 9 | VSH-2 | | | 1.3 | | | | | | 264 | 220 | 36 |
| Ex 10 | VSH-3 | 1.3 | 4.6 | | | | | 1.2 | | 365 | 230 | 72 |
| Ex 11 | VSH-4 | | | 4.9 | | | | | | 200 | 220 | 36 |
| Ex 12 | VSH-9 | 7.7 | | | | | | | 8.7 | 334 | 210 | 36 |
| Ex 13 | VSH-12 | | | 4.8 | | | | | | 360 | 220 | 36 |
| Ex 14 | VSH-13 | 7.7 | | | | 13.5 | | | | 350 | 220 | 72 |
| Ex 15 | VSH-16 | 6.6 | | | | 11 | | | | 285 | 220 | 36 |

In a reaction mixture obtained by mixing the components listed in Tables 10 and 11, the ratio SiO$_2$ derived from the silicon sources:V$_2$O$_5$:H$_2$O$_4$C$_2$:H$_2$SO$_4$:Na$_2$O (derived from the bases):Cs$_2$O (derived from the bases):NaCl:KCl:KF:CsCl:EtOH:H$_2$O in terms of mole was 4 to 7.4:0.2 to 1:1.9 to 4.12:0.5 to 8.1:0.5 to 7.7:1.3 to 4.8:1 to 13.5:1.6 to 8.7:1.2 to 6.7:1.6 to 8.7:8 to 44:30 to 415.

Hereinafter, there will be explained synthetic methods of a vanadosilicate synthesized under the conditions described in Tables 10 and 11.

Example 1

Synthesis of Vanadosilicate SVS-1

For a synthesis of a novel vanadosilicate SVS-1, a reaction mixture gel containing SiO$_2$, V$_2$O$_5$, oxalic acid, NaOH, KF, EtOH and H$_2$O were prepared. A ratio of the synthesis gel (SiO$_2$:V$_2$O$_5$:H$_2$O$_4$C$_2$:Na$_2$O:KF:EtOH:H$_2$O) in terms of mole was 6.7:1.00:4.12:7.7:6.72:40:315.

To be specific, for the synthesis of SVS-1, Na$_2$SiO$_3$ (about 12.2 g) solution was diluted in deionized water (DDW, about 12 g), a NaOH solution containing NaOH (about 4 g) dissolved in DDW (about 20 g) was added to this solution with stirring, and the mixture was stirred for about 30 minutes to hydrolyze Na$_2$SiO$_3$, and thus, a first solution was prepared.

For a preparation of a vanadium source, separately, oxalic acid (about 5.75 g) and DDW (about 20 g) were mixed together and heated slowly until the oxalic acid fully dissolved in water. V$_2$O$_5$ (about 2 g) was added into the hot oxalic acid solution and stirred to prepare a second solution. Immediately, the yellow V$_2$O$_5$ was dissolved with CO$_2$ evacuation and turned into the deep blue solution (V$^{5+}$ to V$^{4+}$).

The second solution was cooled at room temperature and added to the first solution drop wise slowly. EtOH (about 20 g) was added in the above mixture after 5 minutes. The mixture was stirred for about 1 hour and a diluted KF solution containing KF (about 4.5 g) dissolved in DDW (about 10 g) was added to obtain a reaction mixture. The mixture was finally aged for about 14 hours at room temperature to obtain a reaction mixture in the form of a gel. Afterwards, the gel was transferred into a 50 ml Teflon-lined stainless steel autoclave and the autoclave was placed in a pre-heated oven at about 220° C. for about 36 hours under static condition. After the reaction, the autoclave was cooled at room temperature, and the SVS-1 crystals (deep green color) were collected by centrifuging and washed with copious amount of DDW and dried at about 100° C. for about 1 hour.

Figure 1B:
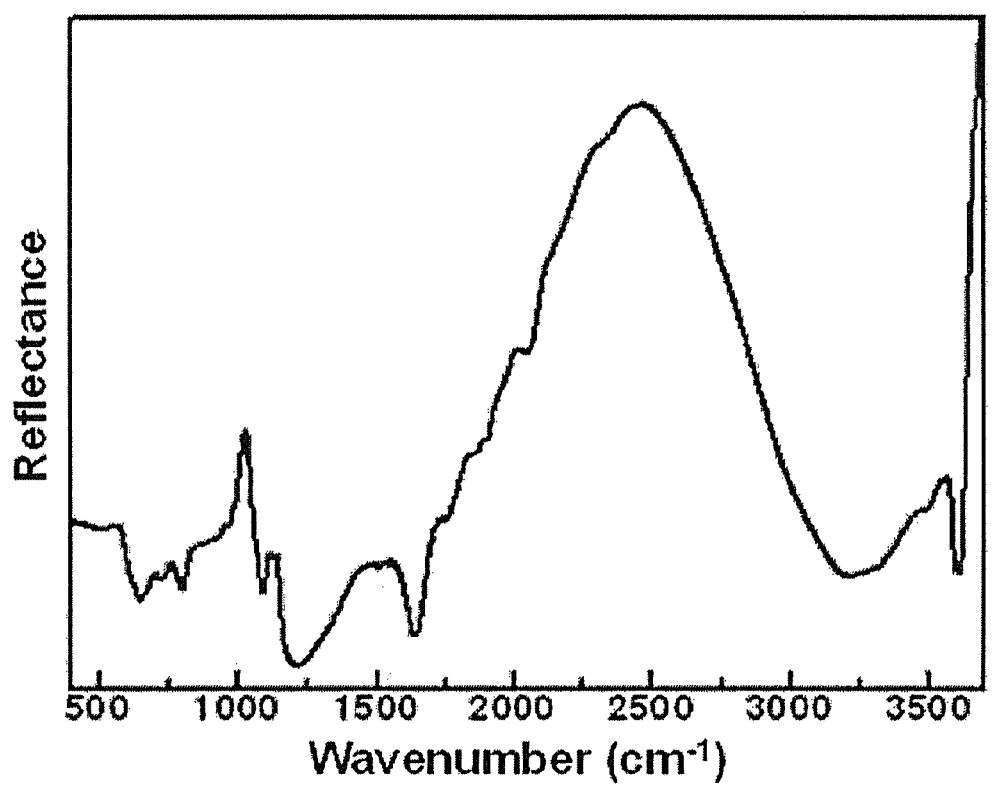
Figure 1C:
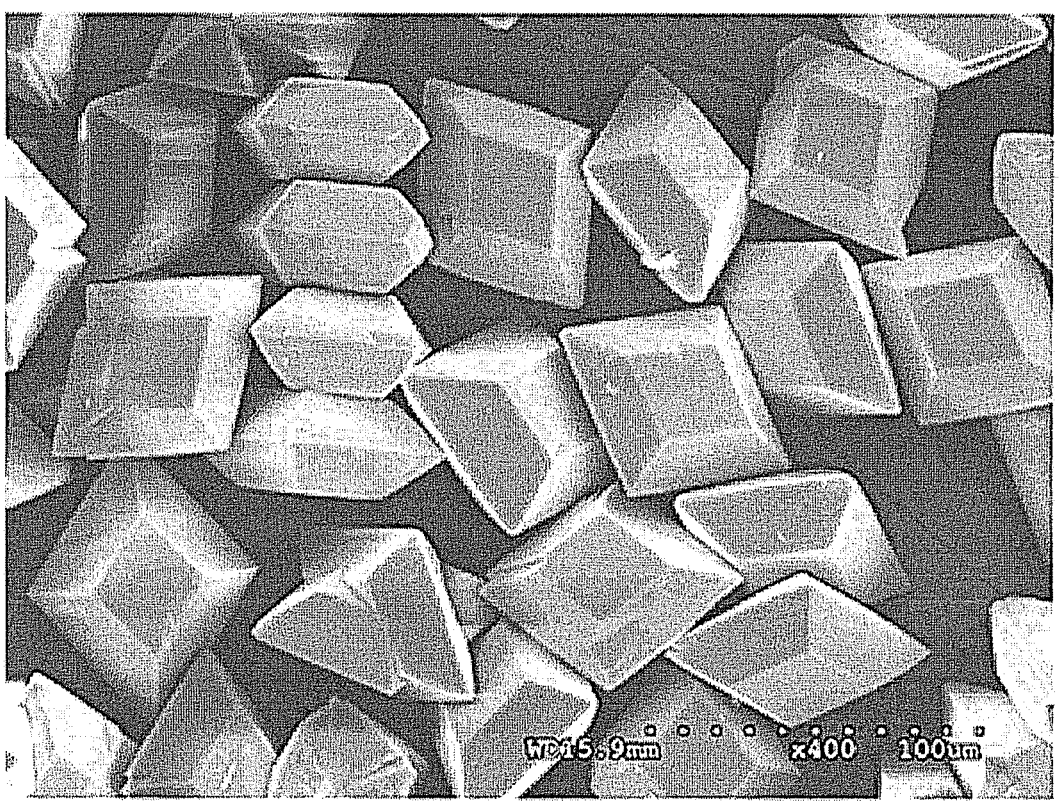

FIGS. 1(a) to 1(c) provide a powder X-ray diffraction spectrum, an IR spectrum and a SEM image of the novel vanadosilicate SVS-1 obtained in accordance with the present example, respectively, and an analysis of a powder X-ray diffraction peak is shown in Table 2.

Example 2

Synthesis of Vanadosilicate SVS-2

For a synthesis of a novel vanadosilicate SVS-2, a gel containing SiO$_2$, V$_2$O$_5$, oxalic acid, NaOH, KF, EtOH and H$_2$O was prepared. A ratio of the synthesis gel (SiO$_2$:V$_2$O$_5$:H$_2$O$_4$C$_2$:Na$_2$O:KF:EtOH:H$_2$O) in terms of mole was 5.4:1.00:2.5:6.2:0.95:24:254.

To be specific, Na$_2$SiO$_3$ (about 12.2 g) solution was diluted in deionized water (DDW, about 12 g), and in this solution, a solution of NaOH which contains NaOH (about 4 g) dissolved in DDW (about 20 g) was added with stirring, and the mixture was stirred for about 30 minutes to prepare a first solution.

For a preparation of a vanadium source, separately, V$_2$O$_5$ (about 2.1 g), oxalic acid (about 4.3 g) and DDW (about g) were mixed together and the mixture was refluxed around 100° C. for about 4 hours to prepare a second solution. After cooling the second solution at room temperature, the second solution (deep black color) was added into the first solution drop wise slowly. EtOH (about 15 g) was added into the above mixture after about 5 minutes. The mixture was stirred for about 1 hour and a KF solution containing KF (about 0.9 g) dissolved in DDW (about 10 g) was added. The mixture was finally aged for about 14 hours at room temperature to obtain a reaction mixture in the form of a gel. The gel was transferred into a 50 ml Teflon-lined stainless steel autoclave and the autoclave was placed in the pre-heated oven at about 210° C. for about 48 hours under static condition. After the reaction, the autoclave was cooled at room temperature, and the SVS-2 crystals (deep green color) were collected by centrifuging and washed with copious amount of DDW and dried at about 100° C. for about 1 hour.

Figure 2A:
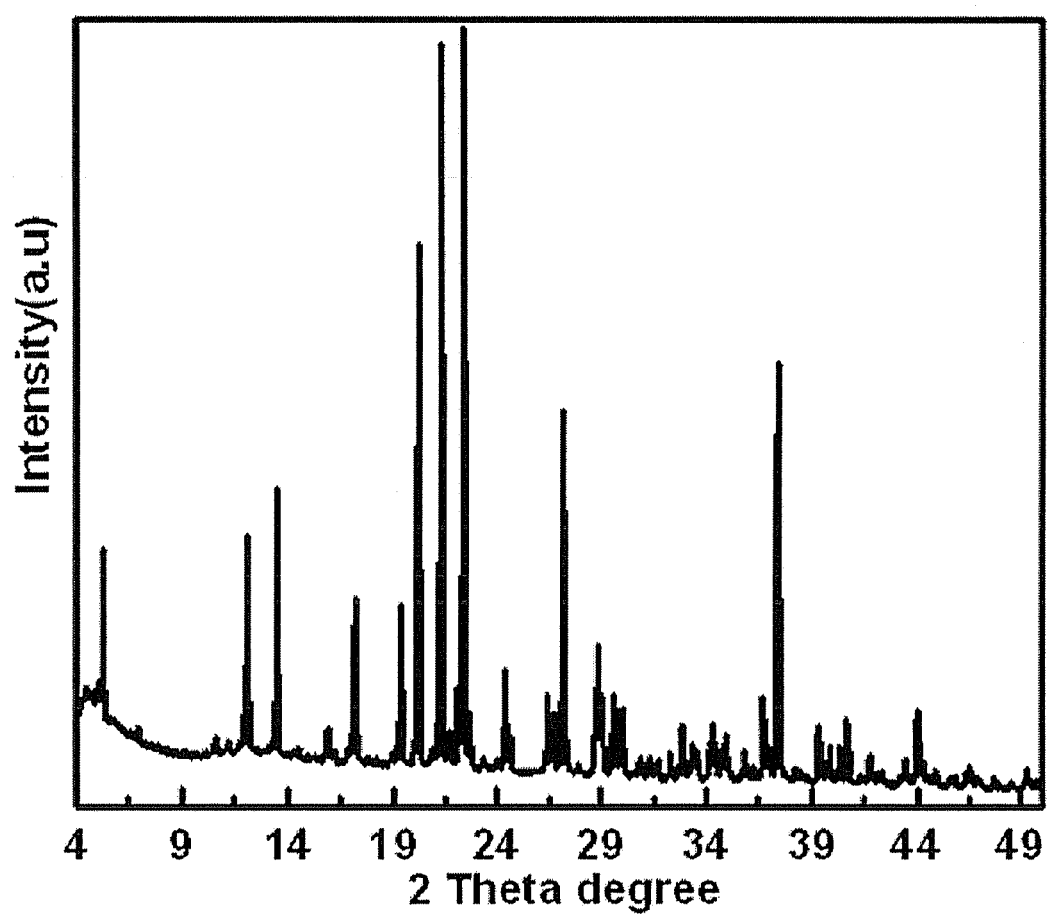
FIGS. 2A to 2C provide (A) powder X-ray diffraction spectrum, (B) IR spectrum and (C) SEM image of a vanadosilicate molecular sieve SVS-2 in accordance with an example of the present disclosure.
Figure 2B:
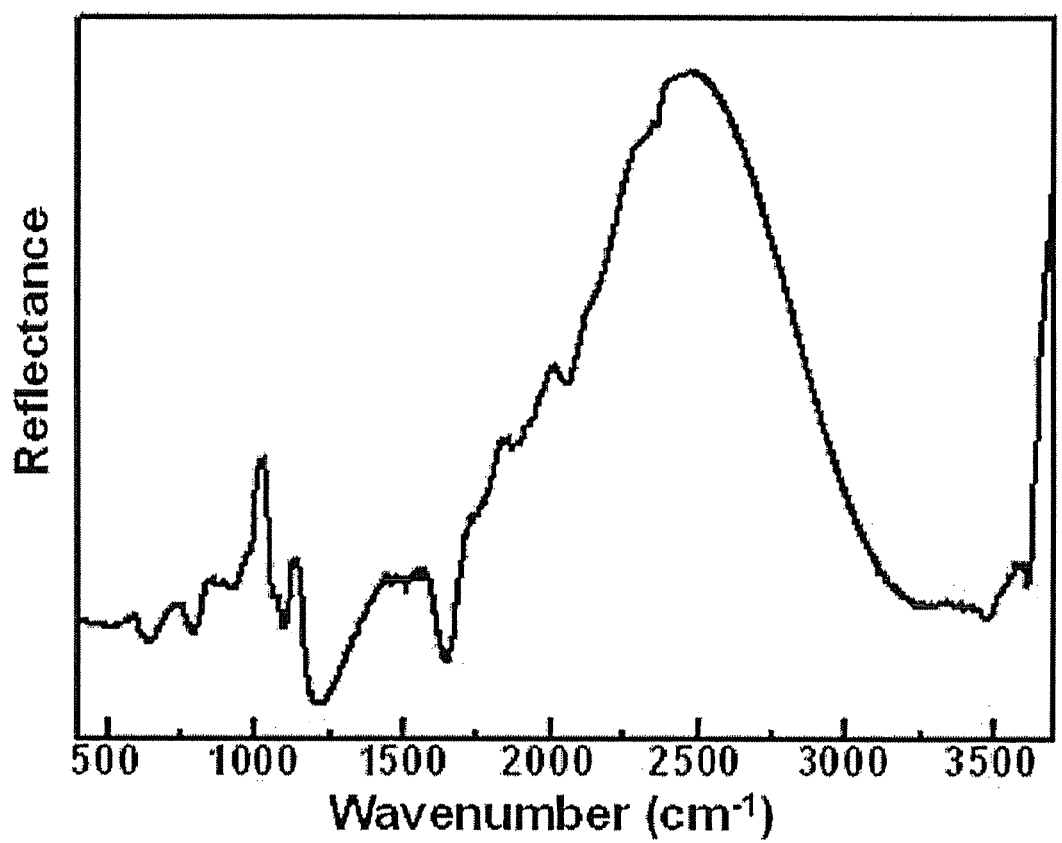
Figure 2C:
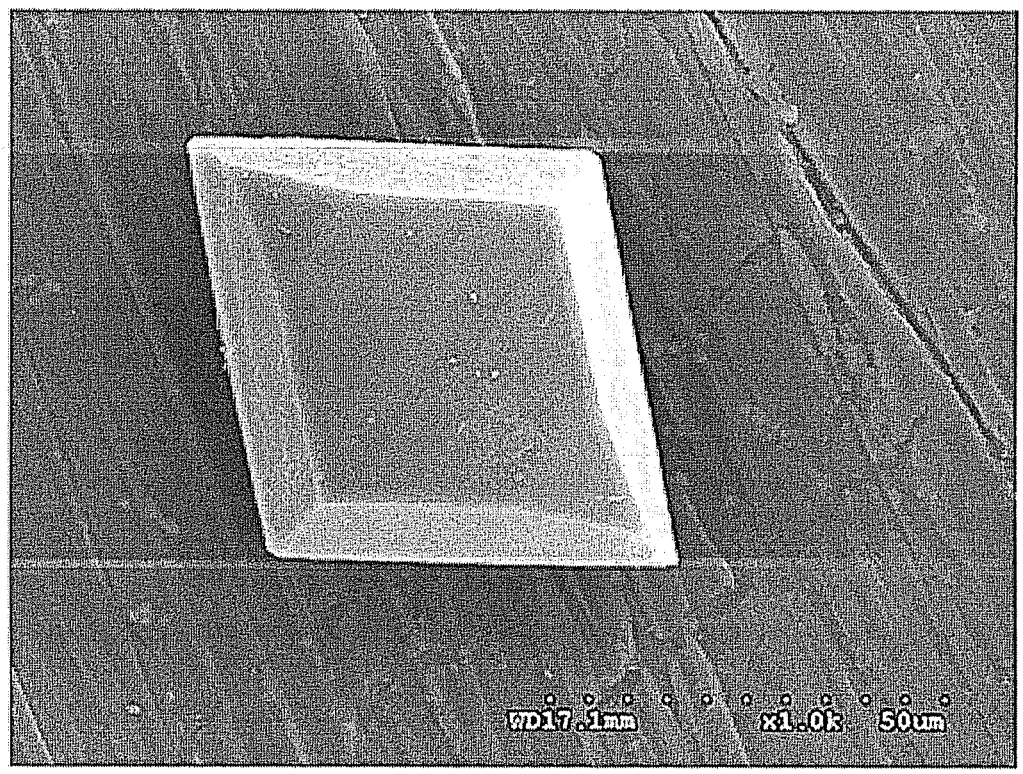

FIGS. 2(a) to 2(c) provide a powder X-ray diffraction spectrum, an IR spectrum and a SEM image of the novel vanadosilicate SVS-2 obtained in accordance with the present example, respectively, and an analysis of a powder X-ray diffraction peak is shown in Table 3.

Example 3

Synthesis of Vanadosilicate SVS-3

The present example relates to a synthesis of a novel vanadosilicate SVS-3 having crystals with different three morphology.

For a synthesis of (cubic-, truncated cubic- and brick-shaped) SVS-3, a reaction mixture gel containing $SiO_2$, $V_2O_5$, oxalic acid, NaOH, CsCl, EtOH and $H_2O$ was prepared. Ratios of the synthesis gel ($SiO_2:V_2O_5:H_2O_4C_2: Na_2O:CsCl:EtOH:H_2O$) in terms of mole were 6.7:1.00:4:7.7:1.6:40:314, 6.7:1.00:4:7.7:2.4:40:314 and 6.7:1.00:4:7.7:3.25:40:314, respectively.

(1) Synthesis of (Cubic-Shaped) SVS-3

$Na_2SiO_3$ (about 6.1 g) was diluted in distilled deionized water (DDW, about 6 g). In this solution, a solution of NaOH containing NaOH (about 2 g) dissolved in DDW (about 10 g) was added with stirring, and the mixture was stirred for about 30 minutes to hydrolyze $Na_2SiO_3$, and thus, a first solution was prepared.

For a preparation of a vanadium source, separately, oxalic acid (about 2.85 g) and DDW (about 10 g) were mixed together and heated slowly until the oxalic acid fully dissolved in water. To be specific, $V_2O_5$ (about 1 g) powder was then added into the hot oxalic acid solution and stirred for about 5 minutes to prepare a second solution. The second solution was cooled at room temperature and added to the first solution drop wise slowly. EtOH (about 10 g) was added in the above mixture after about 5 minutes. The mixture was stirred for about 1 hour and a diluted CsCl solution containing CsCl (about 1.55 g) dissolved in DDW (about 5 g) was added to obtain a reaction mixture. The mixture was finally aged for about 14 hours at room temperature to obtain a reaction mixture in the form of a gel. After aging, the gel was transferred into a 50 ml Teflon-lined stainless steel autoclave and the autoclave was placed in the pre-heated oven at about 210° C. for about 36 hours under static condition. After the reaction, the autoclave was cooled at room temperature, and the SVS-3 crystals (deep green color) were collected by centrifuging and washed with copious amount of DDW and dried at about 100° C. for about 1 hour.

(2) Synthesises of (Truncated Cubic-Shaped and Brick-Shaped) SVS-3

Synthesises of truncated cubic- and brick-shaped SVS-3 crystals were carried out in the same manner as described above with reference to "(1) Synthesis of (cubic-shaped) SVS-3" except that about 2.25 g and about 3 g of CsCl were respectively used for preparing the reaction mixture gels.

Figure 3A:
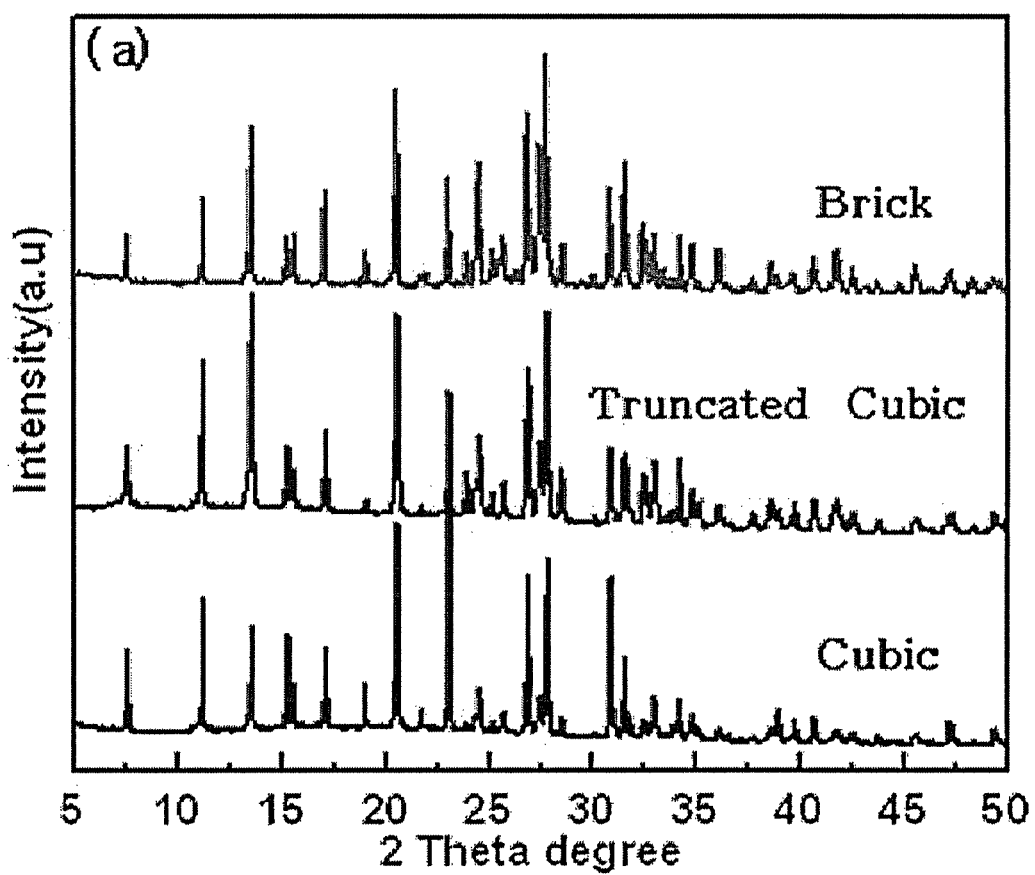
FIGS. 3A to 3D provide (A) powder X-ray diffraction spectra, (B) IR spectrum (cubic shape), (C) IR spectrum (truncated cubic shape) and (D) IR spectrum (brick shape) of cubic-, truncated cubic- and brick-shaped crystals of a vanadosilicate molecular sieve SVS-3 in accordance with an example of the present disclosure.
Figure 3B:
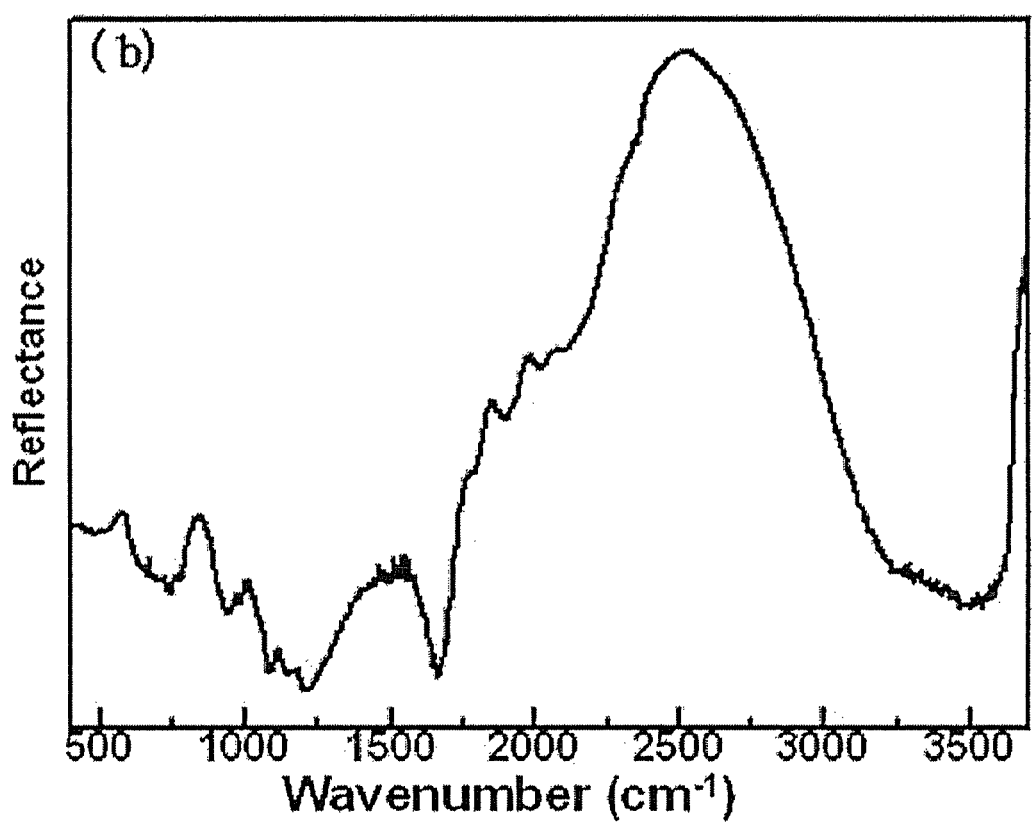
Figure 3C:
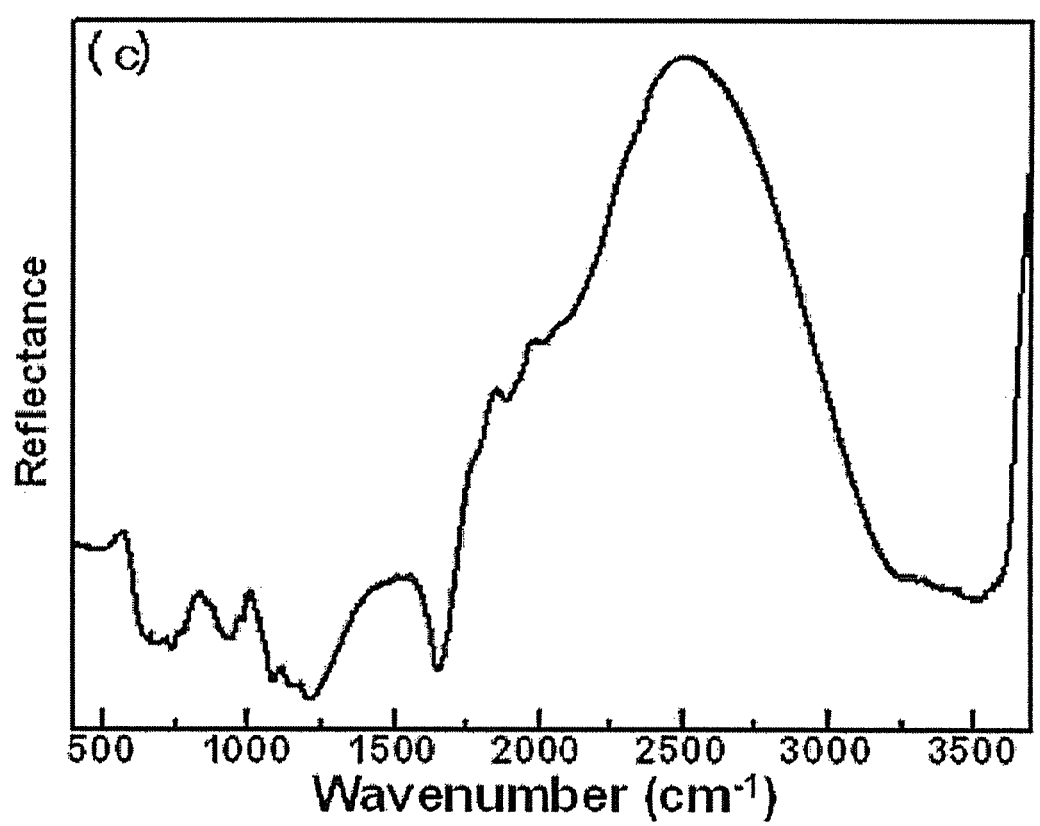
Figure 3D:
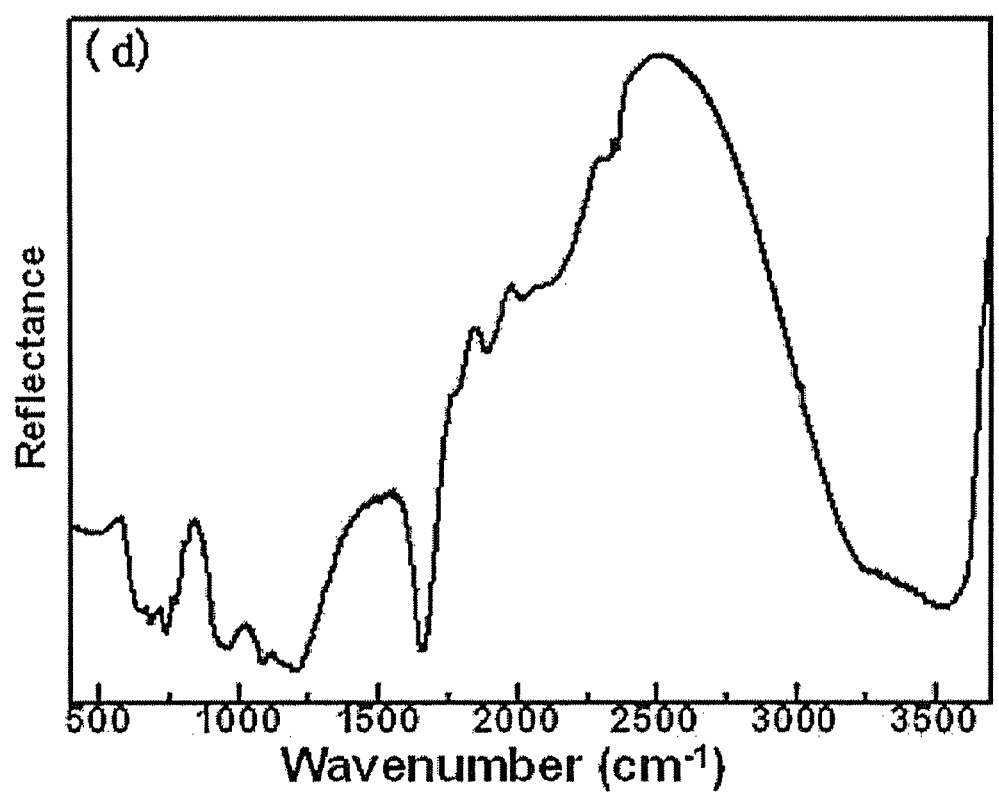
Figure 4A:
FIGS. 4A to 4C provide SEM images of (A) cubic-shaped crystal, (B) truncated cubic-shaped crystal and (C) brick-shaped crystal of the vanadosilicate molecular sieve SVS-3 in accordance with the example of the present disclosure.
Figure 4B:
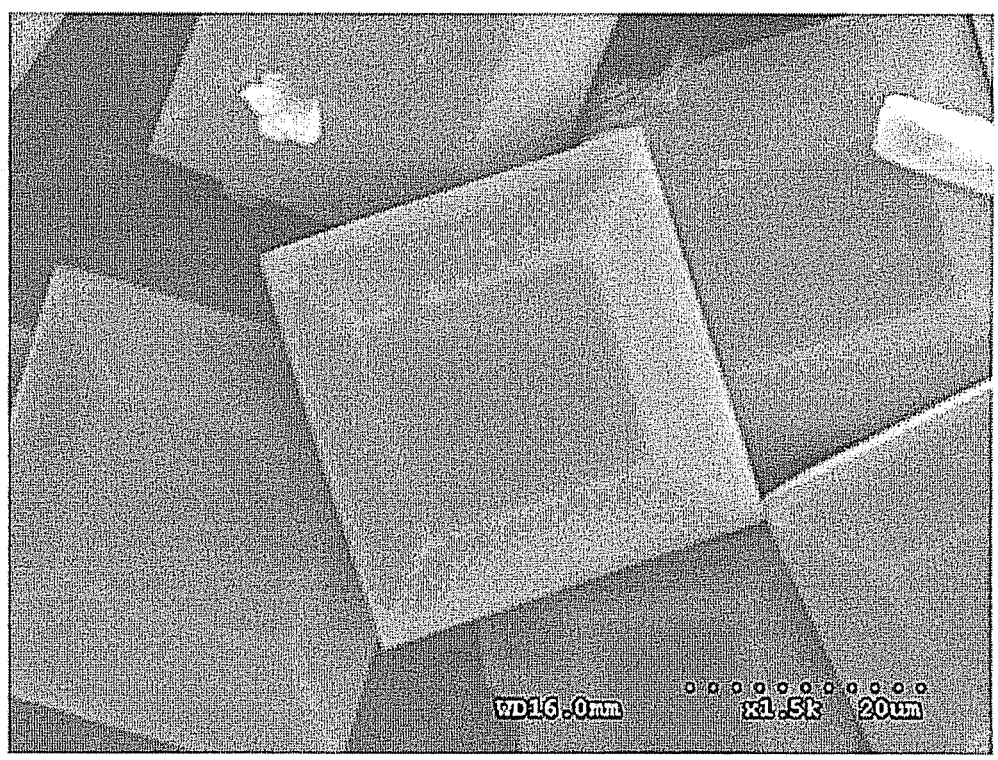
Figure 4C:
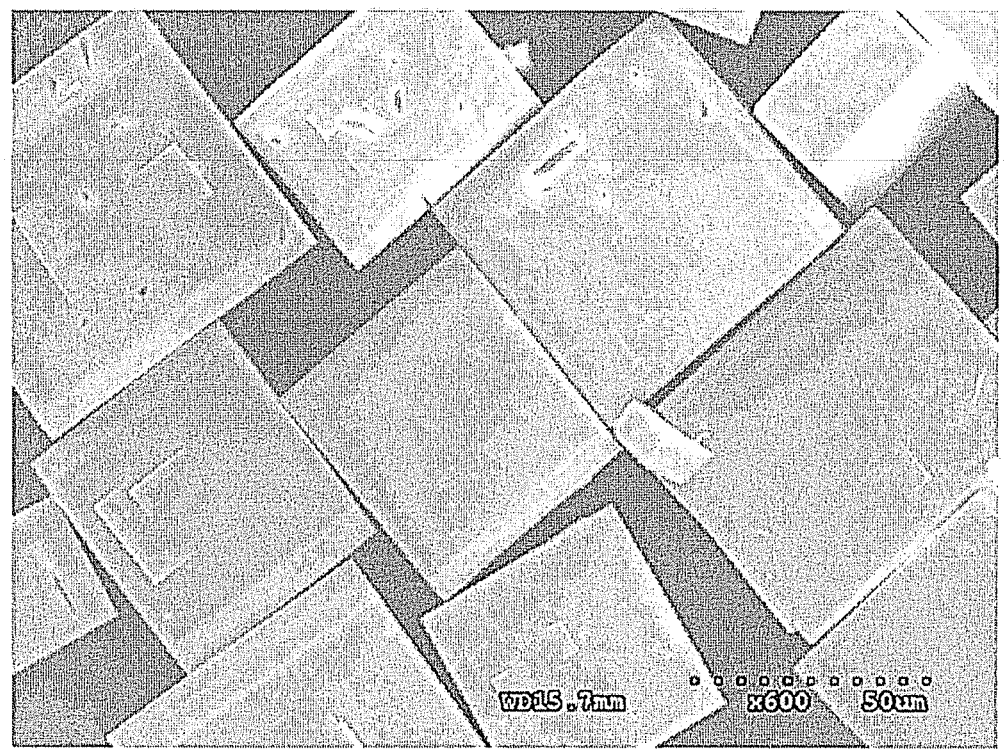

FIG. 3A provides powder X-ray diffraction spectra, FIG. 3B provides an IR spectrum (cubic shape), FIG. 3C provides an IR spectrum (truncated cubic shape) and FIG. 3D provides an IR spectrum (brick shape) of the novel vanadosilicate SVS-3 obtained in accordance with the present example. Analyses of powder X-ray diffraction peaks are shown in Table 4 (cubic shape), Table 5 (truncated cubic shape) and Table 6 (brick shape), respectively. Further, SEM images are shown in FIG. 4A (cubic shape), FIG. 4B (truncated cubic shape) and FIG. 4C (brick shape).

Example 4

Synthesis of Vanadosilicate SVS-X

For a synthesis of a novel vanadosilicate SVS-X, a reaction mixture gel containing $SiO_2$, $V_2O_5$, oxalic acid, NaOH, KF, EtOH and $H_2O$ was prepared. A ratio of the synthesis gel ($SiO_2:V_2O_5:H_2O_4C_2:Na_2O:KF:EtOH:H_2O$) in terms of mole was 4.3:1.00:1.9:4.7:2.9:26:197.

A $Na_2SiO_3$ (about 12.2 g) solution was diluted in deionized water (DDW, about 12 g). In this solution, a dissolved NaOH solution containing NaOH (about 3.6 g) dissolved in DDW (about 20 g) was added with stirring, and the mixture was stirred for about 30 minutes to hydrolyze $Na_2SiO_3$, and thus, a first solution was prepared.

For a preparation of a vanadium source, separately, oxalic acid (about 4.3 g), $V_2O_5$ (about 3.1 g) and DDW (about 20 g) were mixed together to prepare a second solution. The first and second solutions were mixed together with vigorous stirring, and after about 1 hour, a solution of KF containing KF (about 3 g) dissolved in DDW (about 8 g) was added. EtOH (about 20 g) was added in the above mixture after about 30 minutes to obtain a reaction mixture. The mixture was finally aged for about 14 hours at room temperature to obtain a reaction mixture in the form of a gel. Afterwards, the gel was transferred into a 50 ml Teflon-lined stainless steel autoclave and the autoclave was placed in the pre-heated oven at about 220° C. for about 48 hours under static condition. After the reaction, the autoclave was cooled at room temperature, and the SVS-X crystals were collected by centrifuging and washed with copious amount of DDW and dried at about 100° C. for about 1 hour.

Figure 5A:
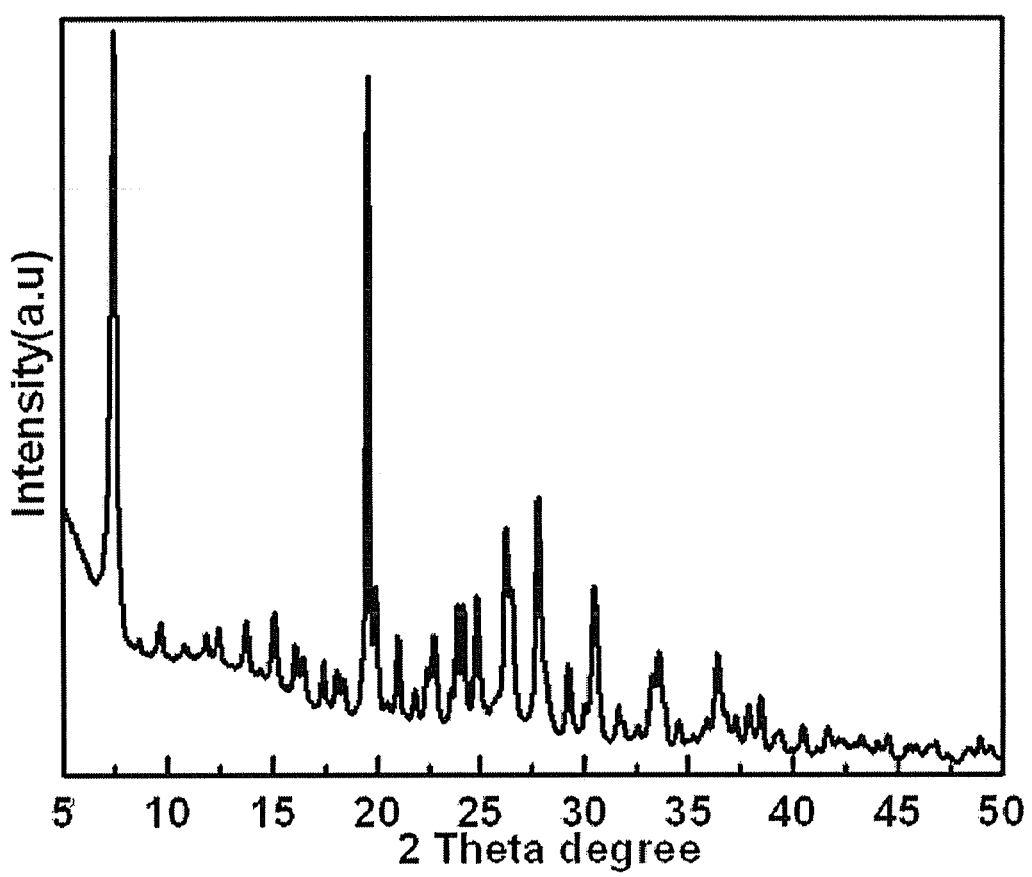
FIGS. 5A and 5B provide (A) powder X-ray diffraction spectrum and (B) SEM image of a vanadosilicate molecular sieve SVS-X in accordance with an example of the present disclosure.
Figure 5B:
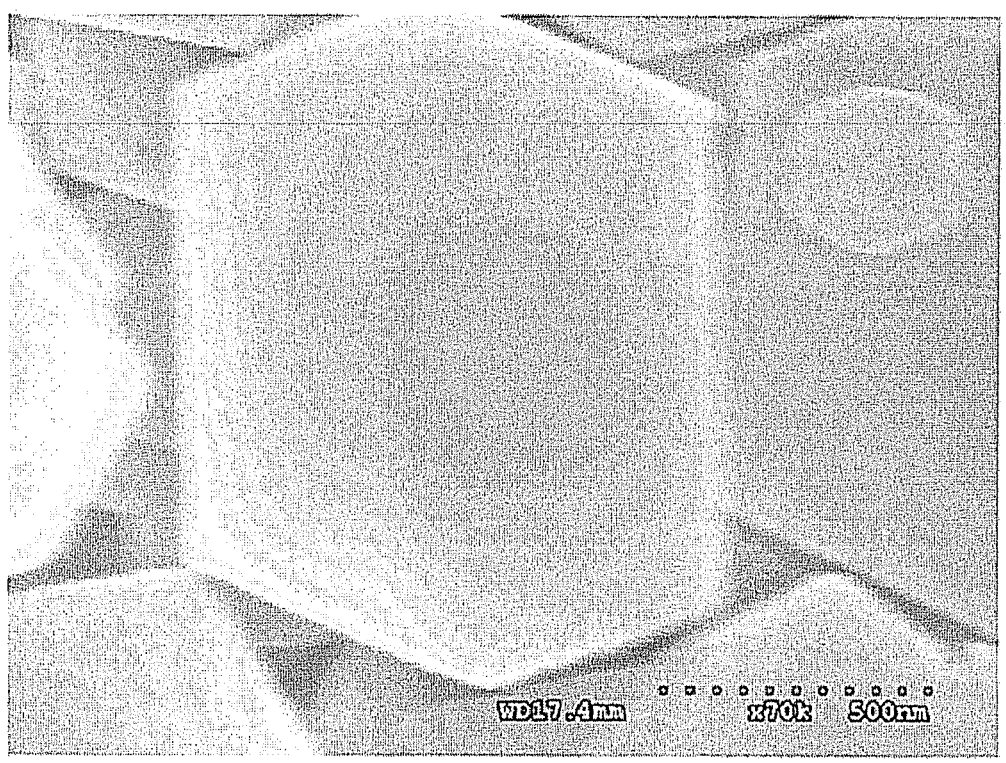

FIG. 5A shows a powder X-ray diffraction spectrum and FIG. 5B shows a SEM image of the novel vanadosilicate SVS-X obtained in accordance with the present example, and an analysis of a powder X-ray diffraction peak is shown in Table 7.

Example 5

Synthesis of Vanadosilicate SVS-Y

For a synthesis of a novel vanadosilicate SVS-Y, a reaction mixture gel containing $SiO_2$, $V_2O_5$, oxalic acid, NaOH, NaCl, and $H_2O$ was prepared. A ratio of the synthesis gel ($SiO_2: V_2O_5:H_2O_4C_2:Na_2O:NaCl:H_2O$) in terms of mole was 6:1.00:3.26:6.6:11:285.

To be specific, $Na_2SiO_3$ (about 12.2 g) solution was diluted in deionized water (DDW, about 12 g). In this solution, a dissolved NaOH solution containing NaOH (about 3.6 g) dissolved in DDW (about 15 g) and a solution of NaCl containing NaCl (8 g) dissolved in DDW (15 g) were added with vigorous stirring to prepare a first solution.

For a preparation of a vanadium source, separately $V_2O_5$ (about 2.2 g), oxalic acid (about 5 g) and DDW (about 20 g) were mixed together to prepare a second solution. The first and second solutions were mixed together with stirring to obtain a reaction mixture. The mixture was finally aged for about 14 hours at room temperature to obtain a reaction mixture in the form of a gel. The gel was transferred into a 50 ml Teflon-lined stainless steel autoclave and the autoclave was placed in the pre-heated oven at about 220° C. for about 48 hours under static condition. After the reaction, the autoclave was cooled at room temperature, and the SVS-Y crystal was collected by centrifuging and washed with copious amount of DDW and dried at about 100° C. for about 1 hour.

Figure 6A:
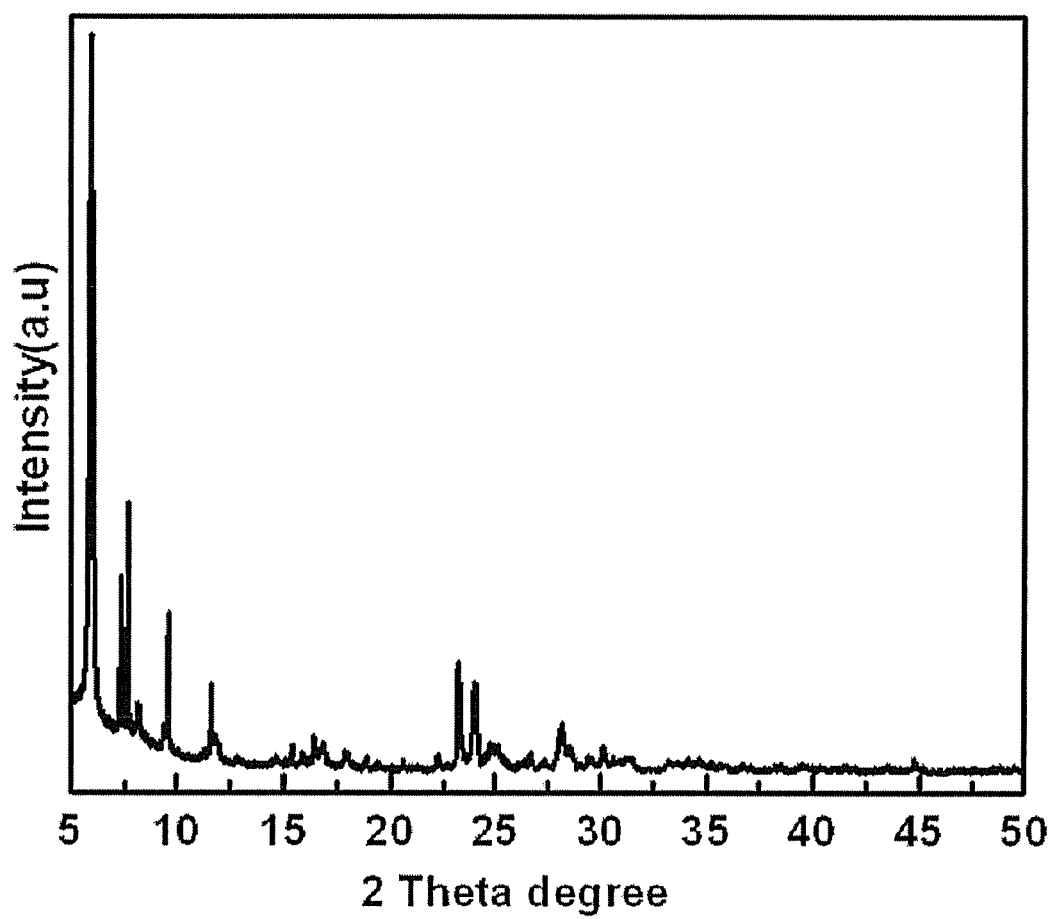
FIGS. 6A and 6B provide (A) powder X-ray diffraction spectrum and (B) SEM image of a vanadosilicate molecular sieve SVS-Y in accordance with an example of the present disclosure.
Figure 6B:
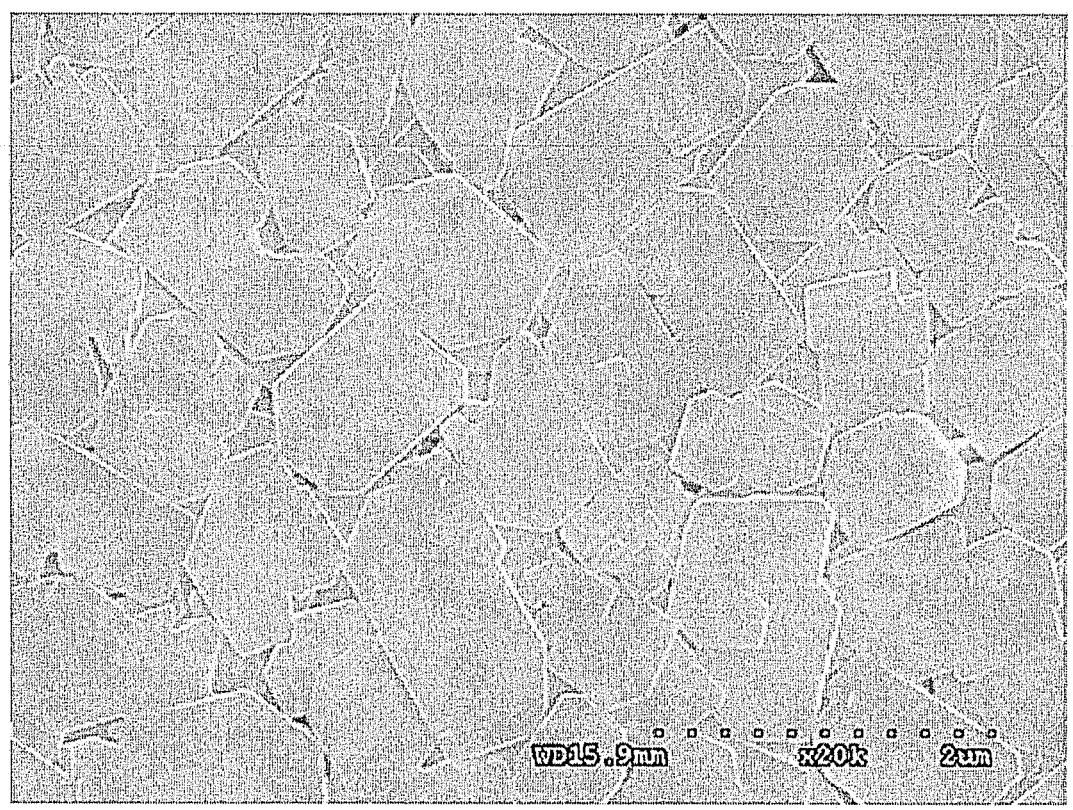

FIG. 6A shows a powder X-ray diffraction spectrum and FIG. 6B shows a SEM image of the novel vanadosilicate SVS-Y obtained in accordance with the present example, and an analysis of a powder X-ray diffraction peak is shown in Table 8.

Example 6

Synthesis of Vanadosilicate SVS-Z

For a synthesis of a novel vanadosilicate SVS-Z, a reaction mixture gel containing $SiO_2$, $V_2O_5$, oxalic acid, NaOH, KF, EtOH, and H$_2$O was prepared. A ratio of the synthesis gel (SiO$_2$:V$_2$O$_5$:H$_2$O$_4$C$_2$:Na$_2$O:KF:EtOH:H$_2$O) in terms of mole was 5.34:1.00:3.44:5.84:5.37:251.

To be specific, Na$_2$SiO$_3$ (about 12.2 g) solution was diluted in deionized water (DDW, about 12 g). In this solution, a dissolved NaOH solution containing NaOH (about 3.6 g) dissolved in DDW (about 20 g) was added with stirring, and the mixture was stirred for about 30 minutes to hydrolyze Na$_2$SiO$_3$, and thus, a first solution was prepared.

For a preparation of a vanadium source, separately V$_2$O$_5$ (about 2.5 g), oxalic acid (about 6 g) and DDW (about 20 g) were mixed together to prepare a second solution. The first and second solutions were mixed together with stirring, and after about 1 hour, a solution of KF containing KF (about 4.5 g) dissolved in DDW (about 10 g) was added to obtain a reaction mixture. The mixture was finally aged for about 14 hours at room temperature to obtain a reaction mixture in the form of a gel. The gel was transferred into a 50 ml Teflon-lined stainless steel autoclave and the autoclave was placed in the pre-heated oven at about 220° C. for about 36 hours under static condition. After the reaction, the autoclave was cooled at room temperature, and the SVS-Z crystals (deep green color) were collected by centrifuging and washed with copious amount of DDW and dried at about 100° C. for about 1 hour.

Figure 7A:
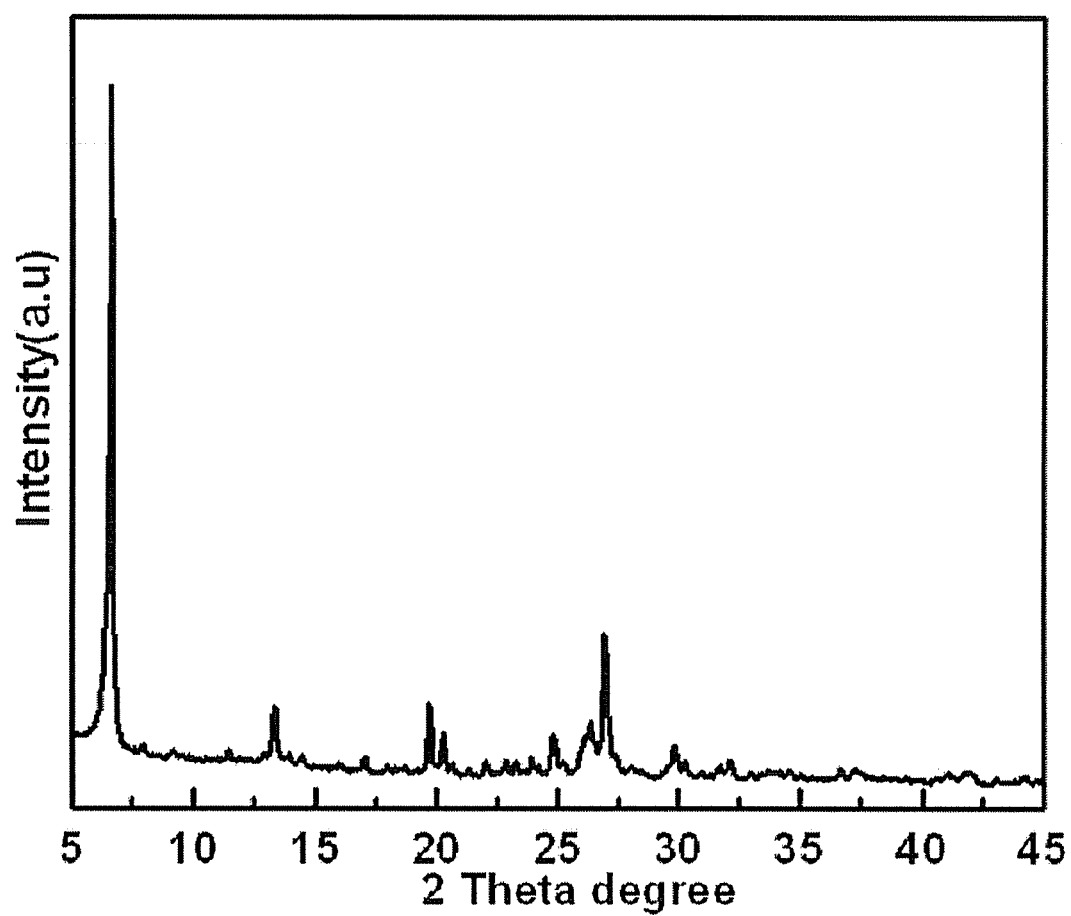
FIGS. 7A and 7B provide (A) powder X-ray diffraction spectrum and (B) SEM image of a vanadosilicate molecular sieve SVS-Z in accordance with an example of the present disclosure.
Figure 7B:
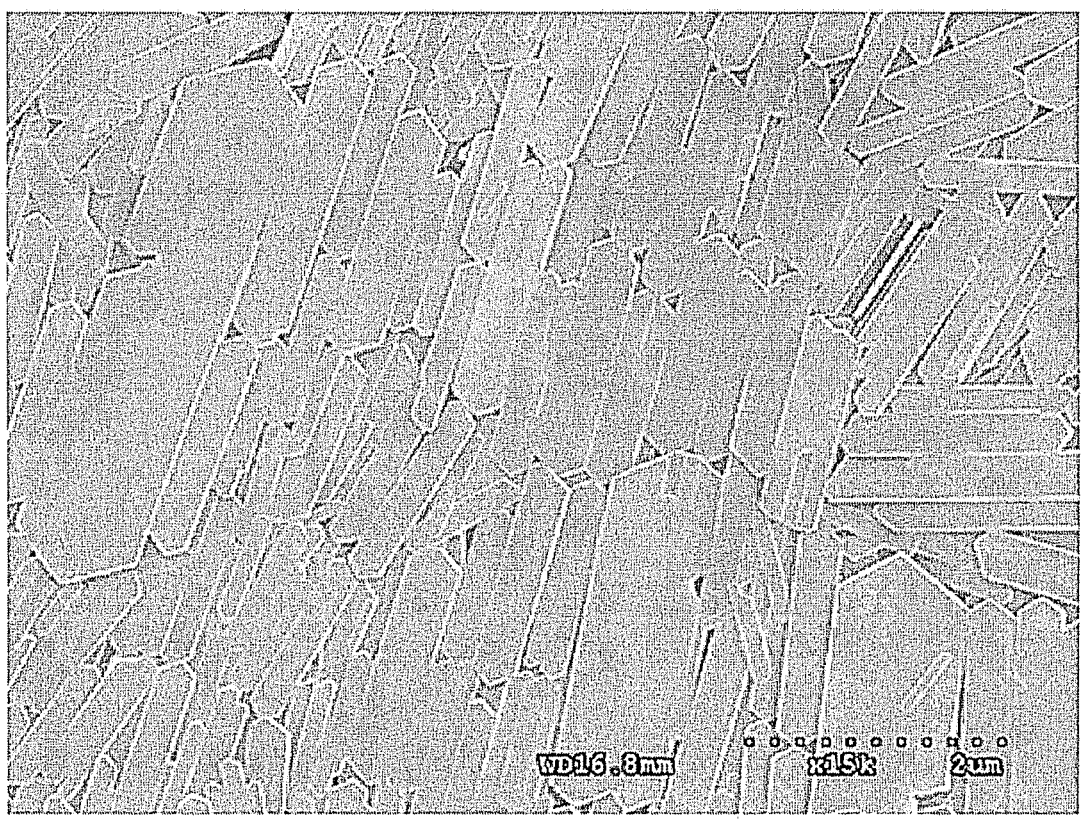

FIG. 7A shows a powder X-ray diffraction spectrum and FIG. 7B shows a SEM image of the novel vanadosilicate SVS-Z obtained in accordance with the present example, and an analysis of a powder X-ray diffraction peak is shown in Table 9.

Example 7

Synthesis of Vanadosilicate AM-6-(Y)

For a synthesis of AM-6-(Y), a reaction mixture gel containing Na$_2$SiO$_3$, V$_2$O$_5$, H$_2$SO$_4$, KOH, EtOH and DDW was prepared. A ratio of the gel (SiO$_2$:V$_2$O$_5$:H$_2$SO$_4$:Na$_2$O:K$_2$O:EtOH:H$_2$O) in terms of mole was 6.07:1.00:3.61:2.94:3.1:7.2:415.

To be specific, Na$_2$SiO$_3$ (about 12.2 g of from about 17 wt % to about 19 wt of Na$_2$O and from about 35 wt to about 38 wt % of SiO$_2$) was dissolved in DDW (about 40 g). A KOH solution of KOH (about 4.4 g) dissolved in DDW (about 40 g) was added to the diluted solution with stirring and the solution was stirred for about 1 hour to hydrolyze Na$_2$SiO$_3$, and thus, a first solution was prepared.

For a preparation of a vanadium source, separately V$_2$O$_5$ (about 1.9 g), H$_2$SO$_4$ (about 4.5 g), EtOH (about 4 g) and DDW (about 10 g) were mixed together in a 25 ml round bottle flask and the mixture was refluxed around 100° C. for about 1 hour to prepare a second solution. The yellow V$_2$O$_5$ powder was fully dissolved and made deep blue solution. The solution was then cooled at room temperature and added to the first solution in drop wise slowly to obtain a reaction mixture. The mixture was aged for about 14 hours at room temperature to obtain a reaction mixture in the form of a gel. After aging, without adding any seed ETS-10 crystal, the reaction mixture gel was transferred into a 50 ml Teflon-lined autoclave and the autoclave was placed in pre-heated oven at about 220° C. for about 22 hours under static condition. After the reaction, the autoclave was cooled with water at room temperature, and the AM-6-(Y) crystals were collected by centrifuging and washed with copious amount of DDW and dried at about 100° C. for about 1 hour.

Figure 8:
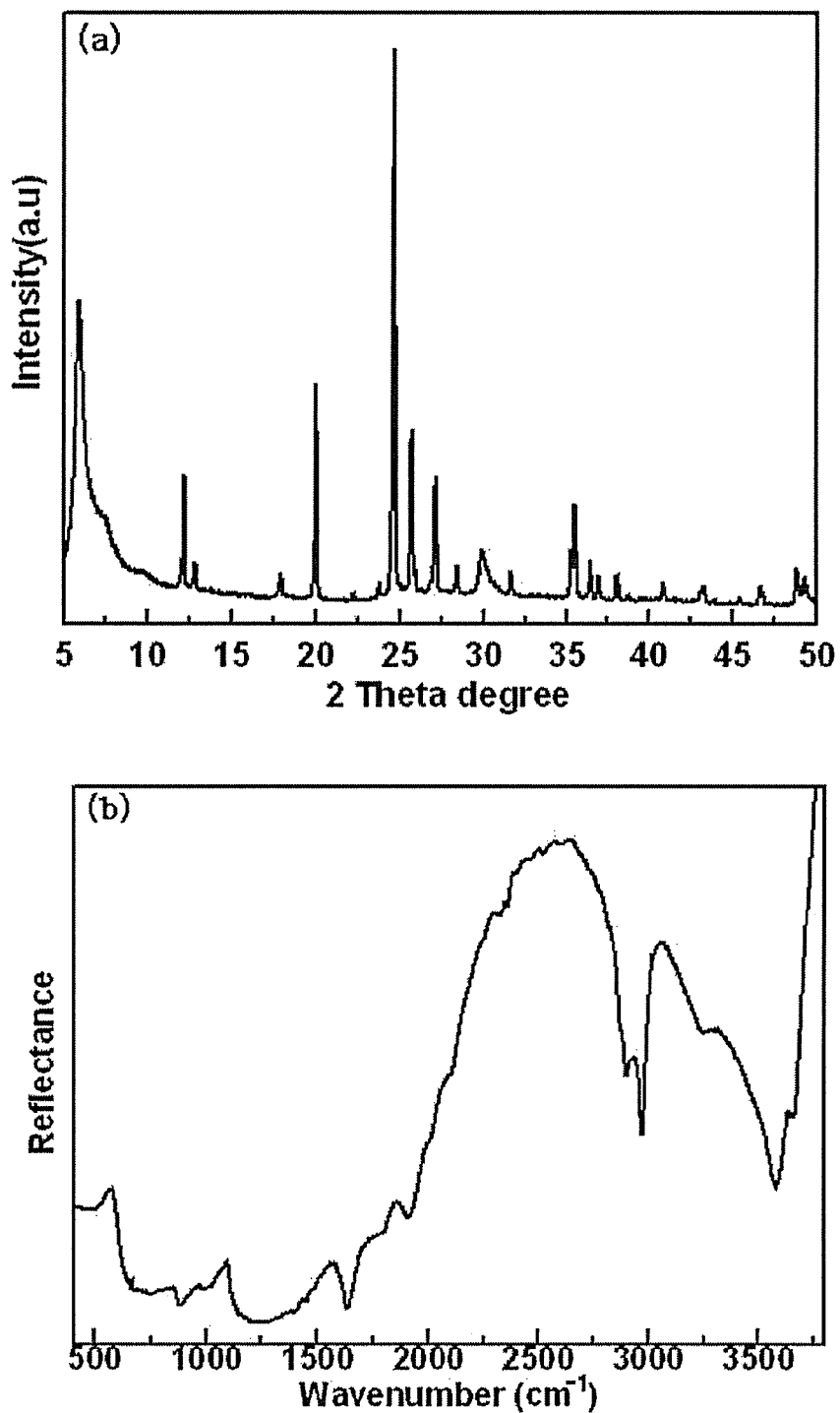
FIG. 8 provides (a) powder X-ray diffraction spectrum and (b) IR spectrum of a vanadosilicate molecular sieve AM-6-(Y) prepared in accordance with an example of the present disclosure.
Figure 9A:
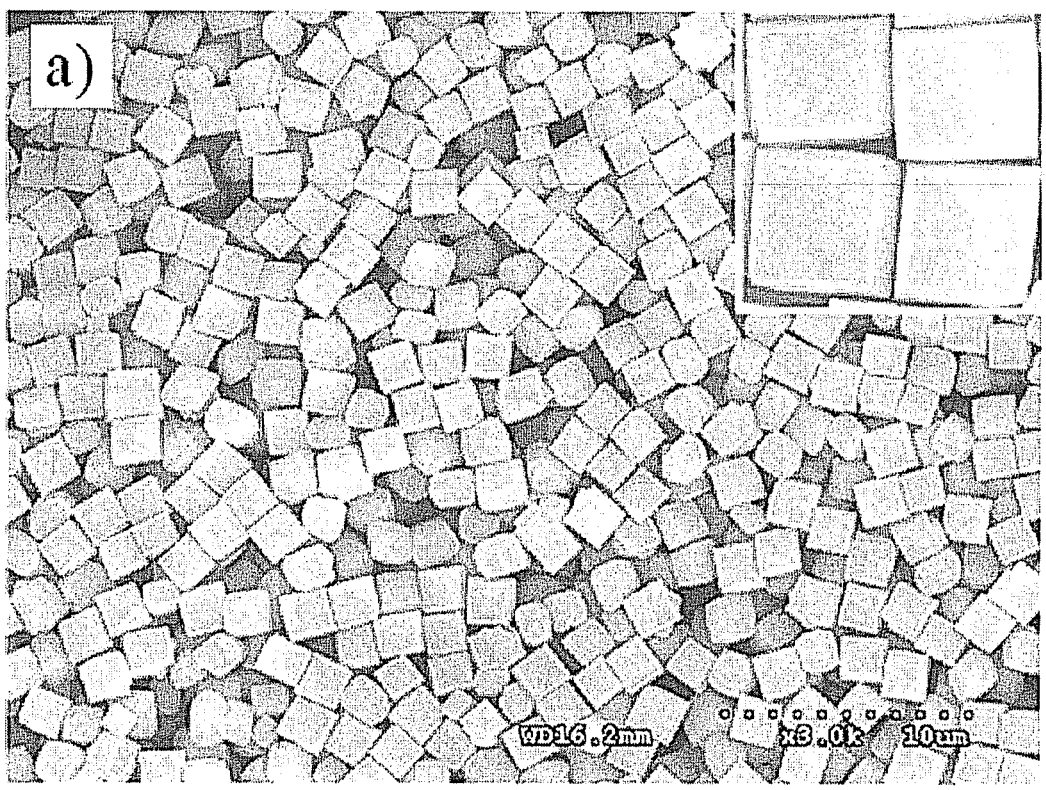
FIGS. 9A to 9C provides (A) SEM image of the vanadosilicate molecular sieve AM-6-(Y) prepared in accordance with the example of the present disclosure, (B) SEM image of a vanadosilicate molecular sieve AM-6-(RA) prepared as a comparison sample and (C) SEM image of a vanadosilicate molecular sieve AM-6-(S)-TMA prepared as a comparison sample.
Figure 10:
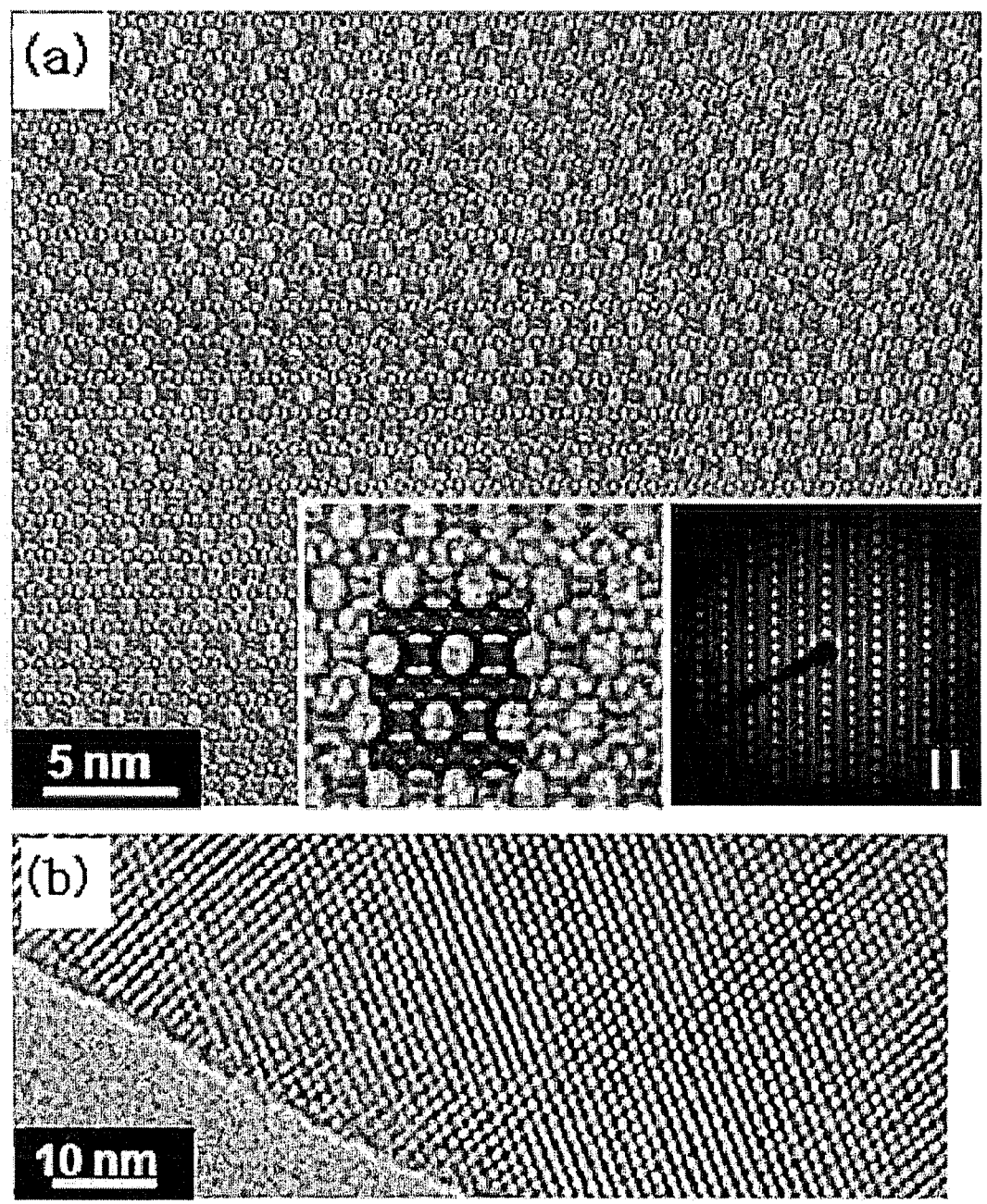
FIG. 10 provides TEM images along directions of (a) and (b) [001] of the vanadosilicate molecular sieve AM-6-(Y) prepared in accordance with the example of the present disclosure.

FIGS. 8(a) and 8(b) respectively show a powder X-ray diffraction spectrum and an IR spectrum of the novel vanadosilicate AM-6-(Y) obtained in accordance with the present example, and an analysis of a powder X-ray diffraction peak is shown in Table 1. A SEM image is shown in FIG. 9A and TEM images along directions of [110] and [001] are shown in FIGS. 10(a) and 10(b), respectively.

Comparative Example 1

Synthesis of Vanadosilicate AM-6-(RA) (3 μm and 5 μm)

A procedure for a synthesis of 3 μm of AM-6-(RA) was followed by a procedure for a synthesis of 3 μm of AM-6 of Rocha and Anderson. A mole ratio of a reaction mixture gel (Na$_2$O:K$_2$O:SiO$_2$:V$_2$O$_5$:H$_2$O) was 1.0:0.23:0.97:0.10:30.

A procedure for a preparation of the above reaction mixture gel is briefly as below.

In a Na$_2$SiO$_3$ (about 18.78 g of about 8 wt % Na$_2$O and about 27 wt % SiO$_2$) solution, sequently, a dissolved NaOH solution containing NaOH (about 0.60 g) dissolved in DDW (about 4.5 g), a dissolved KCl solution containing KCl (about 3 g) dissolved in DDW (about 4.5 g) and a NaCl solution containing NaCl (about 9.24 g) dissolved in DDW (about 15 g) were added with stirring to prepare a first solution.

For a preparation of a vanadium source, a second solution was prepared by the dissolving VOSO$_4$ (about 4.5 g) in DDW (about 23 g).

The first and second solutions were mixed together and aged for about 12 hours at room temperature to obtain a reaction mixture in the form of a gel. After aging, the reaction mixture gel was divided into the two parts, one part added with about 0.1 g of ETS-10 seed and another part without being added with any ETS-10 seed. These two gels were separately transferred into 50 ml Teflon-lined autoclave and the autoclave was heated in a pre-heated oven at about 230° C. for about 3 days under static condition to perform the hydrothermal reaction. After the hydrothermal reaction, the autoclave was cooled with water. The reaction mixture were collected with the mixture of a few amount of pale green AM-6 (not visible) crystals and the major phase of sky-blue unreacted gel or some unknown phase. These mixtures were washed several times until a pH of the solution becomes neutral, and allowed for sedimentation. After the sedimentation (around 2 hours), an upper sky-blue liquid part were removed and a lower part of a small amount of AM-6 crystals was collected and washed with copious amount of DDW and dried at about 100° C. for about 1 hour.

In a case of the gel which contains no ETS-10 seed crystal, no any sedimentated crystal such as AM-6 was found.

A synthesis of 5 μm of AM-6-(RA) was carried out in the same manner as described above except that about 3 g of NaCl was used instead of about 9.24 g of NaCl into the above reaction mixture gel.

Figure 9B:
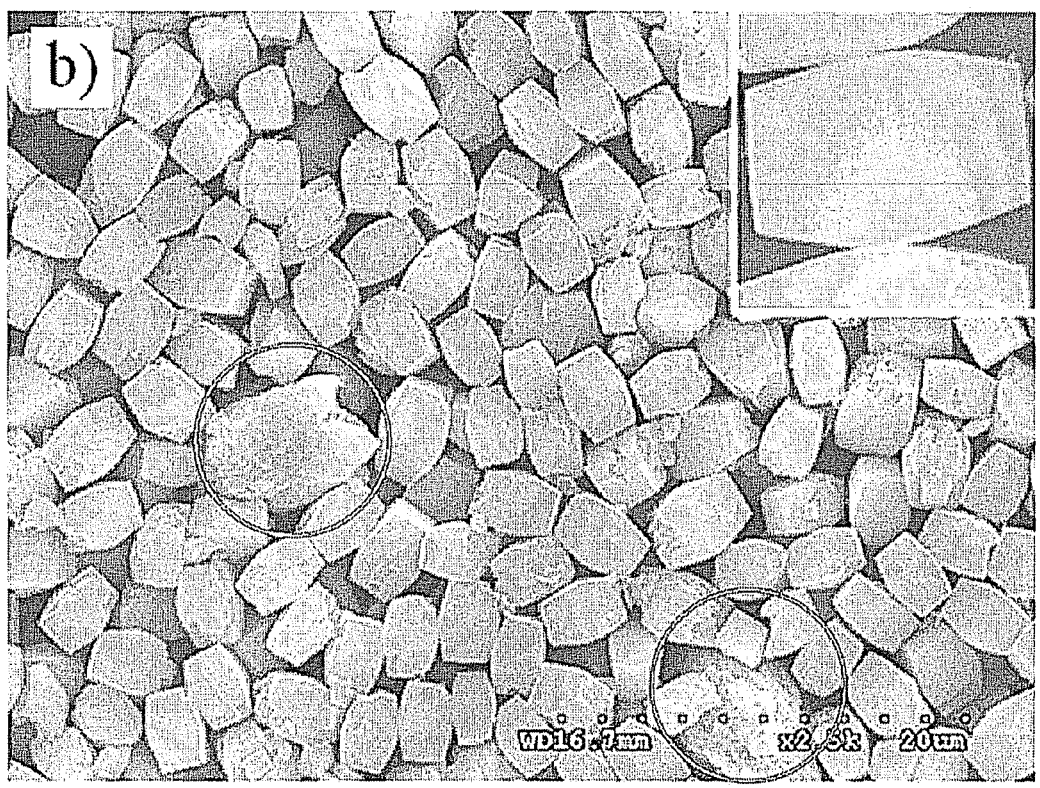
Figure 11:
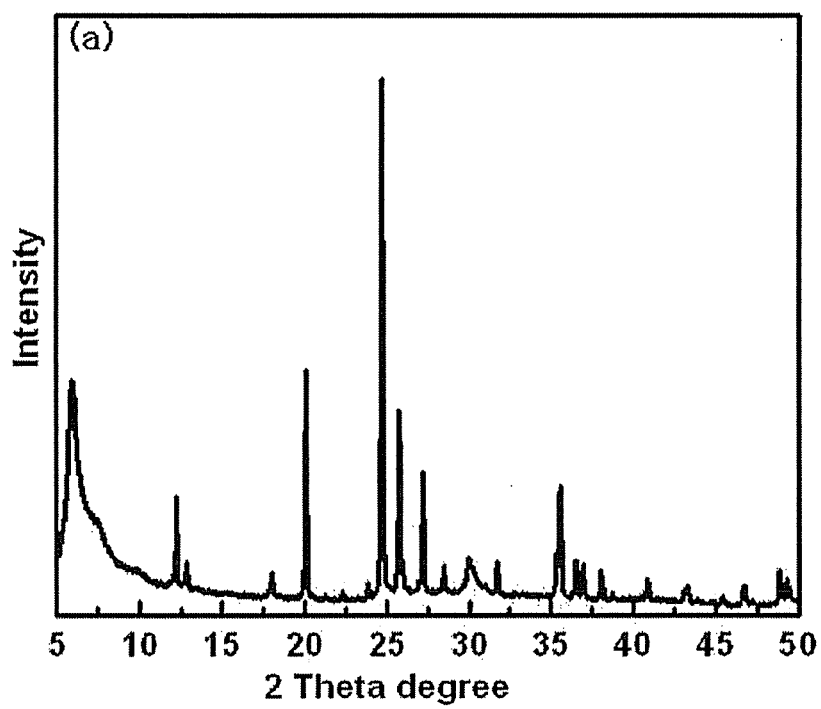
FIG. 11 provides (a) powder X-ray diffraction pattern and (b) IR spectrum of the vanadosilicate molecular sieve AM-6-(RA) of 3 μm prepared as a comparison sample.
Figure 11:
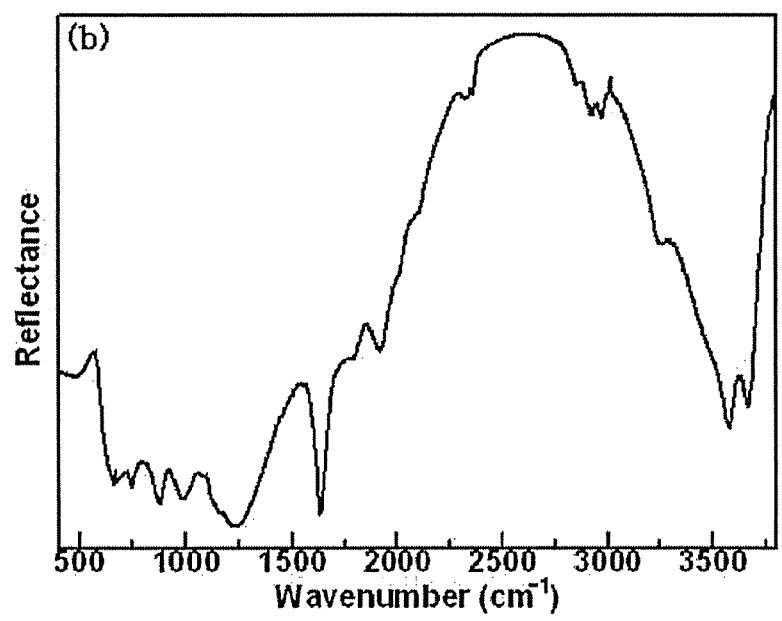

FIGS. 11(a) and 11(b) respectively show a powder X-ray diffraction spectrum and an IR spectrum of 3 μm of a vanadosilicate AM-6-(RA) obtained in accordance with the present comparison example, and an analysis of a powder X-ray diffraction peak is shown in the following Table 12. A SEM image is shown in FIG. 9B.

TABLE 12

| 2θ | d/Å | Relative Intensity |
|---|---|---|
| 5.92 | 14.95 | 42.15 |
| 12.24 | 7.22 | 19.42 |
| 12.84 | 6.86 | 6.94 |
| 17.94 | 4.93 | 4.14 |
| 20.04 | 4.42 | 43.89 |
| 24.70 | 3.60 | 100.00 |
| 25.74 | 3.46 | 35.98 |

TABLE 12-continued

| 2θ | d/Å | Relative Intensity |
|---|---|---|
| 27.18 | 3.27 | 24.10 |
| 28.42 | 3.13 | 5.36 |
| 29.92 | 2.99 | 7.09 |
| 31.66 | 2.83 | 6.03 |
| 35.54 | 2.52 | 21.37 |
| 36.48 | 2.46 | 7.21 |
| 36.92 | 2.44 | 6.67 |
| 38.02 | 2.36 | 3.88 |
| 40.80 | 2.20 | 3.30 |
| 43.24 | 2.08 | 1.89 |
| 46.72 | 1.94 | 2.33 |
| 48.84 | 1.87 | 5.23 |

Comparative Example 2

Synthesis of Vanadosilicate AM-6-(S)-TMA

For a synthesis of AM-6-(S)-TMA, a reaction mixture gel containing $Na_2SiO_3$, $VOSO_4$, NaCl, KCl, TMAOH and DDW was prepared. A ratio of the synthesis gel ($Na_2O:K_2O:SiO_2:V_2O_5:TMA:H_2O$) in terms of mole was 4.5:1.3:4.85:0.5:2.2:209.

A procedure for a preparation of the gel for AM-6-(S)-TMA is as below.

Solution A containing sodium chloride (about 6.42 g), potassium chloride (about 3.43 g), TMAOH (about 14.57 g) (aqueous solution of about 25 wt % of tetramethylammonium hydroxide), sodium silicate (about 18 g, N-brand) and DDW (about 20 g) was prepared and vigorously stirred until the solution become transparent. Then, solution B prepared by dissolving about 4.49 g of $VOSO_4.5H_2O$ (Aldrich) in about 23.0 g of deionized water was added to the solution A and the resulting mixture (olive green gel) was finally aged for about 16 hours. After aging, the gel was transferred into 50 ml Teflon-lined autoclave and the autoclave was placed in pre-heated oven at about 230° C. for about 72 hours under static condition. After the reaction, the autoclave was cooled with water. The AM-6-(S)-TMA crystals were collected by centrifuging and washed with copious amount of DDW and dried at about 100° C. for about 1 hour to obtain AM-6-(S)-TMA crystals.

Figure 9C:
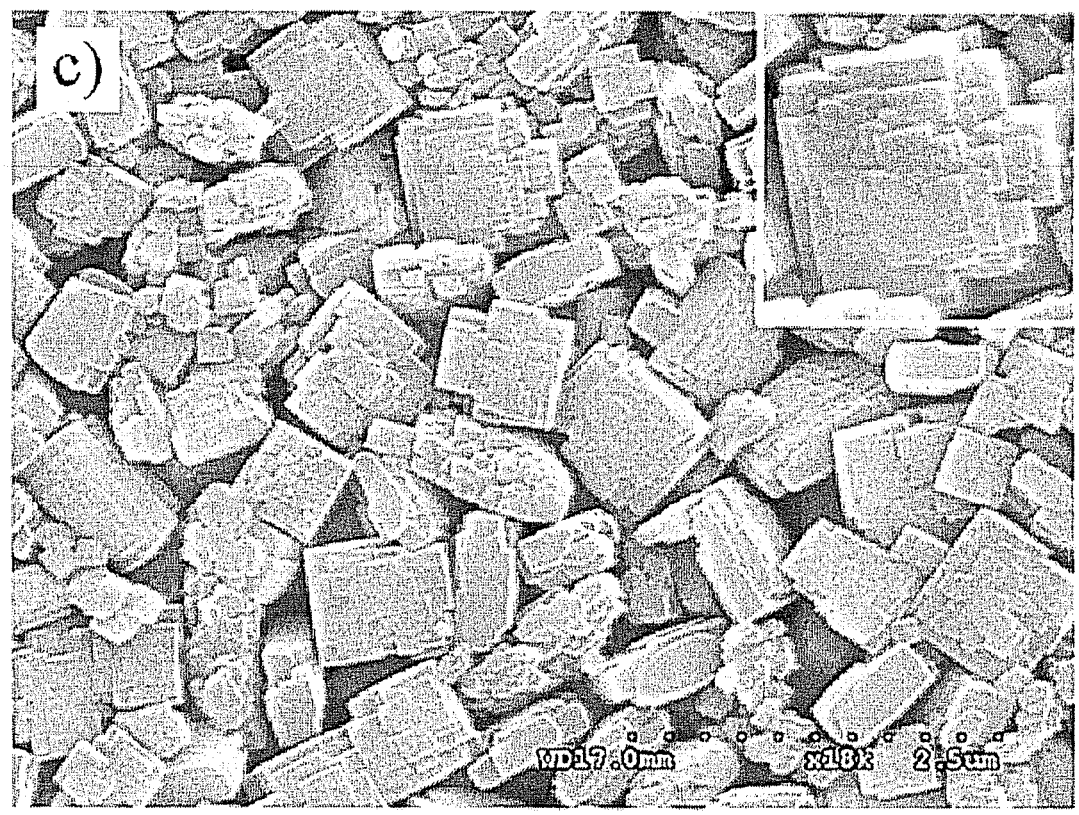

A SEM image of the AM-6-(S)-TMA obtained in accordance with the present Comparative Example can be seen in FIG. 9C.

Example 8

Synthesis of Vanadosilicate VSH-1

For a synthesis of VSH-1, a reaction mixture gel containing $SiO_2$, $V_2O_5$, oxalic acid, KOH, KCl, EtOH and $H_2O$ was prepared. A ratio of the synthesis gel ($SiO_2:V_2O_5:H_2O_4C_2:K_2O:KCl:EtOH:H_2O$) in terms of mole was 4.31:1.00:3.05:5.19:3.16:20:360.

For a synthesis of VSH-1, Ludox (about 5.5 g) was diluted in deionized water (DDW, about 50 g). In this solution, a KOH solution containing KOH (about 5.2 g) dissolved in DDW (about 10 g) was added with stirring, and the mixture was stirred for about 30 minutes. A diluted KCl solution containing KCl (about 1.5 g) dissolved in DDW (about 5 g) was added into the above solution to prepare a first solution.

For a preparation of a vanadium source, separately, $V_2O_5$ (about 2.7 g), oxalic acid (about 3.3 g) and DDW (about 10 g) were mixed together to prepare a second solution. The second solution was added to the first solution drop wise slowly. EtOH (about 7.5 g) was added in the above mixture after about 1 hour to obtain a reaction mixture. The mixture was finally aged for about 10 hours at room temperature to obtain a reaction mixture in the form of a gel. The gel was transferred into a 50 ml Teflon-lined stainless steel autoclave and the autoclave was placed in the pre-heated oven at about 210° C. for about 30 hours under static condition. After cooling it at room temperature, the VSH-1 was collected by centrifuging and washed with copious amount of DDW and dried at about 100° C. for about 1 hour.

Figure 12A:
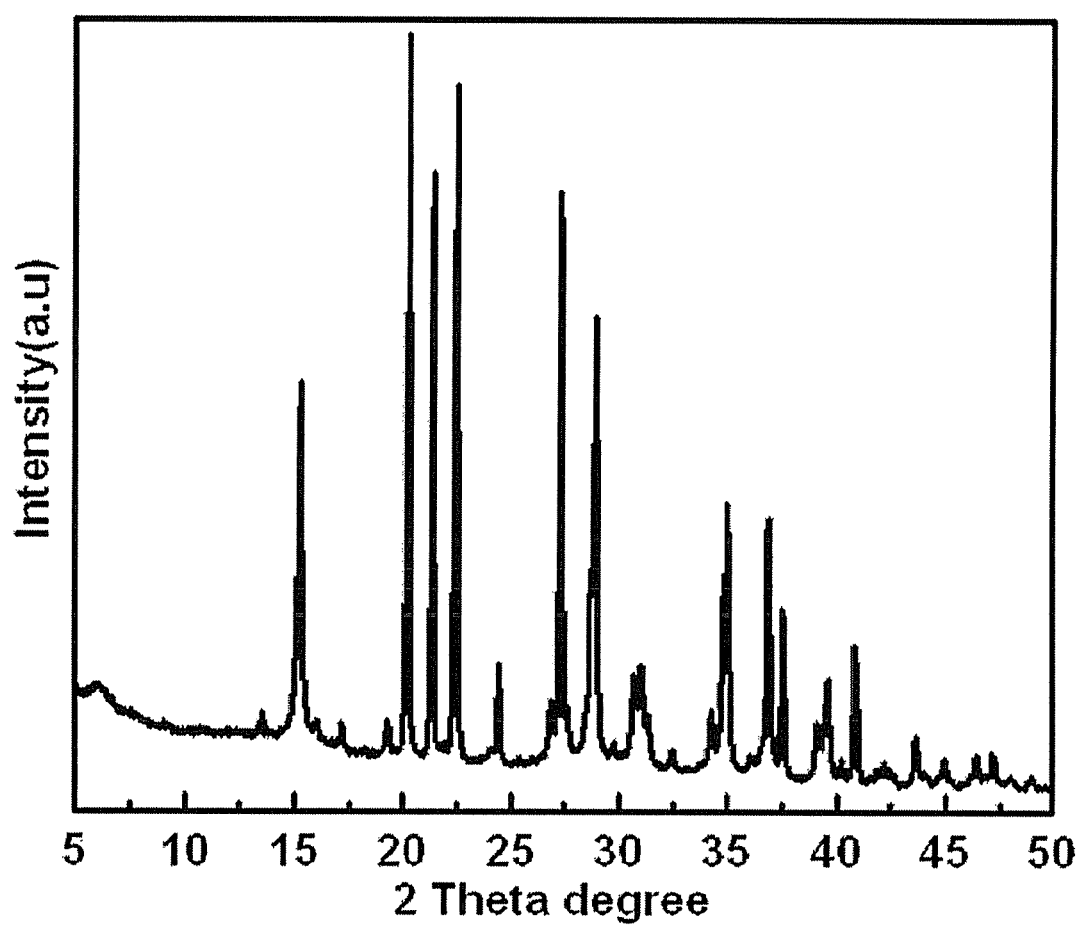
FIGS. 12A to 12C provide (A) powder X-ray diffraction pattern, (B) IR spectrum and (C) SEM image of a vanadosilicate molecular sieve VSH-1 prepared in accordance with an example of the present disclosure.
Figure 12B:
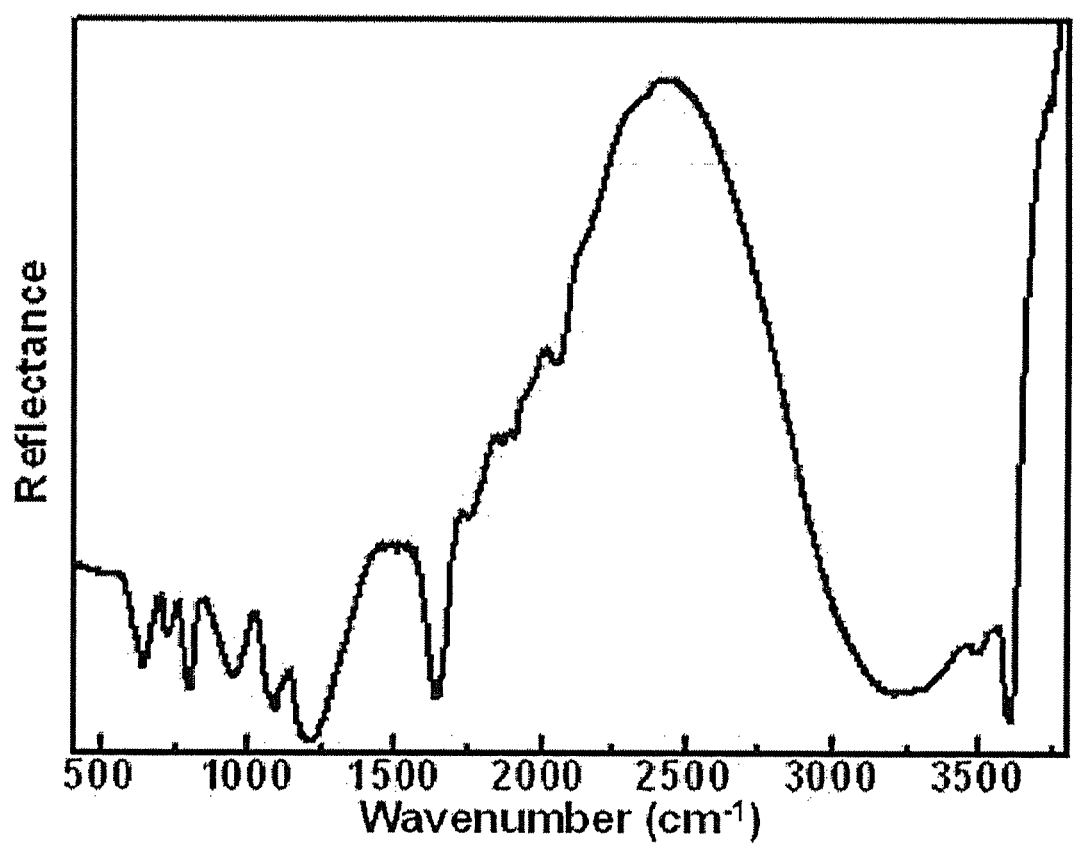
Figure 12C:
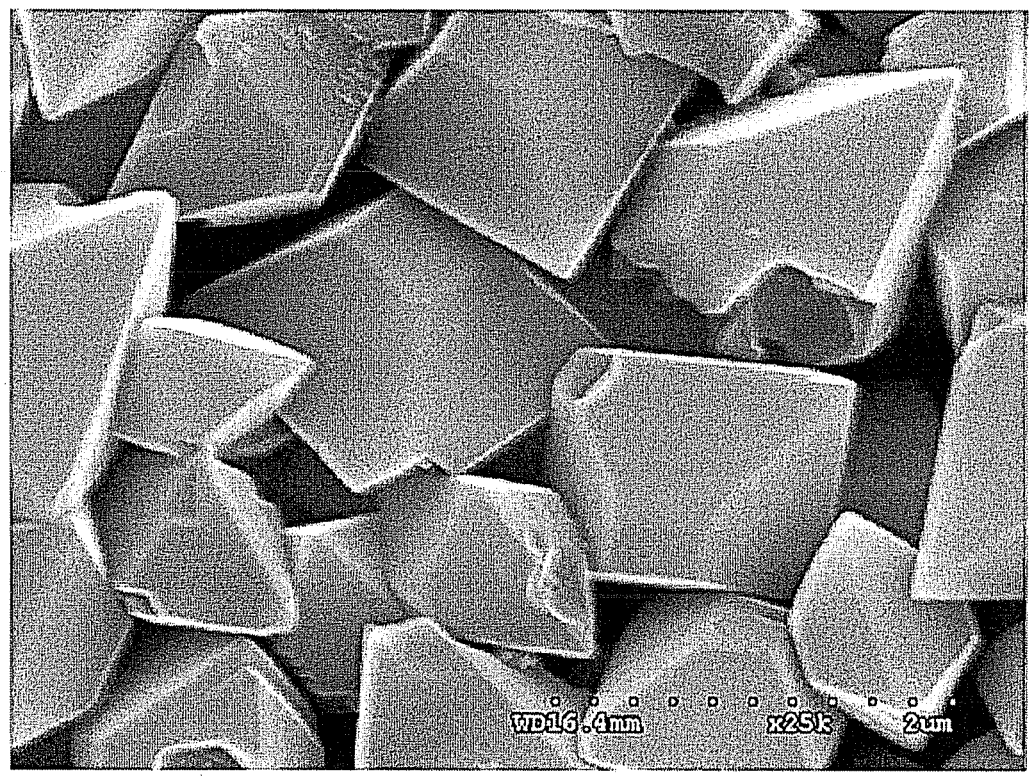

FIGS. 12(a) and 12(b) respectively show a powder X-ray diffraction spectrum and an IR spectrum of the vanadosilicate VSH-1 obtained in accordance with the present example, and a SEM image is shown in FIG. 12C. An analysis of a powder X-ray diffraction peak is shown in the following Table 13.

TABLE 13

| 2θ | d/Å | Relative Intensity |
|---|---|---|
| 13.54 | 6.53 | 12.94 |
| 15.28 | 5.79 | 55.23 |
| 17.18 | 5.15 | 11.45 |
| 19.30 | 4.59 | 11.47 |
| 20.26 | 4.37 | 100.00 |
| 21.40 | 4.14 | 82.21 |
| 22.48 | 3.95 | 93.43 |
| 24.46 | 3.63 | 19.07 |
| 26.86 | 3.31 | 13.83 |
| 27.32 | 3.26 | 79.59 |
| 28.70 | 3.10 | 31.27 |
| 28.92 | 3.08 | 63.58 |
| 29.14 | 3.06 | 10.759 |
| 30.68 | 2.91 | 17.88 |
| 31.02 | 2.88 | 18.94 |
| 31.14 | 2.86 | 13.23 |
| 32.44 | 2.75 | 7.79 |
| 34.26 | 2.61 | 13.23 |
| 34.98 | 2.56 | 39.66 |
| 36.88 | 2.43 | 37.72 |
| 37.54 | 2.39 | 26.09 |
| 39.10 | 2.30 | 11.61 |
| 39.58 | 2.27 | 16.80 |
| 40.84 | 2.20 | 21.47 |
| 42.14 | 2.14 | 6.19 |
| 43.62 | 2.07 | 9.93 |
| 44.92 | 2.01 | 6.62 |
| 46.40 | 1.95 | 7.18 |
| 47.16 | 1.92 | 7.72 |

Example 9

Synthesis of Vanadosilicate VSH-2

For a synthesis of VSH-2, a reaction mixture gel containing $SiO_2$, $V_2O_5$, oxalic acid, CsOH, and $H_2O$ was prepared. A ratio of the synthesis gel ($SiO_2:V_2O_5:H_2O_4C_2:Cs_2O:H_2O$) in terms of mole was 5.4:1.00:4.01:1.3:264.

Ludox (about 5.5 g) was diluted in water (DDW, about 5 g) and a solution of CsOH containing CsOH (about 6 g) dissolved in DDW (about 15 g) was added with stirring. The mixture was stirred for about 1 hour to prepare a first solution. A vanadium source was prepared by the mixing of $V_2O_5$ (about 2.7 g), oxalic acid (about 3.5 g) and DDW (about 10 g), and thus, a second solution was prepared. The first and second solutions were mixed together and stirred for about 16 hours at room temperature to obtain a reaction mixture in the form of a gel. The gel was transferred into a 50 ml Teflon-lined stainless steel autoclave and it was placed in the pre-heated oven at about 220° C. for about 36 hours under static condition to perform the hydrothermal reaction. After the hydrothermal reaction, the VSH-2 was collected by centrifuging and washed with copious amount of DDW and dried at about 100° C. for about 1 hour.

Figure 13A:
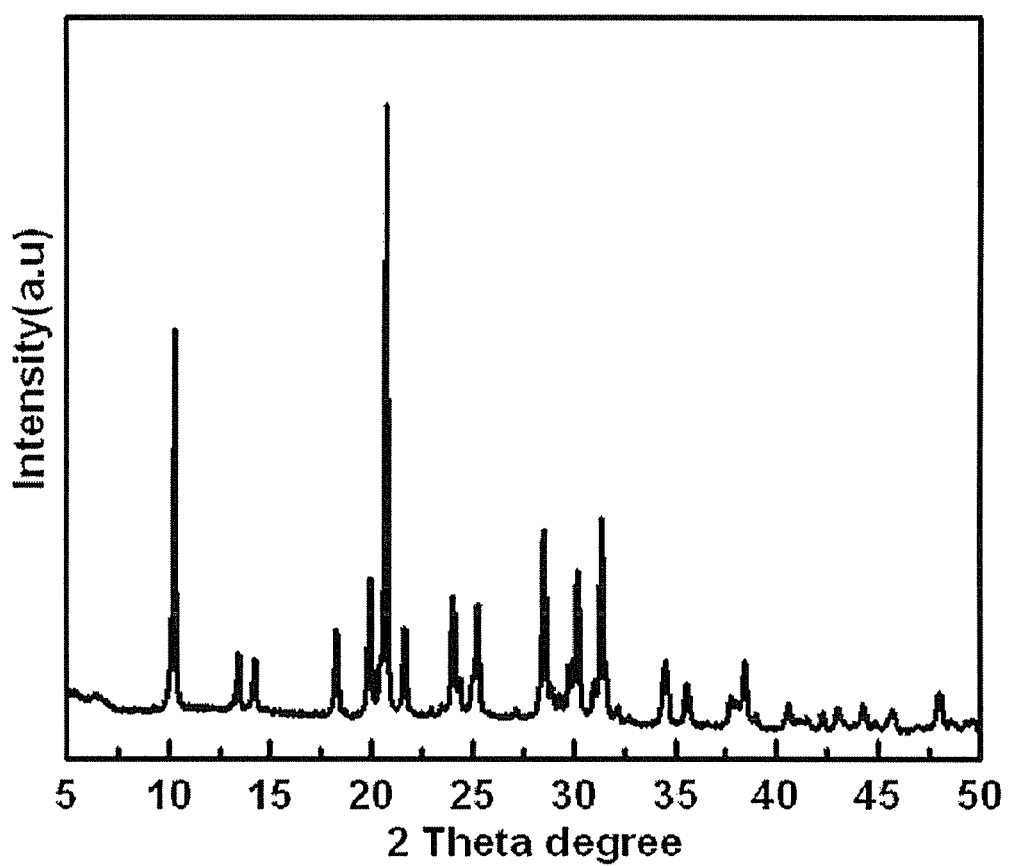
FIGS. 13A to 13C provide (A) powder X-ray diffraction pattern, (B) IR spectrum and (C) SEM image of a vanadosilicate molecular sieve VSH-2 prepared in accordance with an example of the present disclosure.
Figure 13B:
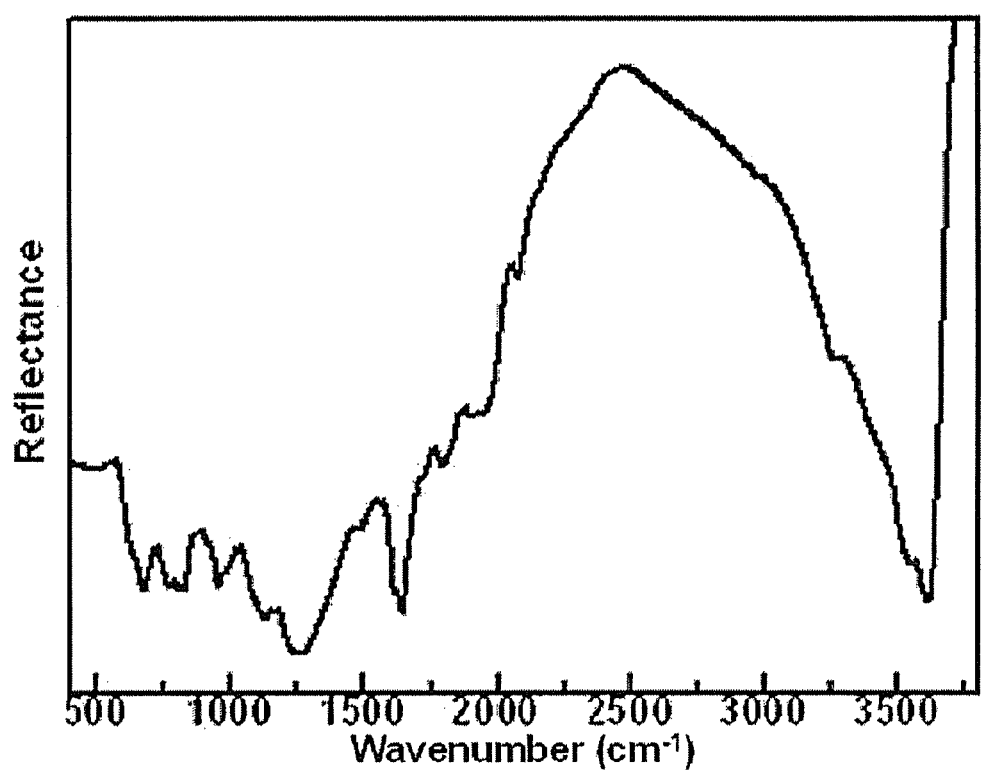
Figure 13C:
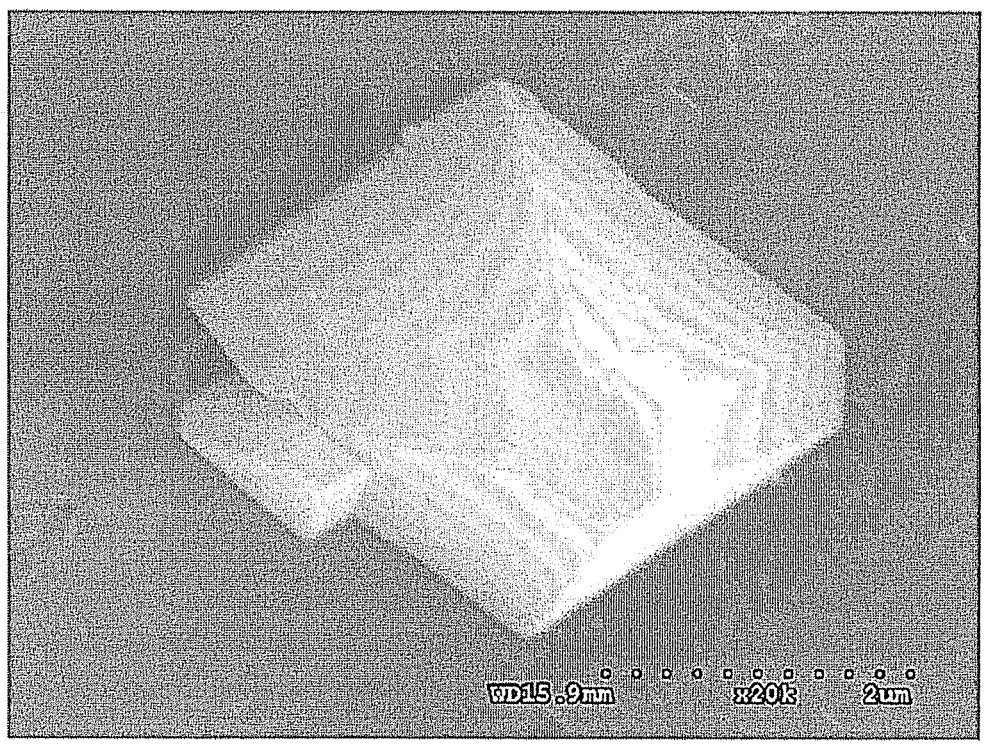

FIGS. 13(a) and 13(b) respectively show a powder X-ray diffraction spectrum and an IR spectrum of the vanadosilicate VSH-2 obtained in accordance with the present example, and a SEM image is shown in FIG. 13C. An analysis of a powder X-ray diffraction peak can be seen in the following Table 14.

TABLE 14

| 2θ | d/Å | Relative Intensity |
|---|---|---|
| 10.30 | 8.58 | 65.47 |
| 13.42 | 6.59 | 16.21 |
| 14.20 | 6.23 | 15.29 |
| 18.26 | 4.85 | 19.80 |
| 19.90 | 4.45 | 27.53 |
| 20.74 | 4.28 | 100.00 |
| 21.62 | 4.10 | 20.07 |
| 24.04 | 3.69 | 24.73 |
| 25.24 | 3.52 | 23.73 |
| 28.52 | 3.12 | 35.09 |
| 29.76 | 2.99 | 14.50 |
| 30.16 | 2.96 | 28.76 |
| 31.34 | 2.85 | 36.87 |
| 34.52 | 2.59 | 14.85 |
| 35.56 | 2.52 | 11.46 |
| 37.72 | 2.38 | 9.54 |
| 38.42 | 2.34 | 14.64 |
| 47.92 | 1.89 | 10.18 |

Example 10

Synthesis of Vanadosilicate VSH-3

For a synthesis of VSH-3, a reaction mixture gel containing $Na_2SiO_3$, $V_2O_5$, $V_2SO_4$, KOH, EtOH and DDW was prepared. A ratio of the synthesis gel ($SiO_2:V_2O_5:V_2SO_4:Na_2O:K_2O:KF:EtOH:H_2O$) in terms of mole was 5.35:1.00:3.25:1.3:4.6:1.2:8:365.

$Na_2SiO_3$ (about 6.1 g of about 17 wt % to about 19 wt % of $Na_2O$ and about 35 wt % to about 38 wt % of $SiO_2$) and Ludox (about 5.5 g) was dissolved in DDW (about 40 g). A KOH solution containing KOH (about 6 g) dissolved in DDW (about 40 g) was added to the above solution with stirring and the solution was vigorously stirred for about 1 hour to hydrolyze $Na_2SiO_3$, and thus, a first solution was prepared.

For a preparation of a vanadium source, separately, $V_2O_5$ (about 2.5 g), $H_2SO_4$ (about 4.6 g), EtOH (about 5 g) and DDW (about 10 g) were mixed together in a 25 ml round bottle to prepare a second solution.

The second solution was added to the first solution in drop wise and a solution of KF was added to obtain a reaction mixture. The mixture was aged for about 14 hours at room temperature to obtain a reaction mixture in the form of a gel. The gel was transferred into a 50 ml Teflon-lined autoclave and the autoclave was placed in pre-heated oven at about 220° C. for about 3 days under static condition to perform the hydrothermal reaction. After the hydrothermal reaction, the autoclave was cooled with water, and the VSH-3 was collected by centrifuging and washed with copious amount of DDW and dried at about 100° C. for about 1 hour.

Figure 14A:
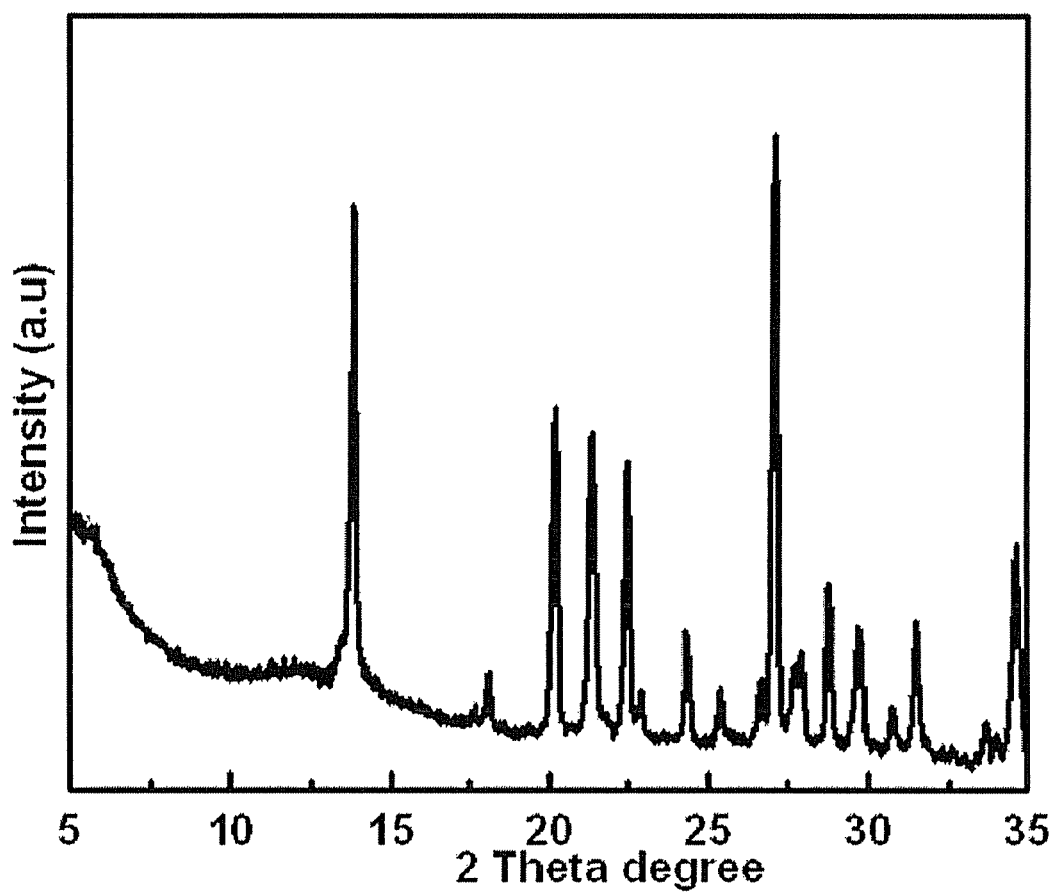
FIGS. 14A and 14B provide (A) powder X-ray diffraction pattern and (B) SEM image of a vanadosilicate molecular sieve VSH-3 prepared in accordance with an example of the present disclosure.
Figure 14B:
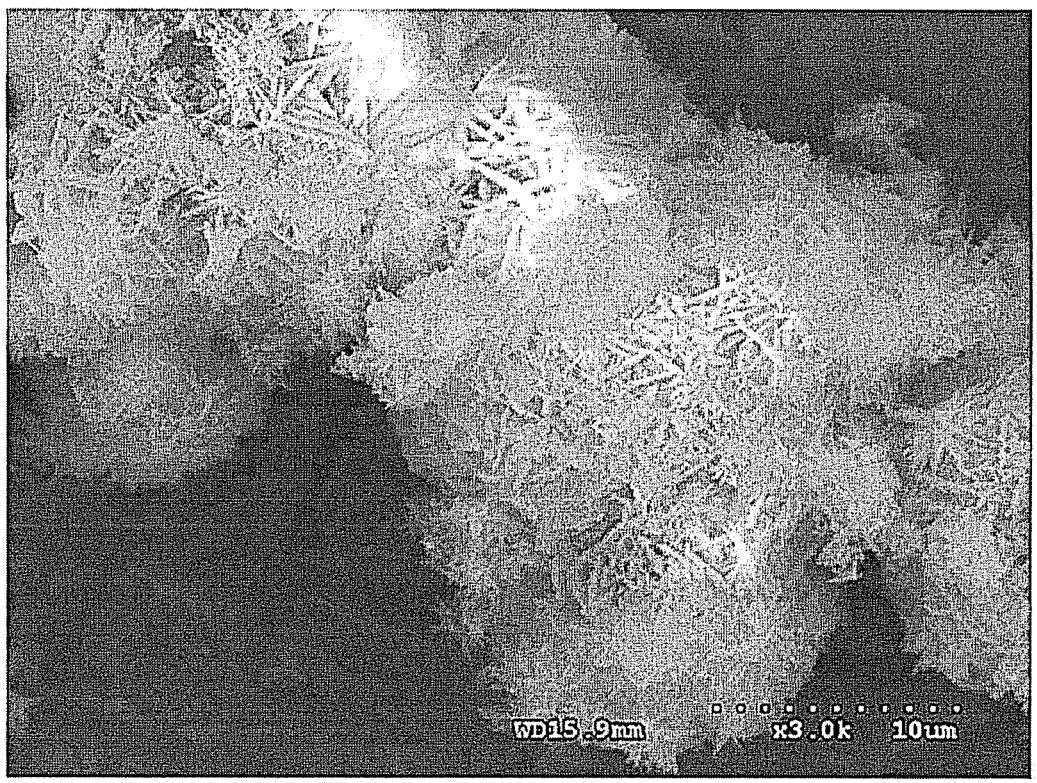

FIG. 14A shows a powder X-ray diffraction spectrum of the vanadosilicate VSH-3 obtained in accordance with the present example and a SEM image is shown in FIG. 14B. An analysis of a powder X-ray diffraction peak can be seen in the following Table 15.

TABLE 15

| 2θ | d/Å | Relative Intensity |
|---|---|---|
| 13.80 | 6.41 | 89.25 |
| 18.10 | 4.89 | 18.11 |
| 20.18 | 4.39 | 58.45 |
| 21.32 | 4.16 | 54.43 |
| 22.44 | 3.95 | 50.03 |
| 22.58 | 3.93 | 17.28 |
| 24.30 | 3.65 | 24.39 |
| 25.36 | 3.50 | 15.63 |
| 26.60 | 3.34 | 16.83 |
| 27.06 | 3.29 | 100.00 |
| 27.88 | 3.19 | 21.41 |
| 28.72 | 3.10 | 31.57 |
| 29.68 | 3.00 | 24.98 |
| 30.70 | 2.90 | 12.69 |
| 31.46 | 2.84 | 25.90 |
| 33.66 | 2.66 | 10.52 |
| 34.62 | 2.58 | 37.52 |

Example 11

Synthesis of Vanadosilicate VSH-4

For a synthesis of VSH-4, a reaction mixture gel containing $SiO_2$, $V_2O_5$, oxalic acid, CsOH, and $H_2O$ was prepared. A ratio of the synthesis gel ($SiO_2:V_2O_5:H_2O_4C_2:Cs_2O:H_2O$) in terms of mole was 4:1.00:2.17:4.9:200.

Ludox (about 5.5 g) was diluted in water (DDW, about 5 g) and a solution of CsOH containing CsOH (about 15 g) dissolved in DDW (about 19 g) was added with stirring, and the mixture was stirred for about 1 hour. A vanadium source solution was prepared by mixing oxalic acid (about 2.5 g), $V_2O_5$ (about 1.65 g) and DDW (about 10 g). These two solutions were mixed together and stirred for about 16 hours at room temperature to obtain a reaction mixture in the form of a gel. The gel was transferred into a 50 ml Teflon-lined stainless steel autoclave and it was placed in the pre-heated oven at about 220° C. for about 36 hours under static condition to perform the hydrothermal reaction. After the hydrothermal reaction, the VSH-4 was collected by centrifuging and washed with copious amount of DDW and dried at about 100° C. for about 1 hour.

Figure 15A:
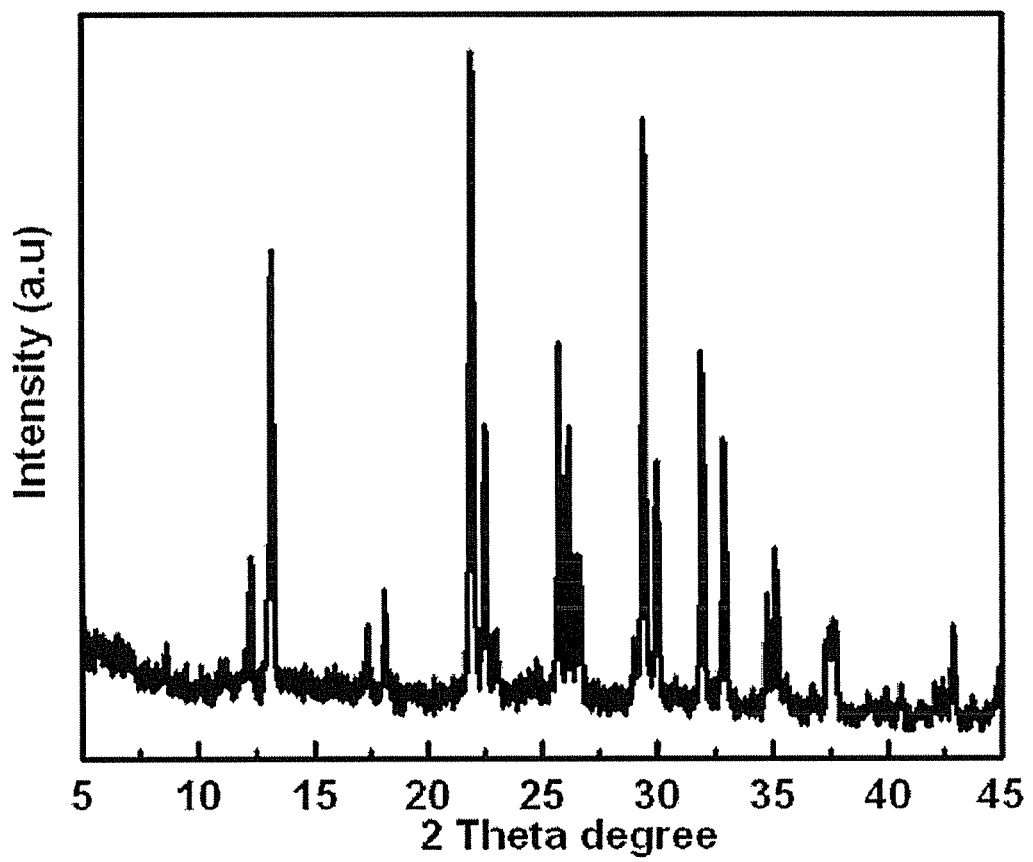
FIGS. 15A and 15B provide (A) powder X-ray diffraction pattern and (B) SEM image of a vanadosilicate molecular sieve VSH-4 prepared in accordance with an example of the present disclosure.
Figure 15B:

FIG. 15A shows a powder X-ray diffraction spectrum of the vanadosilicate VSH-4 obtained in accordance with the present example and a SEM image is shown in FIG. 15B. An analysis of a powder X-ray diffraction peak can be seen in the following Table 16.

TABLE 16

| 2θ | d/Å | Relative Intensity |
|---|---|---|
| 12.24 | 7.22 | 28.48 |
| 13.16 | 6.72 | 71.89 |
| 17.28 | 5.12 | 18.44 |
| 18.08 | 4.90 | 23.96 |
| 21.88 | 4.05 | 100.00 |
| 22.46 | 3.95 | 47.30 |
| 22.94 | 3.87 | 18.32 |
| 25.70 | 3.46 | 58.47 |
| 26.16 | 3.40 | 47.05 |
| 26.22 | 3.39 | 30.36 |
| 28.98 | 3.07 | 17.19 |
| 29.42 | 3.03 | 90.59 |
| 29.96 | 2.98 | 42.16 |
| 31.92 | 2.80 | 57.59 |
| 32.88 | 2.72 | 45.42 |
| 35.10 | 2.55 | 29.74 |
| 37.64 | 2.38 | 19.82 |
| 42.80 | 2.11 | 18.92 |

Example 12

Synthesis of Vanadosilicate VSH-9

For a synthesis of VSH-9, a reaction mixture gel containing $SiO_2$, $V_2O_5$, oxalic acid, NaOH, CsCl, EtOH and $H_2O$ was prepared. A ratio of the synthesis gel ($SiO_2$:$V_2O_5$:$H_2O_4C_2$:$Na_2O$:CsCl:EtOH:$H_2O$) in terms of mole was 6.7:1.00:4.01:7.7:8.7:40:334.

$Na_2SiO_3$ (about 6.1 g of from about 17 wt to 19 wt % of $Na_2O$ and from about 35 wt % to 38 wt % of $SiO_2$) was diluted in water (DDW, about 6 g), and a solution of NaOH containing NaOH (about 2 g) dissolved in DDW (about 7 g) was added with stirring, and the mixture was stirred for about 1 hour. A vanadium source solution was prepared by mixing $V_2O_5$ (about 1 g), oxalic acid (about 2.85 g) and DDW (about 10 g). These two solutions were mixed together, and a solution of CsCl (about 8 g) dissolved in DDW (about 10 g) and EtOH (about 10 g) were added after about 1 hour to obtain a reaction mixture. The reaction mixture was finally aged for about 16 hours at room temperature to obtain a reaction mixture in the form of a gel. Then, the reaction mixture gel was transferred into a 50 ml Teflon-lined stainless steel autoclave and it was placed in the pre-heated oven at about 220° C. for about 36 hours under static condition to perform the hydrothermal reaction. After the hydrothermal reaction, the VSH-9 was collected by centrifuging and washed with copious amount of DDW and dried at about 100° C. for about 1 hour.

Figure 16A:
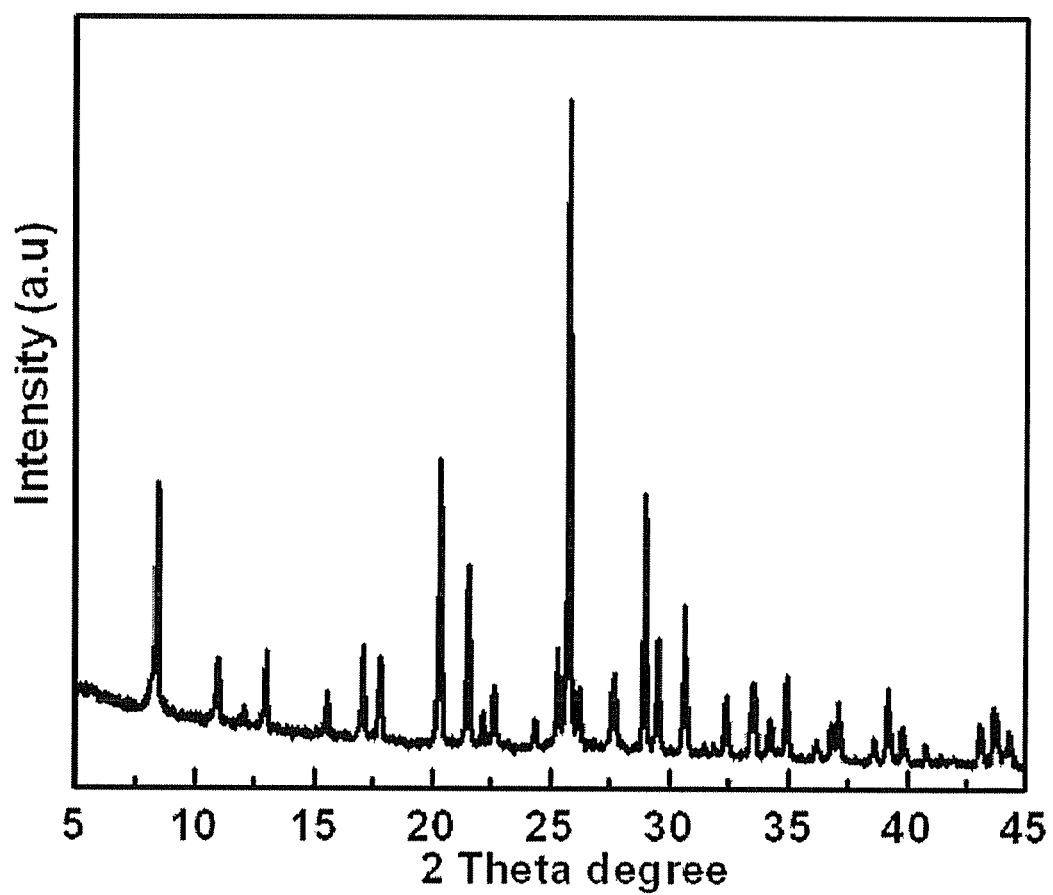
FIGS. 16A and 16B provide (A) powder X-ray diffraction pattern and (B) SEM image of a vanadosilicate molecular sieve VSH-9 prepared in accordance with an example of the present disclosure.
Figure 16B:
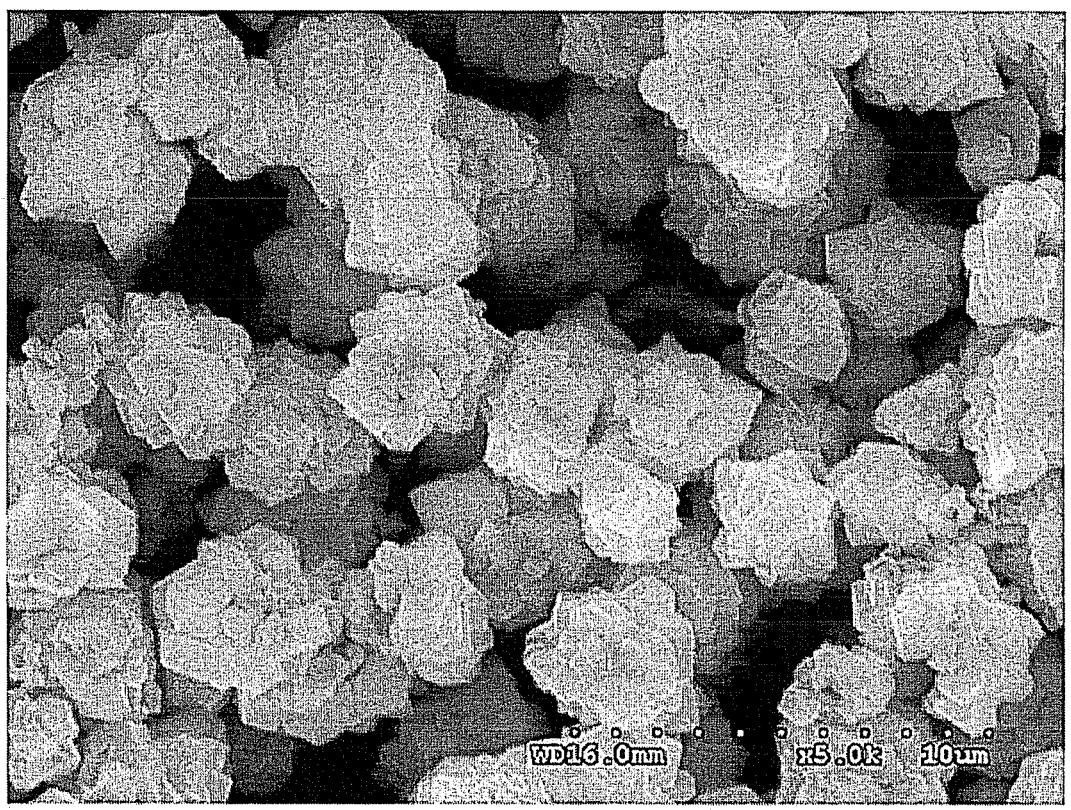

FIG. 16A shows a powder X-ray diffraction spectrum of the vanadosilicate VSH-9 obtained in accordance with the present example and a SEM image is shown in FIG. 16B. An analysis of a powder X-ray diffraction peak can be seen in the following Table 17.

TABLE 17

| 2θ | d/Å | Relative Intensity |
|---|---|---|
| 8.46 | 10.44 | 44.24 |
| 10.96 | 8.06 | 18.75 |
| 12.04 | 7.34 | 11.24 |
| 12.98 | 6.81 | 19.77 |
| 15.52 | 5.70 | 13.74 |
| 17.06 | 5.19 | 20.71 |
| 17.78 | 4.98 | 19.27 |
| 20.32 | 4.36 | 47.85 |
| 21.52 | 4.12 | 32.40 |
| 22.10 | 4.02 | 10.61 |
| 22.26 | 3.99 | 14.53 |
| 24.32 | 3.65 | 10.18 |
| 25.30 | 3.51 | 20.33 |
| 25.76 | 3.45 | 100.00 |
| 26.18 | 3.40 | 14.32 |
| 27.68 | 3.22 | 16.75 |
| 28.94 | 3.08 | 42.48 |
| 29.50 | 3.02 | 21.27 |
| 30.62 | 2.91 | 26.55 |
| 32.36 | 2.76 | 13.01 |
| 33.50 | 2.67 | 15.02 |
| 34.18 | 2.62 | 10.23 |
| 34.90 | 2.56 | 16.41 |
| 36.14 | 2.48 | 6.49 |
| 36.78 | 2.44 | 9.57 |
| 37.08 | 2.42 | 12.83 |
| 38.58 | 2.33 | 7.32 |
| 39.16 | 2.29 | 14.51 |
| 39.76 | 2.26 | 9.19 |
| 40.74 | 2.21 | 6.55 |
| 43.02 | 2.10 | 9.40 |
| 43.62 | 2.07 | 11.78 |
| 44.28 | 2.04 | 8.41 |

Example 13

Synthesis of Vanadosilicate VSH-12

For a synthesis of VSH-12, a reaction mixture gel containing $SiO_2$, $V_2O_5$, oxalic acid, CsOH, and $H_2O$ was prepared. A ratio of the synthesis gel ($SiO_2$:$V_2O_5$:$H_2O_4C_2$:$Cs_2O$:$H_2O$) in terms of mole was 6.7:1.00:4:4.8:330.

Ludox (about 5.5 g) was diluted in water (DDW, about 5 g) and a solution of CsOH containing CsOH (about 9 g) dissolved in DDW (about 18 g) was added with stirring, and the mixture was stirred for about 1 hour to obtain a first solution. A second solution containing a vanadium source was prepared by mixing oxalic acid (about 2.75 g), $V_2O_5$ (about 1 g) and DDW (about 10 g). Then, the first solution was mixed with the second solution to obtain a reaction mixture. The reaction mixture was finally aged for about 16 hours at room temperature to obtain a reaction mixture in the form of a gel. The gel was transferred into a 50 ml Teflon-lined stainless steel autoclave and it was placed in the pre-heated oven at about 220° C. for about 48 hours under static condition to perform the hydrothermal reaction. After the hydrothermal reaction, the VSH-12 was collected by centrifuging and washed with copious amount of DDW and dried at about 100° C. for about 1 hour.

Figure 17A:
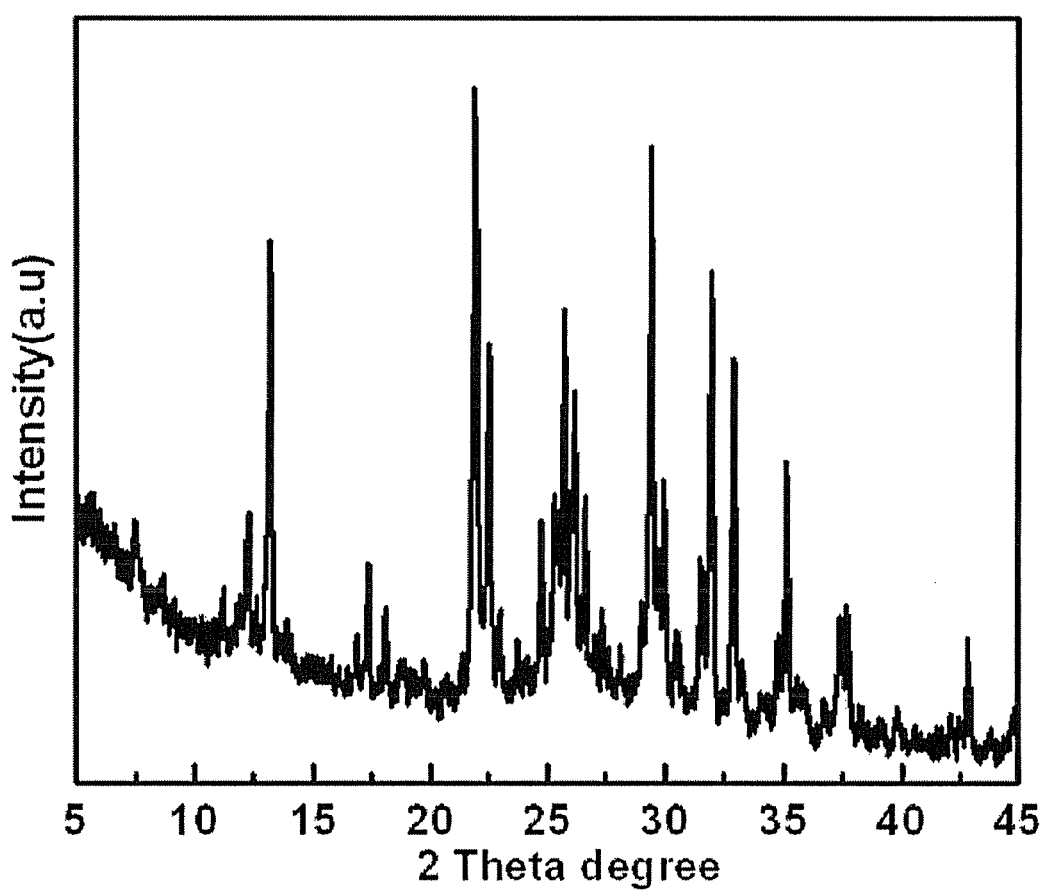
FIGS. 17A and 17B provide (A) powder X-ray diffraction pattern and (B) SEM image of a vanadosilicate molecular sieve VSH-12 prepared in accordance with an example of the present disclosure.
Figure 17B:
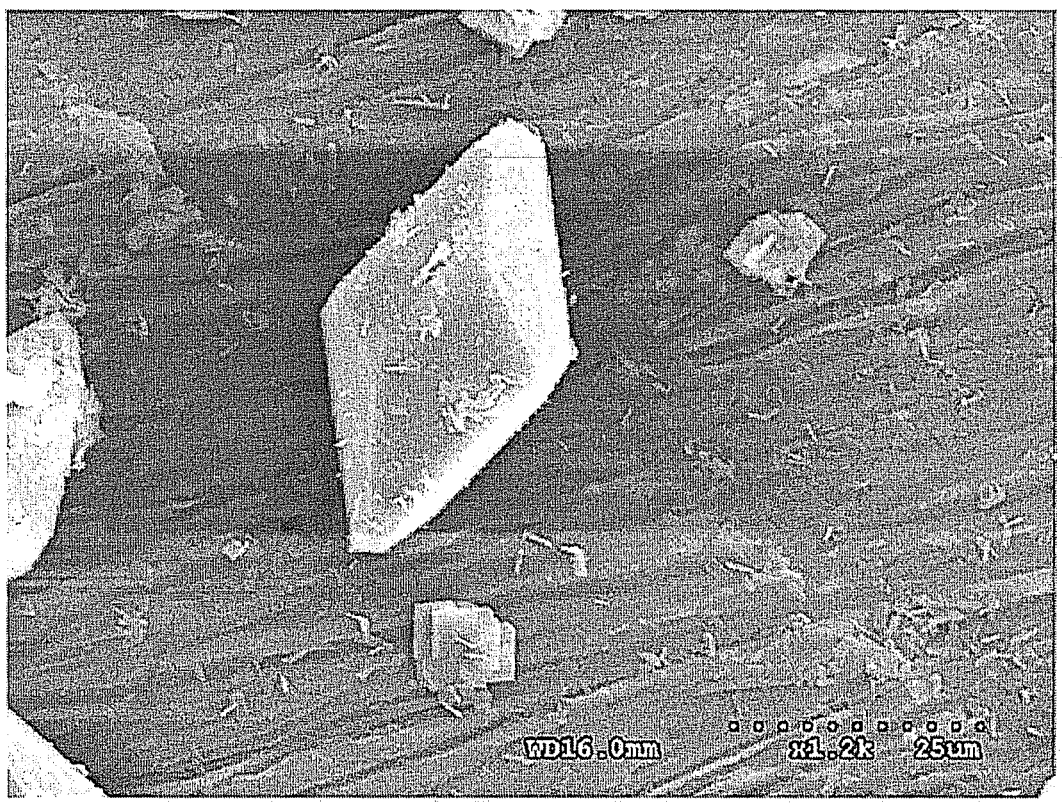

FIG. 17A shows a powder X-ray diffraction spectrum of the vanadosilicate VSH-12 obtained in accordance with the present example and a SEM image is shown in FIG. 17B. An analysis of a powder X-ray diffraction peak can be seen in the following Table 18.

TABLE 18

| 2θ | d/Å | Relative Intensity |
|---|---|---|
| 7.42 | 11.91 | 42.97 |
| 11.18 | 7.90 | 34.17 |
| 12.20 | 7.24 | 43.69 |
| 13.16 | 6.77 | 79.99 |
| 13.86 | 6.38 | 29.91 |
| 16.82 | 5.26 | 27.94 |
| 17.30 | 5.12 | 36.80 |
| 18.04 | 4.91 | 31.38 |
| 21.86 | 4.06 | 100.00 |
| 22.48 | 3.95 | 66.38 |
| 22.60 | 3.93 | 32.75 |
| 23.70 | 3.75 | 27.12 |
| 24.72 | 3.59 | 42.97 |
| 25.30 | 3.51 | 46.42 |
| 25.70 | 3.46 | 70.80 |
| 26.14 | 3.40 | 60.14 |
| 26.58 | 3.35 | 46.09 |
| 27.32 | 3.26 | 31.27 |
| 29.20 | 3.05 | 33.62 |
| 29.40 | 3.03 | 92.40 |
| 29.96 | 2.98 | 48.22 |
| 30.50 | 2.92 | 28.38 |
| 31.50 | 2.83 | 38.11 |
| 31.94 | 2.79 | 75.78 |
| 32.88 | 2.72 | 64.46 |
| 34.74 | 2.58 | 27.94 |
| 35.12 | 2.55 | 50.63 |
| 37.38 | 2.40 | 30.29 |
| 37.66 | 2.38 | 31.77 |
| 42.80 | 2.11 | 27.45 |

Example 14

Synthesis of a Vanadosilicate VSH-13

For a synthesis of VSH-13, a reaction mixture gel containing $SiO_2$, $V_2O_5$, oxalic acid, NaOH, NaCl, EtOH and $H_2O$ was prepared. A ratio of the synthesis gel ($SiO_2$:$V_2O_5$:$H_2O_4C_2$:$Na_2O$:NaCl:EtOH:$H_2O$) in terms of mole was 7.4:1.00:4.01:8.1:13.5:44:350.

Na$_2$SiO$_3$ (about 12.2 g of from about 17 wt % to about 19 wt % of Na$_2$O and from about 35 wt % to about 38 wt % of SiO$_2$) was diluted in water (DDW, about 12 g) and a solution of NaOH containing NaOH (about 3.6 g) dissolved in DDW (about 10 g) was added with stirring, and the mixture was stirred for about 1 hour. A vanadium source was prepared by mixing V$_2$O$_5$ (about 2 g), oxalic acid (about 5 g) and DDW (about 20 g). These two solutions were mixed together, and a solution of NaCl (about 8 g) dissolved in DDW (about 20 g) and EtOH (20 g) were added respectively to obtain a reaction mixture. The reaction mixture was finally aged for about 16 hours at room temperature and transferred into a 50 ml Teflon-lined stainless steel autoclave and it was placed in the pre-heated oven at about 220° C. for about 72 hours under static condition to perform the hydrothermal reaction. After the hydrothermal reaction, the VSH-13 crystals were collected by centrifuging and washed with copious amount of DDW and dried at about 100° C. for about 1 hour.

Figure 18A:
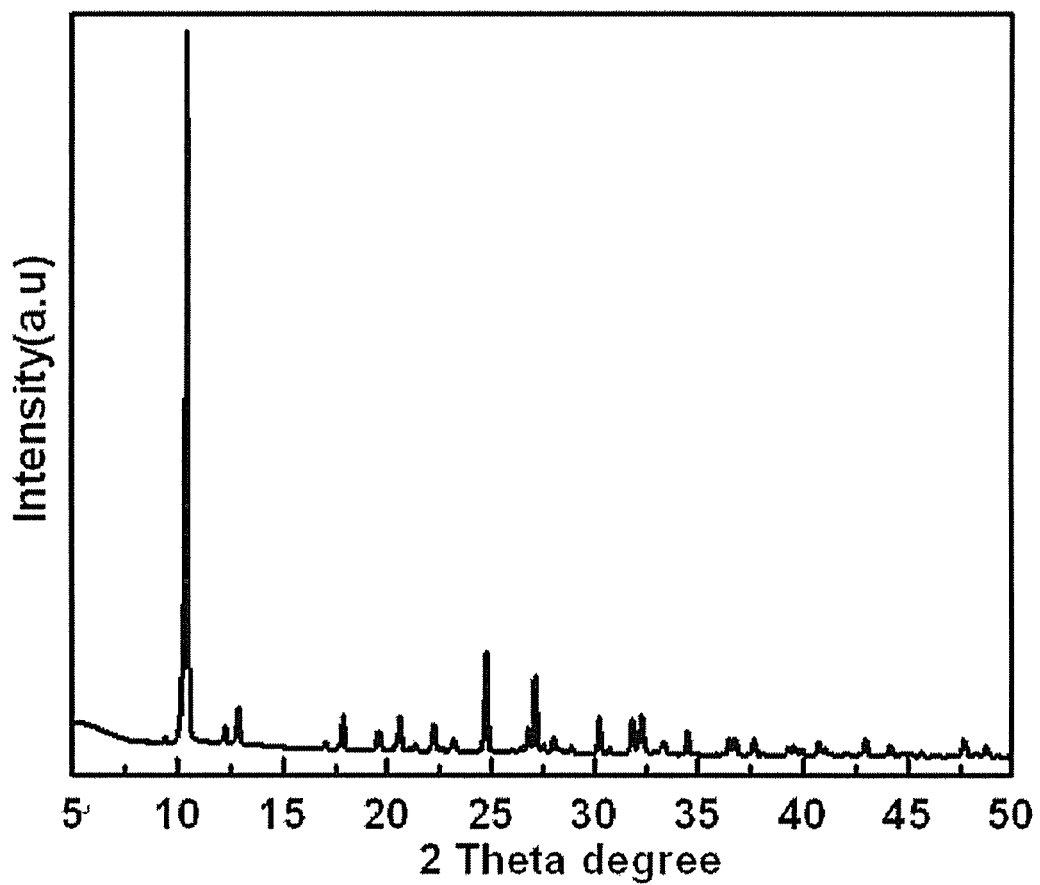
FIGS. 18A to 18C provides (A) powder X-ray diffraction pattern, (B) IR spectrum and (C) SEM image of a vanadosilicate molecular sieve VSH-13 prepared in accordance with an example of the present disclosure.
Figure 18B:
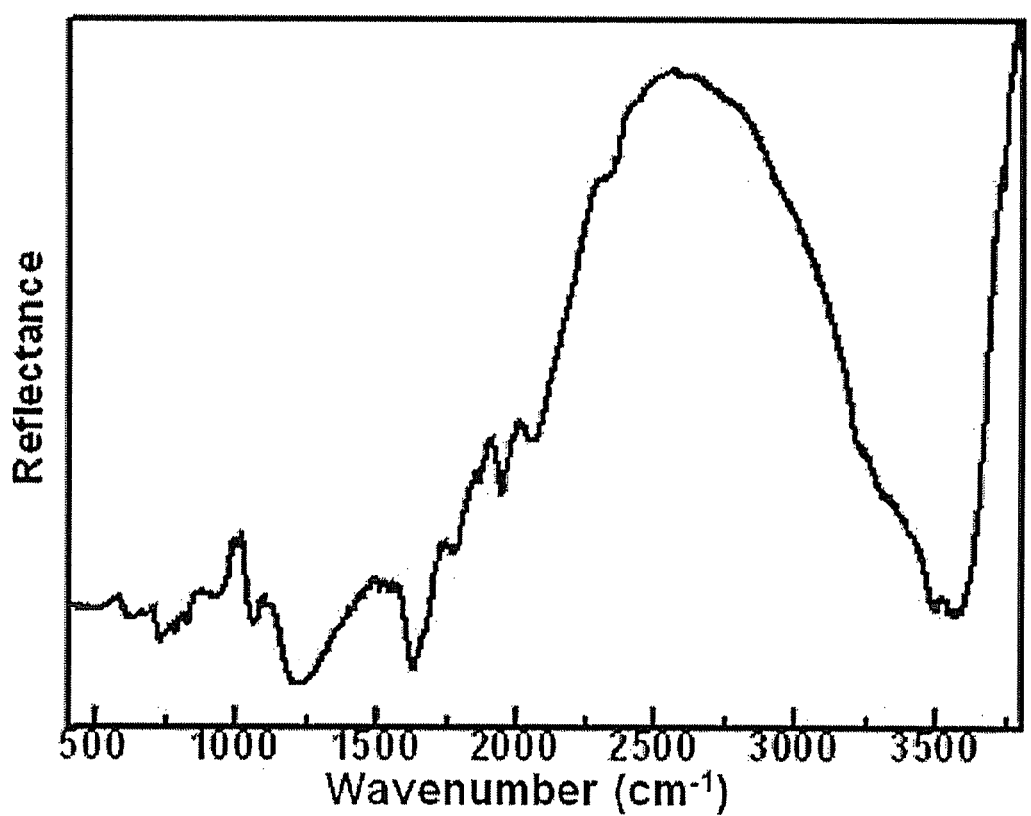
Figure 18C:
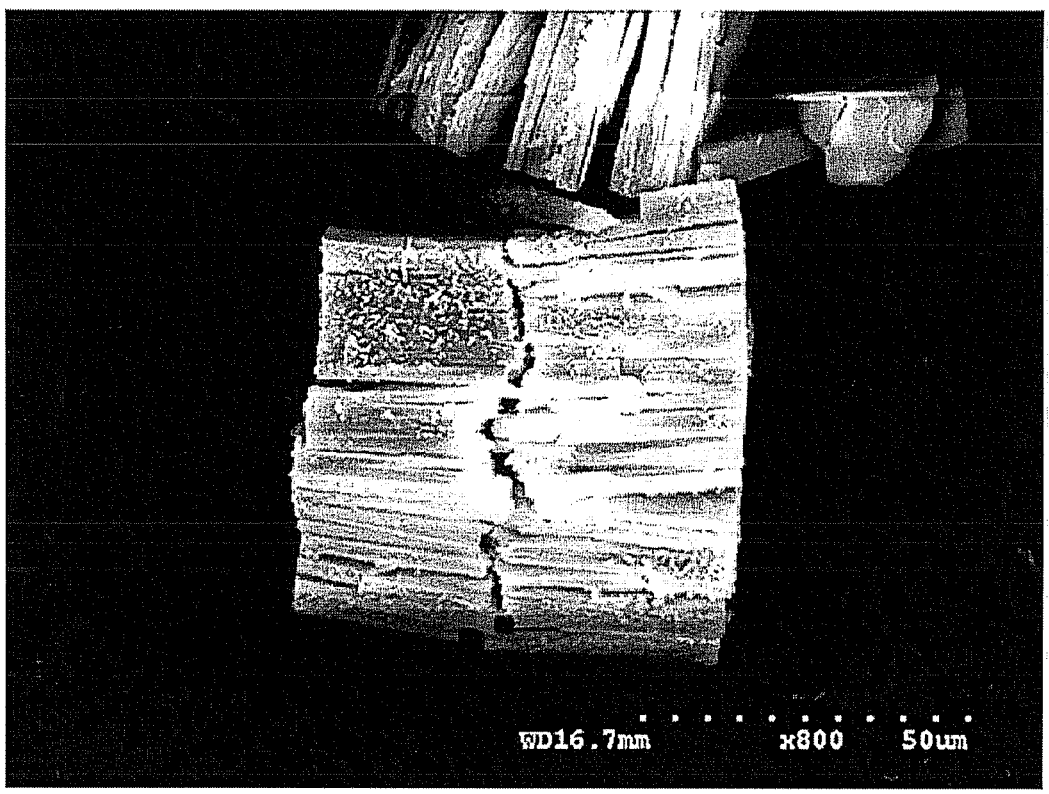

FIGS. 18(a) and 18(b) respectively show a powder X-ray diffraction spectrum and an IR spectrum of the vanadosilicate VSH-13 obtained in accordance with the present example, and a SEM image is shown in FIG. 18C. An analysis of a powder X-ray diffraction peak can be seen in the following Table 19.

TABLE 19

| 2θ | d/Å | Relative Intensity |
|---|---|---|
| 10.44 | 8.46 | 100.00 |
| 12.88 | 6.86 | 7.15 |
| 17.86 | 4.96 | 6.24 |
| 20.56 | 4.31 | 5.62 |
| 22.20 | 4.00 | 4.99 |
| 24.74 | 3.59 | 14.74 |
| 27.10 | 3.28 | 11.42 |
| 30.22 | 2.95 | 5.71 |
| 31.82 | 2.81 | 5.76 |
| 32.24 | 2.77 | 5.56 |
| 34.48 | 2.59 | 4.01 |

Example 15

Synthesis of a Vanadosilicate VSH-16

For a synthesis of VSH-16, a reaction mixture gel containing SiO$_2$, V$_2$O$_5$, oxalic acid, NaOH, NaCl, EtOH and H$_2$O was prepared. A ratio of the synthesis gel (SiO$_2$:V$_2$O$_5$:H$_2$O$_4$C$_2$:Na$_2$O:NaCl:EtOH:H$_2$O) in terms of mole was 6.07:1.00:3.26:6.6:11:36:285.

Na$_2$SiO$_3$ (about 12.2 g) solution was diluted in deionized water (DDW, about 12 g). In this solution, a dissolved NaOH solution containing NaOH (about 3.6 g) dissolved in DDW (about 15 g) and a solution of NaCl containing NaCl (about 8 g) dissolved in DDW (about 15 g) were added with vigorous stirring. For a preparation of a vanadium source, separately V$_2$O$_5$ (about 2.2 g), oxalic acid (about 5 g) and DDW (about 20 g) were mixed together. These two solutions were mixed together and EtOH (about 20 g) was added after about 30 minutes to obtain a reaction mixture and the mixture was finally aged for about 14 hours at room temperature to obtain a reaction mixture in the form of a gel. The gel was transferred into a 50 ml Teflon-lined stainless steel autoclave and the autoclave was placed in the pre-heated oven at about 220° C. for about 72 hours under static condition to perform the hydrothermal reaction. After the hydrothermal reaction, the autoclave was cooled at room temperature, and the VSH-16 were collected by centrifuging and washed with copious amount of DDW and dried at about 100° C. for about 1 hour.

Figure 19A:
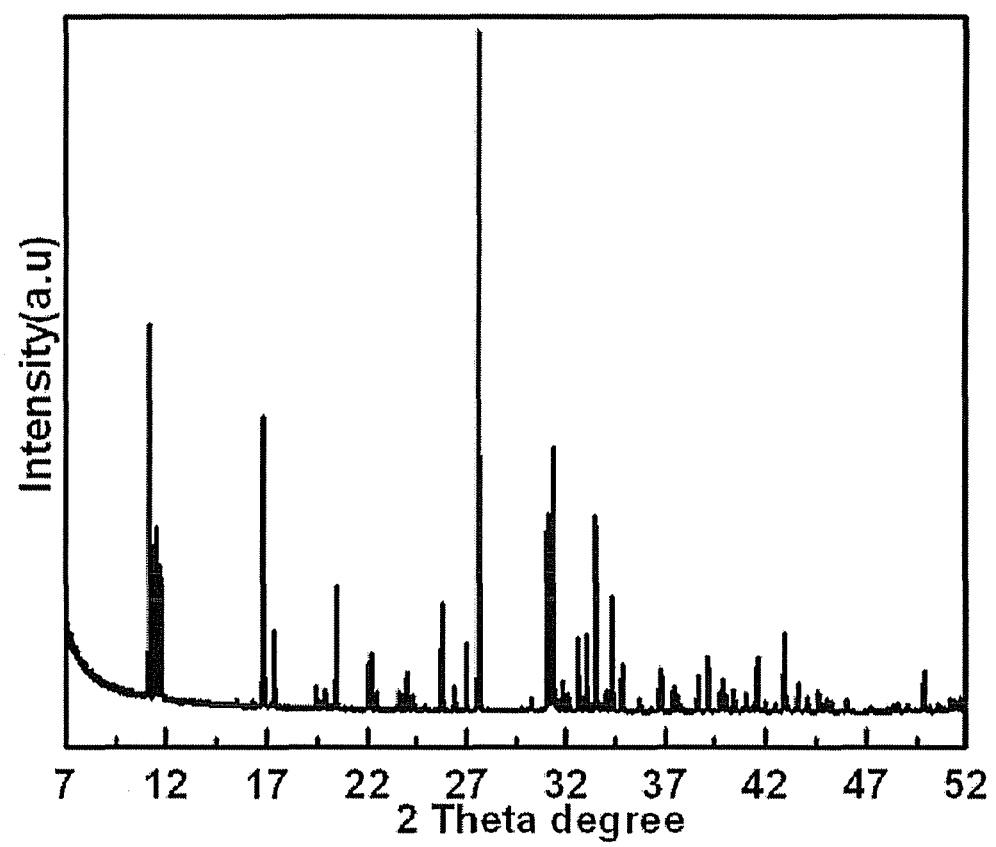
FIGS. 19A to 19C provide (A) powder X-ray diffraction pattern, (B) IR spectrum and (C) SEM image of a vanadosilicate molecular sieve VSH-16 prepared in accordance with an example of the present disclosure.
Figure 19B:
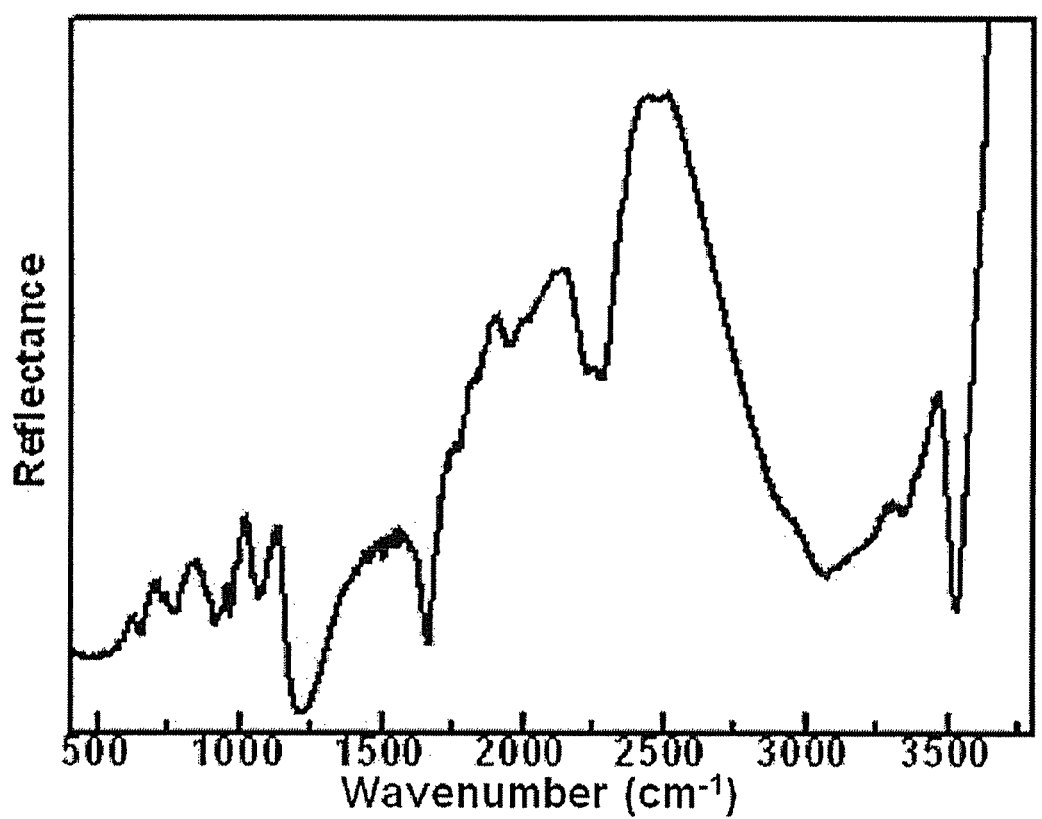
Figure 19C:
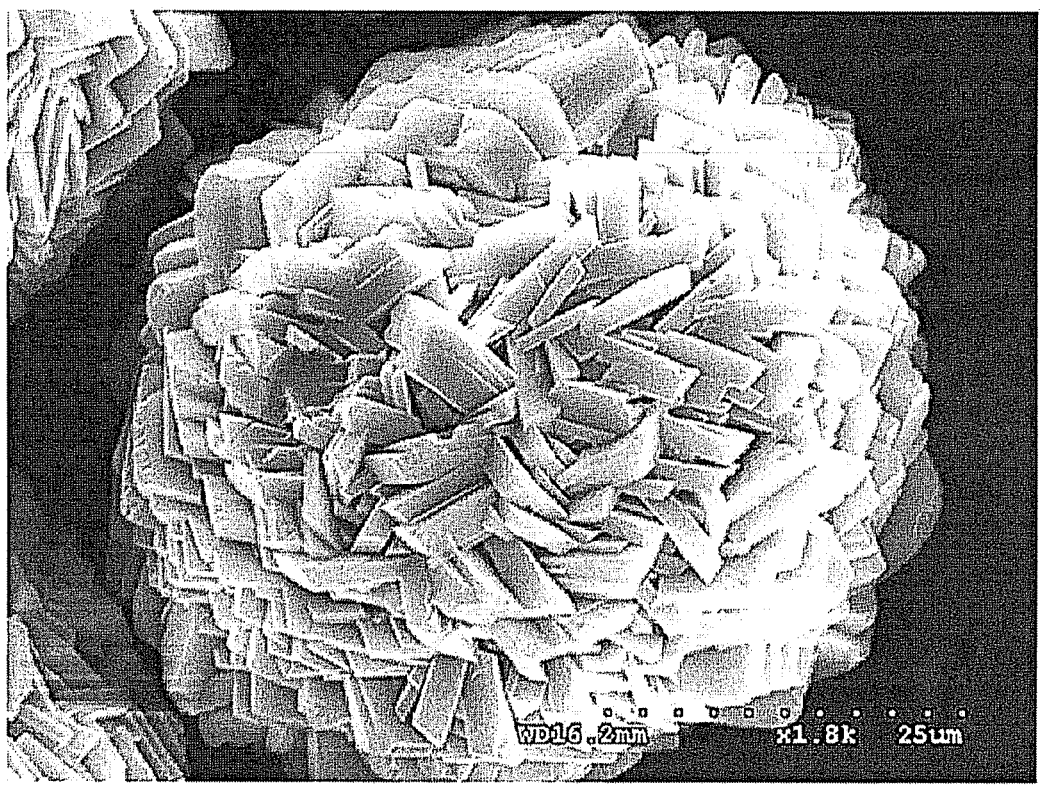

FIGS. 19(a) and 19(b) respectively show a powder X-ray diffraction spectrum and an IR spectrum of the vanadosilicate VSH-16 obtained in accordance with the present example, and a SEM image is shown in FIG. 19C. An analysis of a powder X-ray diffraction peak can be seen in the following Table 20. The vanadosilicate VSH-16 obtained in accordance with the present example has an excellent crystalline property as shown in the SEM image of FIG. 19C.

Figure 20:
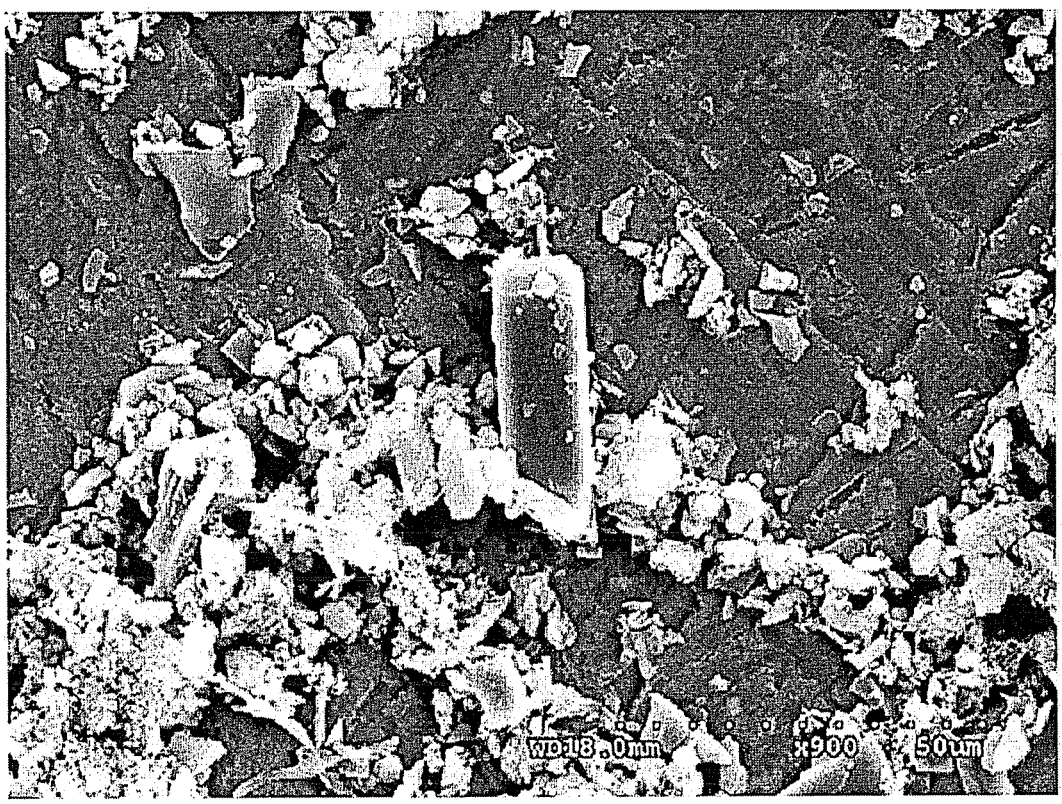
FIG. 20 provides a SEM image of VSH-16 prepared by a conventional preparing method.

However, when the VSH-16 was synthesized in accordance with a conventional synthesis method carried out in Houston University, USA, as a comparison example, pure crystals could not be obtained as can be seen from a SEM image of FIG. 20.

TABLE 20

| 2θ | d/Å | Relative Intensity |
|---|---|---|
| 11.17 | 7.91 | 56.96 |
| 11.50 | 7.68 | 27.43 |
| 11.75 | 7.52 | 21.65 |
| 16.84 | 5.26 | 43.63 |
| 17.37 | 5.10 | 12.16 |
| 19.44 | 4.56 | 3.96 |
| 20.45 | 4.33 | 18.43 |
| 22.17 | 4.00 | 8.66 |
| 23.98 | 3.70 | 5.80 |
| 25.74 | 3.45 | 16.11 |
| 26.98 | 3.30 | 10.22 |
| 27.60 | 3.22 | 100.00 |
| 31.11 | 2.87 | 29.41 |
| 31.39 | 2.84 | 38.98 |
| 32.64 | 2.74 | 11.10 |
| 33.05 | 2.70 | 11.49 |
| 33.52 | 2.67 | 29.06 |
| 34.36 | 2.60 | 17.23 |
| 34.84 | 2.57 | 7.14 |
| 36.76 | 2.44 | 6.52 |
| 39.14 | 2.29 | 8.10 |
| 41.60 | 2.16 | 8.07 |
| 42.92 | 2.10 | 11.77 |
| 49.85 | 1.82 | 6.05 |

Example 16

Oxidized Derivatives of a Vanadosilicate SVS-3

Figure 24:
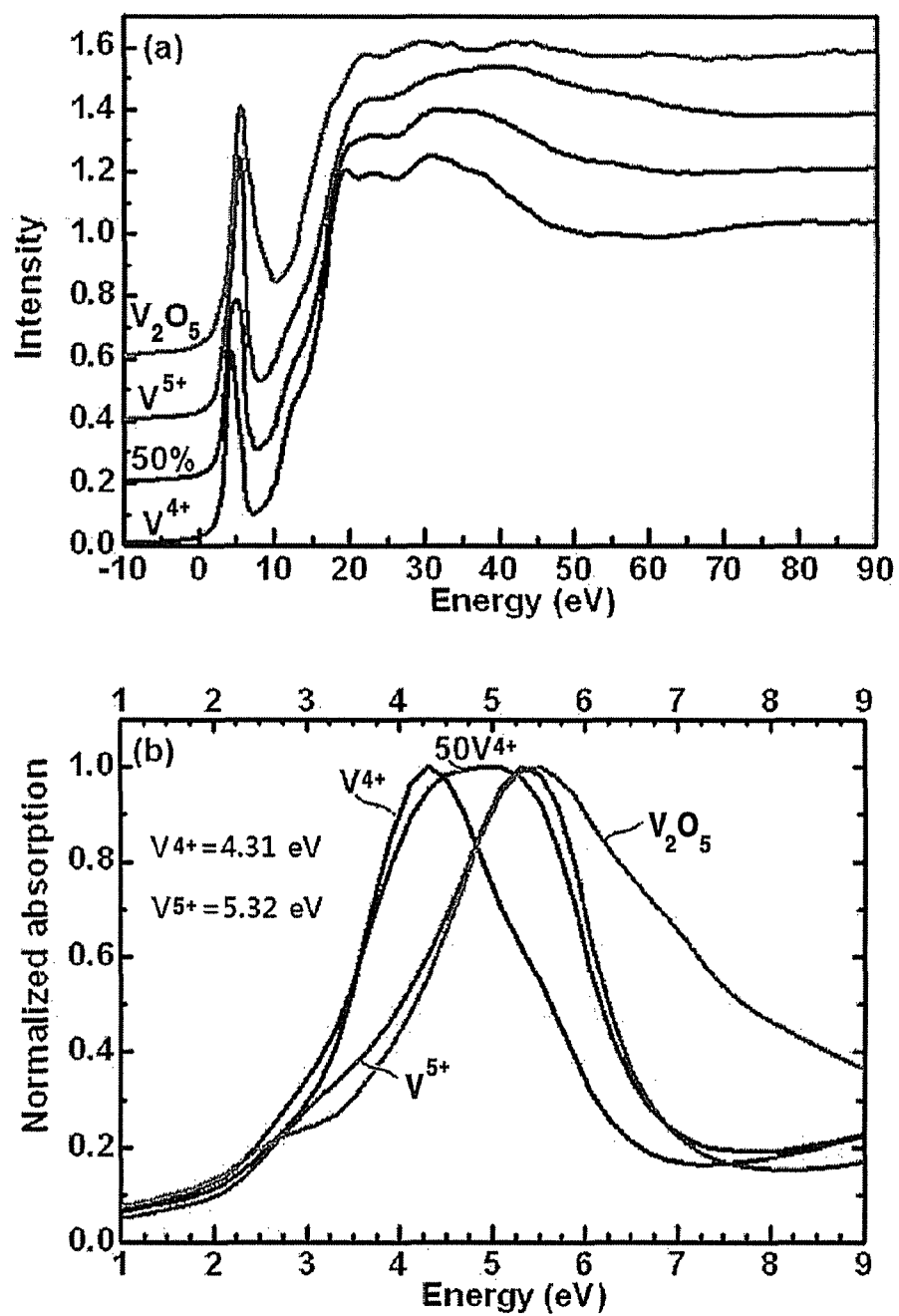
FIG. 24 provides (a) EXAFS peaks and (b) enlarged graph of (a) EXAFS peaks with respect to a vanadosilicate in which a $V^{4+}$ ion is oxidized to a $V^{5+}$ ion within a vanadosilicate SVS-3 sample prepared in accordance with an example of the present disclosure.
Figure 25:
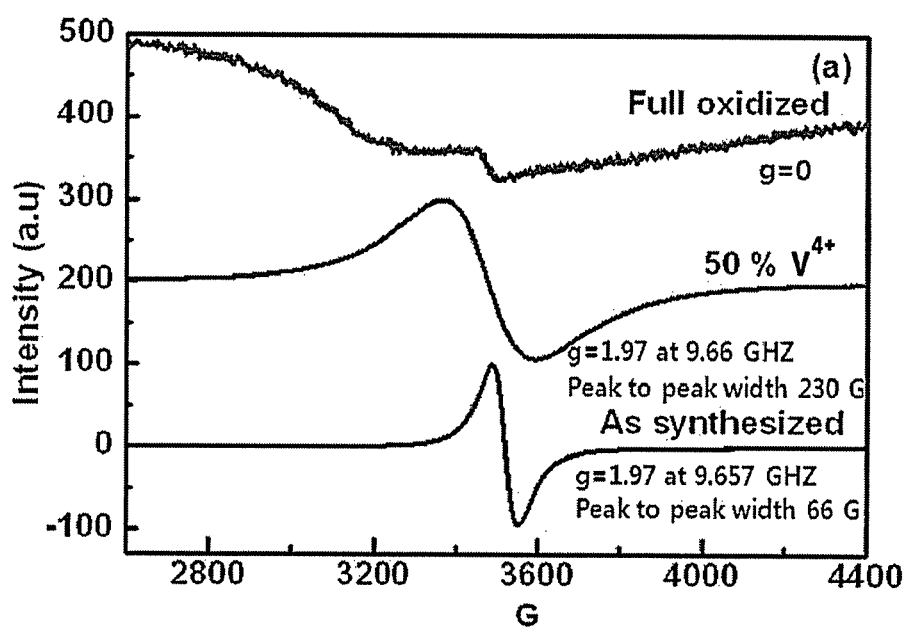
FIG. 25 provides (a) ESR spectra and (b) graph showing SQUID data with respect to a vanadosilicate in which a $V^{4+}$ ion is oxidized to a $V^{5+}$ ion within a vanadosilicate SVS-3 sample prepared in accordance with an example of the present disclosure.
Figure 25:
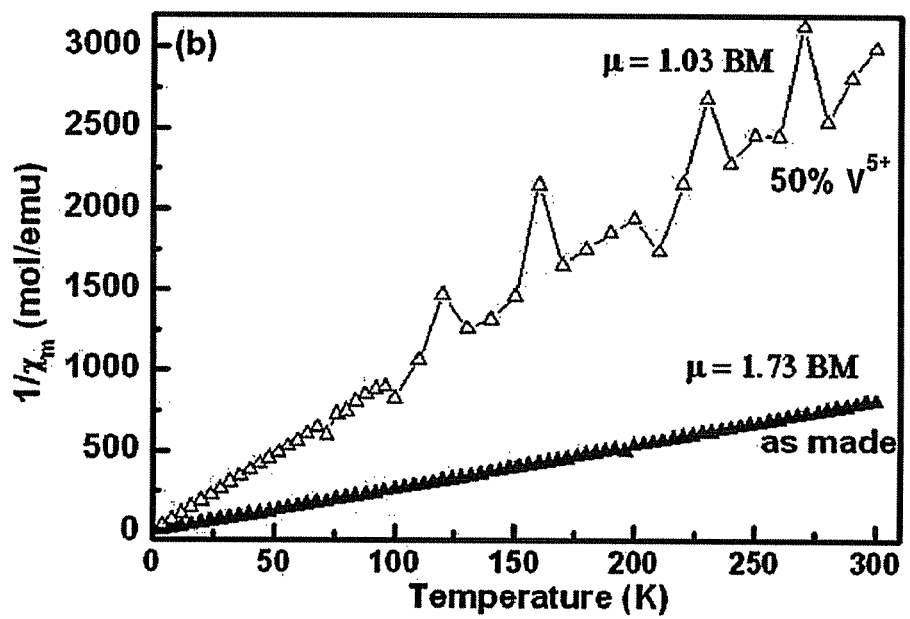

With a V$^{IV}$ vanadosilicate SVS-3 prepared in the above example 3 and an oxidizing agent (Br$_2$ in CCl$_4$), a novel vanadosilicate containing V$^{5+}$ ions and having a SVS-3 structure was prepared by oxidizing V$^{4+}$ ions within the above SVS-3 sample to V$^{5+}$ ions. An analysis of oxidation of V$^{4+}$ ions within the SVS-3 sample to V$^{5+}$ ions was carried out by using EXAFS (Extended X-ray Absorption Fine Structure), ESR (Electron Spin Resonance) and SQUID (Superconducting Quantum Interference Device). According to EXAFS analysis data as shown in FIG. 24, as V$^{4+}$ ions within the SVS-3 sample was oxidized to V$^{5+}$ ions 50% or 100%, a point of an EXAFS peak was changed, which can be clearly seen from EXAFS data of FIG. 24(b) which is an enlarged graph of EXAFS peaks shown in FIG. 24(a). Further, the oxidation of V$^{4+}$ ions within the SVS-3 sample to V$^{5+}$ ions can be clearly seen from ESR shown in FIG. 25(a) and SQUID analysis data shown in FIG. 25(b). According to the SQUID data shown in FIG. 25(b), it can be seen that a magnetic moment (m) of the V$^{IV}$ vanadosilicate SVS-3 is about 1.73 BM and the V$^{V}$ vanadosilicate SVS-3 does not have a magnetic susceptibility value, but have a unique magnetic susceptibility value when 50% of the V$^{4+}$ ions within the SVS-3 sample is oxidized to V$^{5+}$ ions.

<Comparison of Examples with Comparison Examples>

Even though $V_2O_5$ ($V^{5+}$ source) was used instead of $VOSO_4$ ($V^{4+}$ source) which was used in a conventional method, a novel vanadosilicate and AM-6-(Y) having excellent crystalline properties were readily obtained from a reaction mixture gel containing $Na_2SiO_3$, $V_2O_5$, KOH, reducing agents (oxalic acid and ethanol), DDW (Deionized Distilled Water), and, if necessary, $H_2SO_4$ for experimental procedures. According to the above-described method in accordance with the present disclosure, a novel vanadosilicate described in the above examples 1 to 7 as well as previously known vanadosilicates can be prepared readily and efficiently.

For a comparison, AM-6-(RA), AM-6-(S)-TMA, and AM-6-(S)—$NH_3$ were also prepared. A X-ray powder diffraction pattern of AM-6-(Y) confirmed its ETS-10 structure and showed that, unlike AM-6-(RA), it is not contaminated with impurities such as quartz (FIG. 8). As depicted in FIGS. 9A to 9C, a scanning electron microscope (SEM) image (FIG. 9A) of AM-6-(Y) crystals showed that the crystals adopt a typical truncated octahedron shape with an average a/c ratio of about 1.38 that their surfaces are very smooth. In contrast, a typical a/c ratio of AM-6-(RA) is about 0.8 and many crystals have rough broken faces (FIG. 9B). The crystal shapes of AM-6-(S)-TMA are irregular and the surfaces are very rough (FIG. 9C). A transmission electron microscope (TEM) image of AM-6-(Y) in FIG. 10 further confirmed its AM-6 structure and revealed that it has defects and is a mixture of both polymorphs A and B.

Average yields of AM-6-(Y), AM-6-(RA), and AM-6-(S)-TMA were about 84%, about 49% and about 48% (with respect to an amount of vanadium), respectively, emphasizing that the procedure for AM-6-(Y) synthesis in accordance with the present disclosure is much more economical not only from the respect that it uses much cheaper $V_2O_5$ as the vanadium source but also from the respect that it gives much higher yields. Furthermore, a required reaction period for the synthesis of AM-6-(Y) was only about 20 hours at about 220° C., which is much shorter than average reaction periods for the synthesis of AM-6-(RA) and AM-6-(S)-TMA (>3 days).

Thermo gravimetric analyses (TGA) of the pristine AM-6 samples with air as an eluting gas revealed that water loss continues until about 500° C. and indeed AM-6-(S)-TMA contains an organic template. In a case of AM-6-(RA), an amount of water loss in a temperature range of from about 100° C. to about 250° C. is higher than that of AM-6-(Y), like a TGA curve of ETS-10. This indirectly indicates existence of ETS-10 core in it. BET surface areas of the pristine AM-6-(Y), AM-6-(RA), AM-6-(S)-TMA, AM-6-(S)—$NH_3$ measured by nitrogen adsorption were 395, 417, 81, and 296 $m^2g^{-1}$, respectively. The very small surface area of AM-6-(S)-TMA indicates that most of pores are blocked by $TMA^+$ ions. A significant amount of a surface area reduction in AM-6-(S)—$NH_3$, with respect to those of AM-6-(Y) and AM-6-(RA), further indicates that structures of the AM-6-(S)—$NH_3$ are partially damaged after $TMA^+$ removal with $NH_3$. A $N_2$-adsorption isotherm of AM-6-(RA) further shows the presence of mesopores in the sample. The mesopores are likely to be formed between the ETS-10 core and AM-6 shell through facile disconnection of —Ti—O—Ti—O—V—O—V— quantum wires into Ti—O—Ti—OH and HO—V—O—V— chains at interfaces between the ETS-10 core and AM-6 shell. The existence of such mesopores seems to be responsible for the slightly higher surface area of AM-6-(RA) than that of AM-6-(Y).

Degrees of ion exchanges for various cations ($K^+$, $Na^+$, $Ba^{2+}$, $Sr^{2+}$, $Ca^{2+}$, $Pb^{2+}$, $Cd^{2+}$, and $Zn^{2+}$) were obtained for AM-6-(Y), AM-6-(RA), AM-6-(S)-TMA, and AM-6-(S)—$NH_3$, respectively, using each 1 M solution of the corresponding salt, respectively. The ion exchanges were conducted at room temperature for about 150 minutes and repeated three times. The degrees of ion exchanges after three repetitions were about 80% to about 99%, about 70% to about 94%, about 6% to about 26%, and about 60% to about 77%, for AM-6-(Y), AM-6-(RA), AM-6-(S)-TMA, AM-6-(S)—$NH_3$, respectively. Thus, the degrees of ion exchanges increased in the order: AM-6-(Y)>AM-6-(RA)>AM-6-(S)—$NH_3$>>AM-6-(S)-TMA. This result shows that the $TMA^+$ ions in AM-6-(S)-TMA significantly hamper the ion exchanges of pristine metal cations with other cations, showing that the $TMA^+$ ions block the AM-6 channels and a removal of $TMA^+$ ions by treating them with hot $NH_3$ does not lead to a production of undamaged AM-6.

Figure 21A:
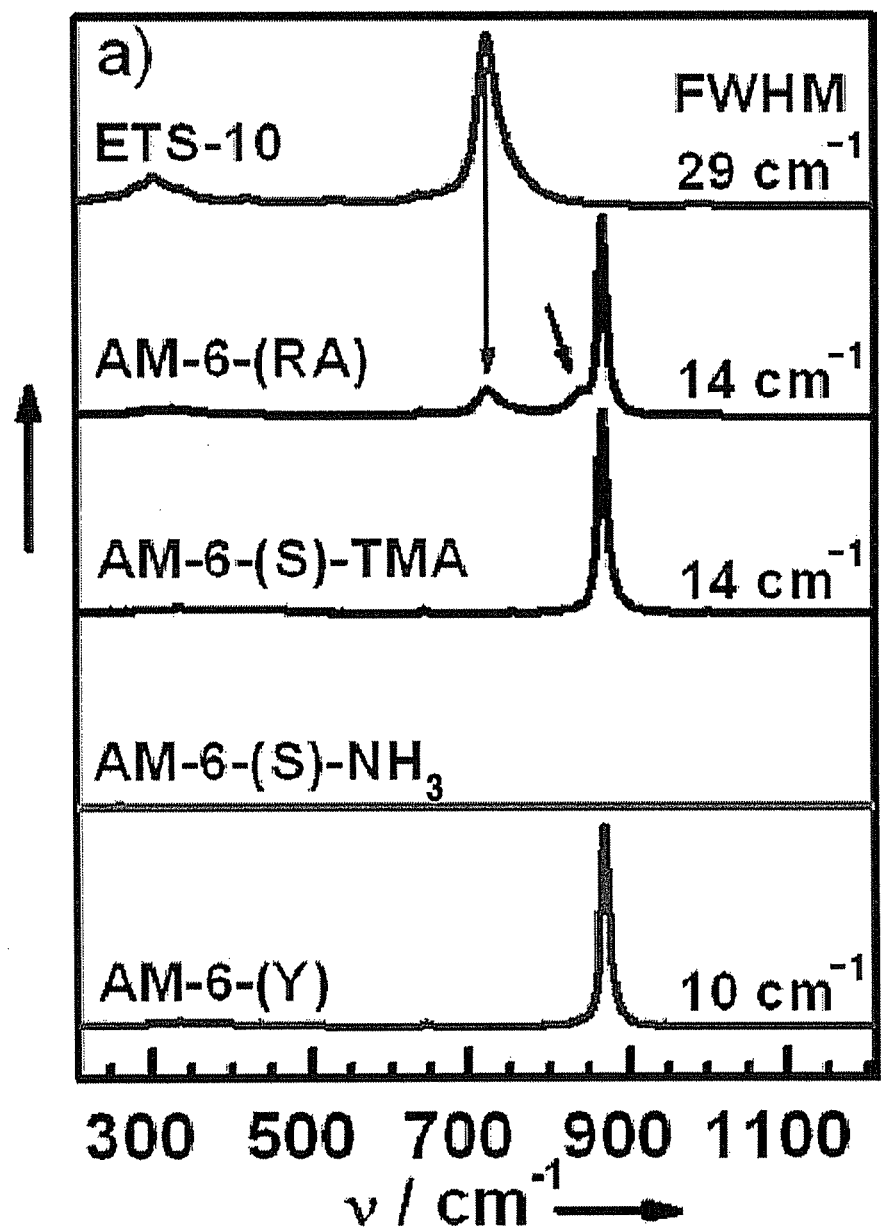
FIGS. 21A to 21C provide (A) Raman spectra, (B) graph showing intensities of V—O—V Raman stretching bands with increasing a temperature under vacuum (C) plots of a reciprocal magnetic susceptibility ($1/c_M$) with respect to a temperature with respect to ETS-10, AM-6-(RA), AM-6-(S)-TMA and AM-6-(S)—$NH_3$ prepared in accordance with a Comparative Example and AM-6-(Y) prepared by a preparing method in accordance with an example of the present disclosure.
Figure 21B:
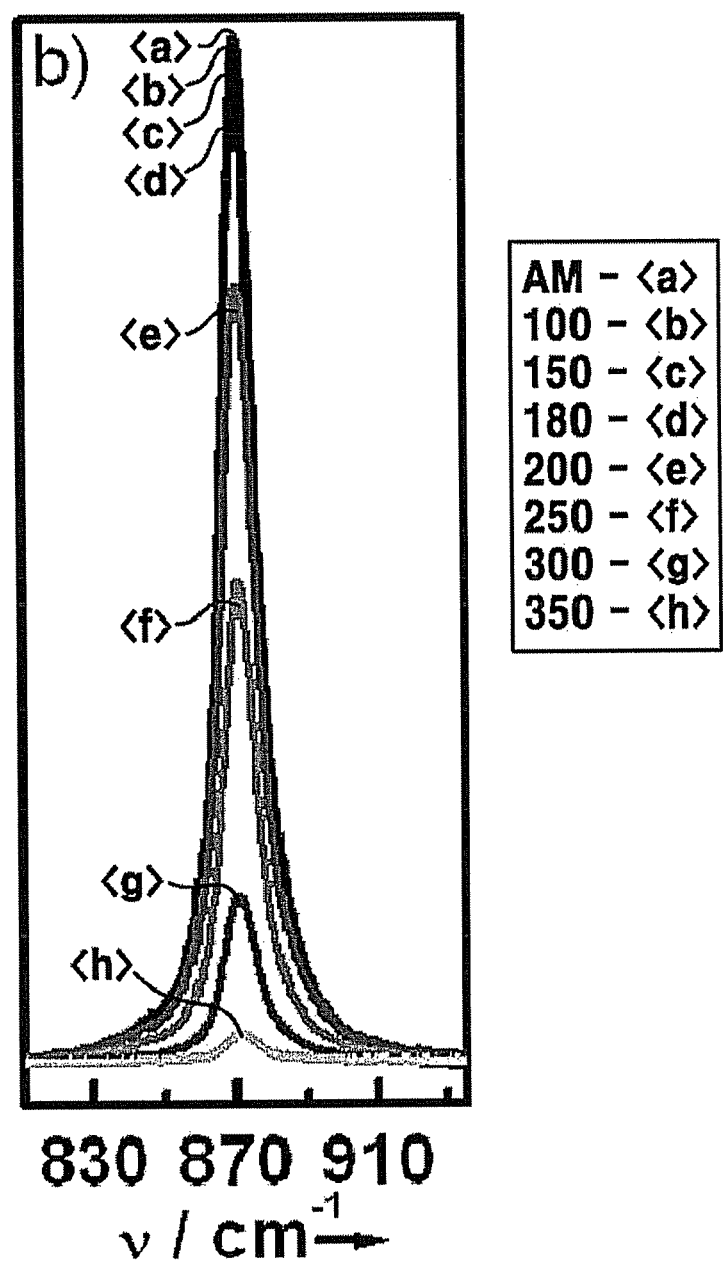

The Raman spectra of the pristine ETS-10, AM-6-(RA), AM-6-(S)-TMA, AM-6-(S)—$NH_3$, and AM-6-(Y) are compared in FIG. 21(a). AM-6-(Y) showed a longitudinal stretching vibration of V—O—V at about 871 $cm^{-1}$, which is slightly blue-shifted with respect to those of AM-6-(RA) and AM-6-(S)-TMA, which appear at about 869 $cm^{-1}$. The slight blue shift is attributed to a higher $K^+/Na^+$ ratio of AM-6-(Y) than those of AM-6-(RA) and AM-6-(S)-TMA (see Reference Document 14). The Raman spectrum of AM-6-(RA) always shows a Ti—O—Ti longitudinal stretching vibration at about 724 $cm^{-1}$ in addition to that of V—O—V. The Raman spectrum of AM-6-(S)-TMA showed an additional weak Raman band due to $TMA^+$ at about 756 $cm^{-1}$. Unlike other AM-6 samples, AM-6-(S)—$NH_3$ did not show a V—O—V stretching band, indicating that all V—O—V quantum wires were destroyed during a $TMA^+$ removal process (FIG. 21A). The present inventors found that $NH_3$ treatment even for about 45 minutes at about 300° C. (instead of about 3 hours at about 350° C.) is enough to destroy all V—O—V quantum wires. A thermal stability test under vacuum revealed that the V—O—V quantum wire starts decomposing at about 180° C. (FIG. 21B), indicating that a V—O—V quantum wire in AM-6 is thermally less stable than a Ti—O—Ti quantum wire in ETS-10, which starts decomposing at about 250° C. (see Reference Document 14).

Figure 21C:
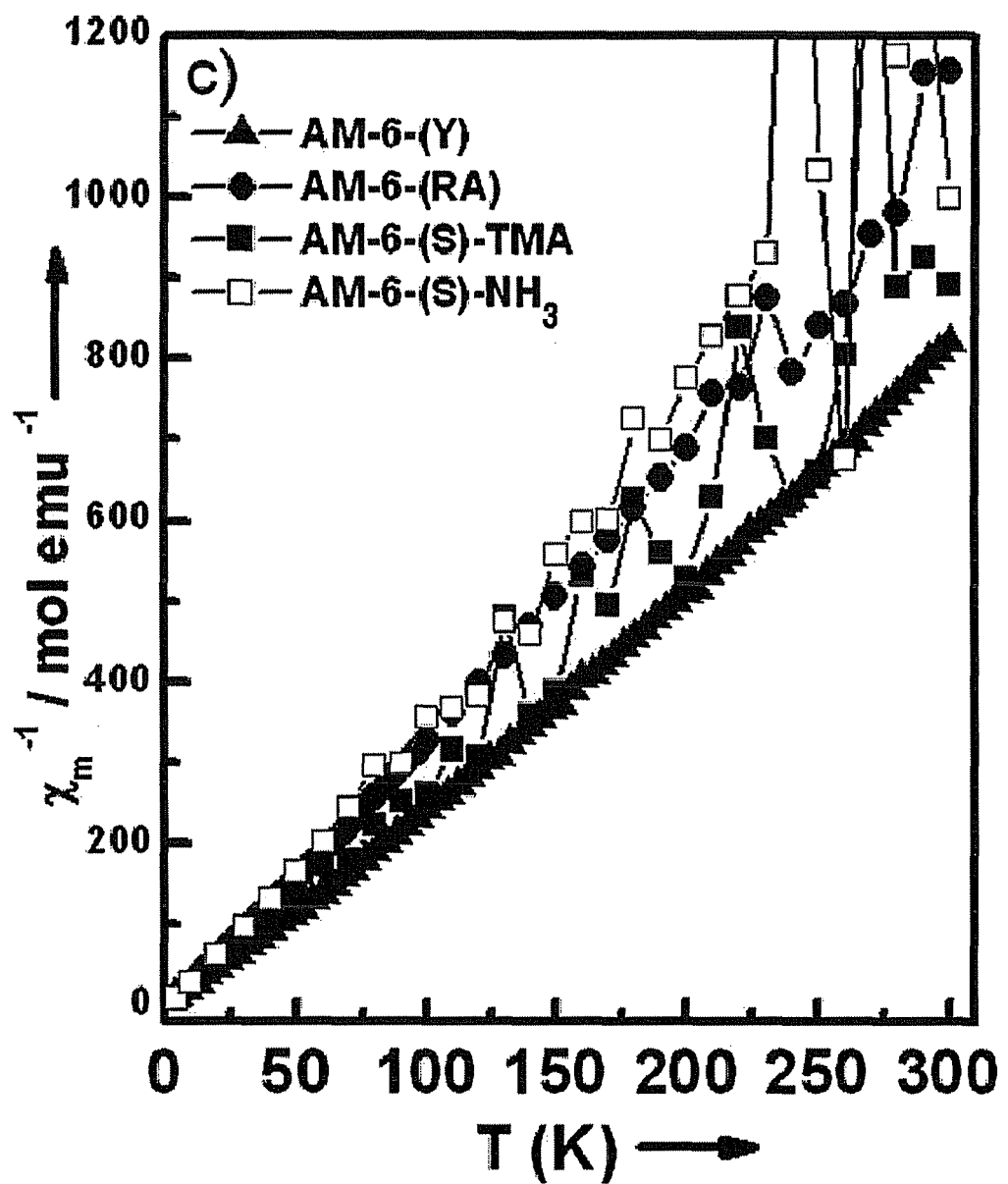

Based on a unit cell formula ($M^I_2VSi_5O_{13}.xH_2O$), an oxidation state of each V atom in an ideal AM-6 should be +4. This means that each vanadium atom should have one unpaired electron, and hence a theoretical atomic magnetic moment ($\mu$) should be about 1.73 BM (FIG. 21C). A measured $\mu$ of AM-6-(Y) was about 1.76 BM, while those of AM-6-(RA), AM-6-(S)-TMA, and AM-6-(S)—$NH_3$ were about 1.47 BM, about 1.52 BM, and about 1.30 BM, respectively. This result also indicates that while most of the vanadium atoms in AM-6-(Y) exist in the +4 oxidation state, substantial portions of vanadium ions in other AM-6 samples exist in the +5 oxidation state (see Reference Documents 18 to 20). ESR spectra of AM-6 samples, however, looked all alike, indicating that ESR is not a proper means to differentiate purity of the V—O—V chain. TGA data of the pristine AM-6 samples further revealed that a weight increase begins between about 470° C. and about 520° C. Since ETS-10 does not undergo weight increase, the above weight increase arises due to oxidation of $V^{4+}$ to $V^{5+}$.

Figure 22A:
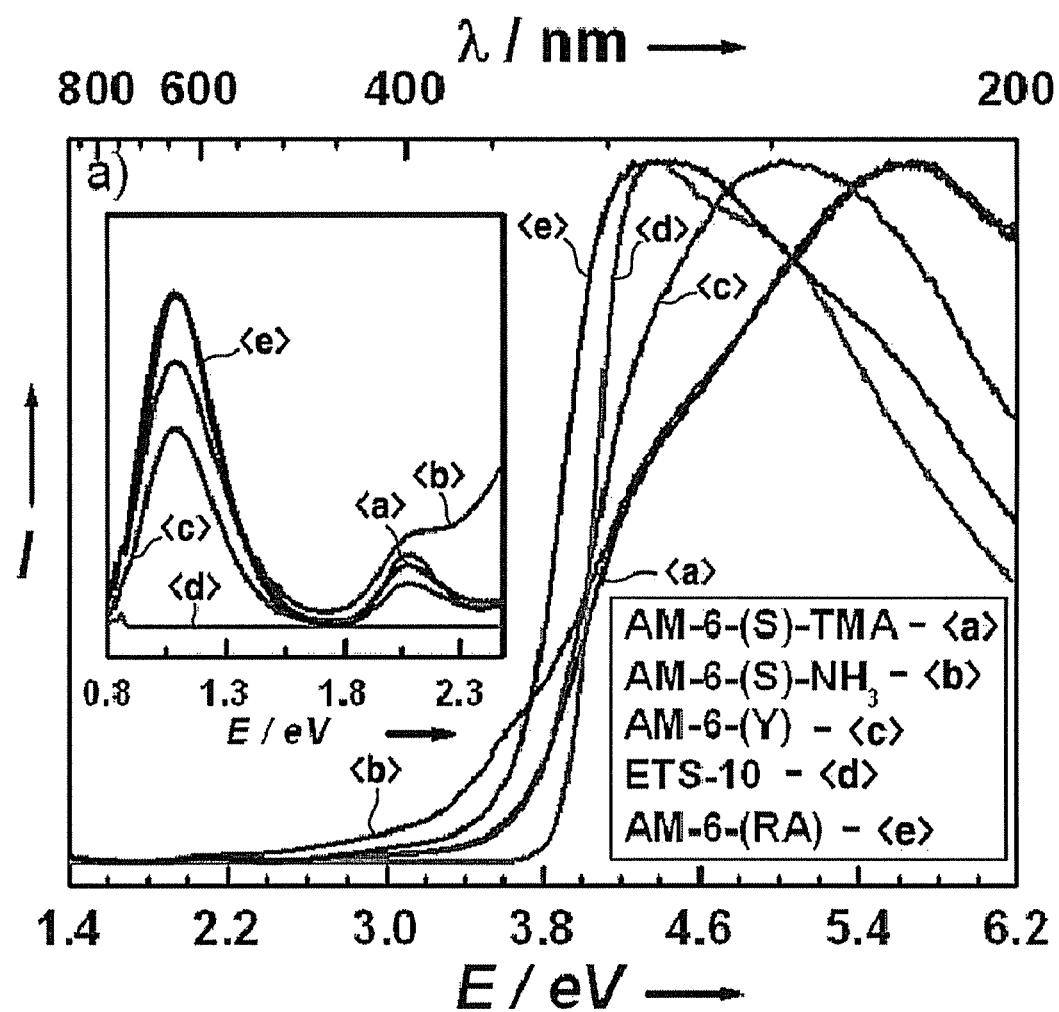
FIGS. 22A to 22D provides (A) diffuse-reflectance UV-visible spectra of pristine AM-6 samples in a 1.4-6.2 eV region, (B) diffuse-reflectance UV-visible spectra of AM-6-(Y) samples exchanged with various cations in a 3.0-5.5 eV region, (C) linear relationships between an absorption maximum ($\lambda_{max}$) and Sanderson's partial negative charge ($-\delta_o$) and between a band gap energy ($E_g$) and $-\delta_o$ and (D) diffuse-reflectance UV-visible spectra of AM-6-(Y) samples exchanged with various cations in a 0.8-3.1 eV region with respect to ETS-10, AM-6-(RA), AM-6-(S)-TMA and AM-6-(S)—$NH_3$ prepared in accordance with a Comparative Example and AM-6-(Y) prepared by a preparing method in accordance with an example of the present disclosure.

UV-vis spectra of four pristine AM-6 samples and ETS-10 are compared in FIG. 22A. Each spectrum is composed of a strong absorption band in a UV region and relatively weaker absorption bands in a visible region and an IR region. The absorption maximums ($\lambda_{max}$s) in the UV region are 218 nm, 219 nm, 247 nm, 280 nm, and 285 nm for AM-6-(S)-TMA, AM-6-(S)—NH$_3$, AM-6-(Y), AM-6-(RA), and ETS-10, respectively.

The details of spectral analyses are subject to a future study. Nevertheless, comparison of the UV-region spectra again shows that AM-6-(RA) contains ETS-10 seed (FIG. 22A). A large red shift of tail absorption on going from AM-6-(S)-TMA to AM-6-(S)—NH$_3$ indicates that the VO$_3^{2-}$ quantum wires are damaged during a removal of TMA$^+$ ions with hot NH$_3$.

Figure 22B:
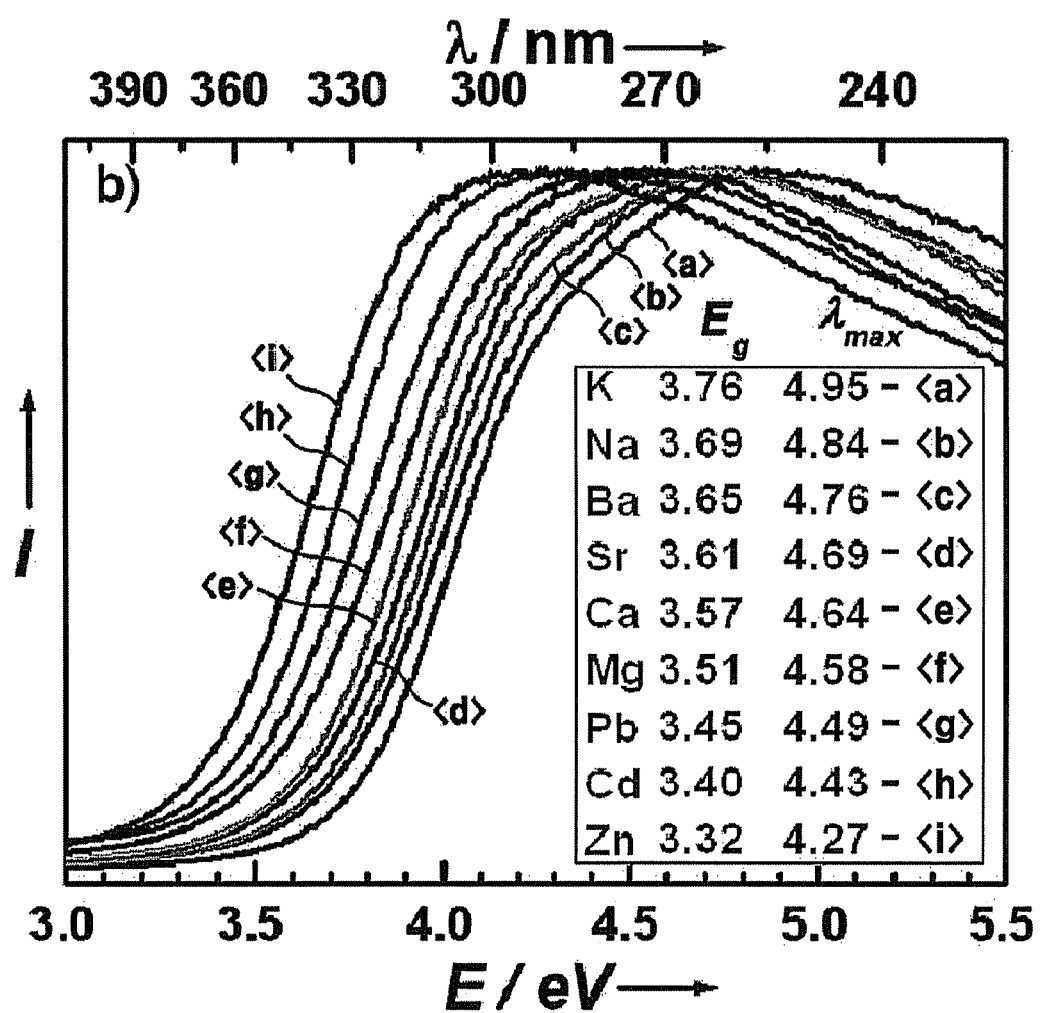

Electronic absorption spectra of a series of AM-6-(Y) exchanged with K$^+$, Na$^+$, Ba$^{2+}$, Sr$^{2+}$, Ca$^{2+}$, Mg$^{2+}$, Pb$^{2+}$, Cd$^{2+}$, and Zn$^{2+}$, respectively, in a dry state revealed an fact that the $\lambda_{max}$ of the UV-region absorption band and band gap energy (E$_g$, estimated from an inflection point of each absorption spectrum) progressively red shift upon increasing electronegativity of a counter cation (FIG. 22B) (see Reference Document 22).

Figure 23:
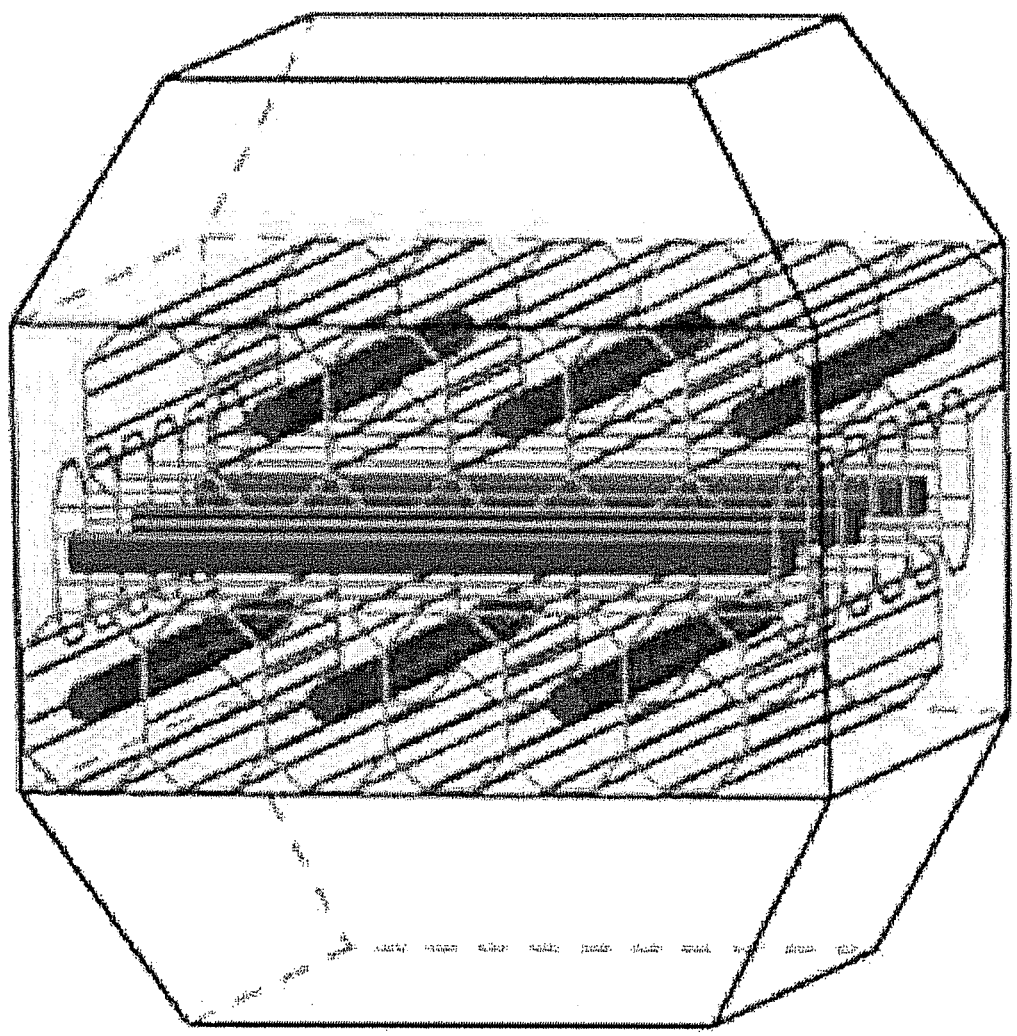
FIG. 23 is a schematic diagram showing a pure $V^{IV}O_3{}^2$ quantum wire of an AM-6-(Y) sample prepared in accordance with an example of the present disclosure.

The above results have demonstrated that AM-6-(Y) is indeed ideal in various respects: smooth surfaces, no ETS-10 seeds, no pore blocking TMA$^+$ ions, all V atoms in +4 oxidation state, and high quality V$^{IV}$O$_3^{2-}$ quantum wire. This provides a unique opportunity to study the nature of the electronic transitions of the V$^{IV}$O$_3^{2-}$ quantum wire (FIG. 23).

Figure 22C:
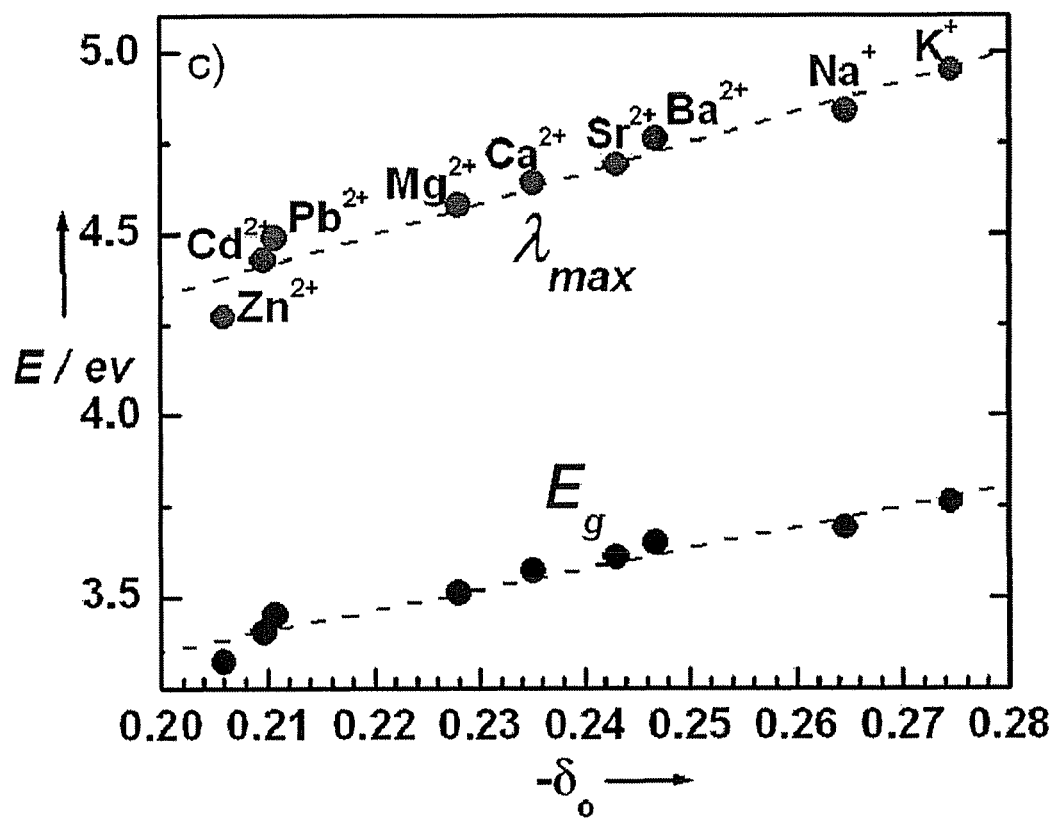

Furthermore, absorption energy of the $\lambda_{max}$ and E$_g$ showed linear relationships with respect to a Sanderson's partial charge of framework oxygen, $\delta$(O$_f$) (FIG. 22C). This result reveals a very interesting fact that the UV-region band arises due to a V$^{4+}$-to-O$^{2-}$ charge transfer (CT) or a ligand-to-metal charge transfer (hereinafter, referred to as "LMCT") as opposed to the previous assignment (LMCT) (see Reference Document 18) and to that of titanate quantum wire (see Reference Documents 14 to 16). The present inventors believe that this is a first example to demonstrate the MLCT interaction in oxide molecular sieves. AM-6-(RA) and AM-6-(S)—NH$_3$ also showed the same trend.

Figure 22D:
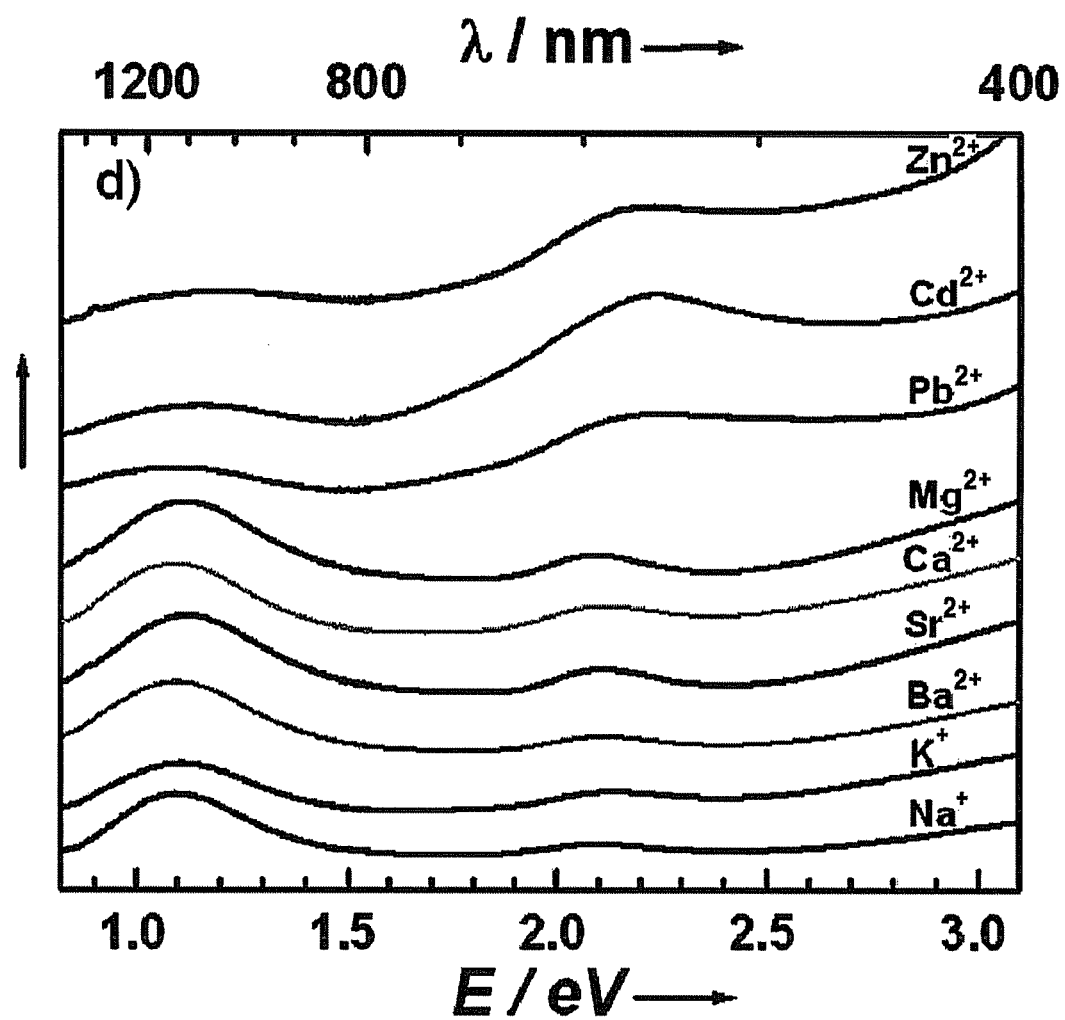

Unlike the UV-region band, the visible (2.1 eV) and near IR (1.1 eV) bands did not shift their positions with respect to various counter cations except when the cations are Pb$^{2+}$, Cd$^{2+}$, and Zn$^{2+}$ (FIG. 22D). This result indicates that they arise due to d-d transitions of V$^{4+}$ as opposed to the previous assignment (LMCT) (see Reference Document 18). Assuming that a —O—V$^{4+}$(O)$_4$—O— structure adopts a flattened (z-in) octahedral structure like ETS-10 (see Reference Documents 16, 23, and 24), the transitions at 1.1 and 2.1 eV are likely to arise from d$_{xy}$ to d$_{x2-y2}$ and from d$_{xy}$ to d$_{z2}$, respectively.

A synthesis of AM-6-(Y) from V$_2$O$_5$ is in fact quite interesting in the sense that an oxidation state of V in V$_2$O$_5$ is 5+ while oxidation states of all V atoms in AM-6-(Y) are 4+. Evidently, the added reducing agent such as acid and/or alcohol like ethanol acts as an agent to reduce V$^{5+}$ of V$_2$O$_5$ to V$^{4+}$ during the synthesis. Thus, in accordance with the present disclosure, with a cheap V$^{5+}$-containing compound such as V$_2$O$_5$ and a reducing agent, a pure vanadosilicate molecular sieve can be readily prepared. According to the method in accordance with the present disclosure, a novel vanadosilicate described in the above examples 1 to 7 as well as previously known vanadosilicates can be prepared.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention.

The scope of the present invention is defined by the following claims rather than by the detailed description of the embodiment. It shall be understood that all modifications and embodiments conceived from the meaning and scope of the claims and their equivalents are included in the scope of the present invention.

REFERENCE DOCUMENTS

[1] L. Venkataraman, C. M. Lieber, Phys. Rev. Lett. 1999, 83, 5334-5337.
[2] M. Ouyang, J.-L. Huang, C. M. Lieber, Acc. Chem. Res. 2002, 35, 1018-1025.
[3] J. H. Golden, F. J. DiSalvo, J. M. J. Frehet, J. Silcox, M. Thomas, J. Elman, Science 1996, 273, 782-784.
[4] J. H. Golden, H. Deng, F. J. DiSalvo, J. M. J. Frehet, P. M. Thompson, Science 1995, 268, 1463-1466.
[5] Y. Xia, P. Yang, Y. Sun, Y. Wu, B. Mayers, B. Gates, Y. Yin, F. Kim, H. Yan, Adv. Mater. 2003, 15, 353-389.
[6] S. Kan, T. Mokari, E. Rothenberg, U. Banin, Nature Mater. 2003, 2, 155-158.
[7] L.-S. Li, J. Hu, W. Yang, A. P. Alivisatos, Nano Lett. 2001, 1, 349-351.
[8] S. P. Ahrenkiel, O. I. Miedaner, C. J. Curtis, J. M. Nedeljkovic A. J. Nozic, Nano Lett. 2003, 3, 833-837.
[9] H. Yu, J. Li, R. A. Loomis, L.-W. Wang, W. E. Buhro, Nature Mater. 2003, 2, 517-520.
[10] N. C. Jeong, M. H. Lee, K. B. Yoon, Angew. Chem. Int. Ed. 2007, 46, 5868-5872.
[11] S. M. Kuznicki, US Patent 1989, No. 4853202.
[12] M. W. Anderson, O. Terasaki, T. Ohsuna, A. Philippou, S. P. MacKay, A. Ferreira, J. Rocha, S. Lidin, Nature 1994, 367, 347-351.
[13] M. W. Anderson, O. Terasaki, T. Ohsuna, P. J. O. Malley, A. Philippou, S. P. MacKay, A. Ferreira, J. Rocha, S. Lidin, Philos. Mag. B 1995, 71, 813-841.
[14] N. C. Jeong, Y. J. Lee, J.-H. Park, H. Lim, C.-H. Shin, H. Cheong, K. B. Yoon, J. Am. Chem. Soc., 2009, 131, 13080-13092.
[15] E. Borello, C. Lamberti, S. Bordiga, A. Zecchina, C. O. Arean, Appl. Phys. Lett. 1997, 71, 2319-2321.
[16] A. Damin, F. X. L. Xamena, C. Lamberti, B. Civalleri, C. M. Z.-Wilson, A. Zecchina, J. Phys. Chem. B, 2004, 108, 1328-1336.
[17] J. Rocha, P. Brandao, Z. Lin, M. W. Anderson, V. Alfredsson, O. Terasaki, Angew. Chem. Int. Ed. 1997, 36, 100-102.
[18] A. M. Shough, R. F. Lobo, D. J. Doren, Phys. Chem. Chem. Phys., 2007, 9, 5096-5104.
[19] M. J. Nash, S. Rykov, R. F. Lobo, D. J. Doren, I. Wachs, J. Phys, Chem. C 2007, 111, 7029-7037.
[20] A. M. Shough, D. J. Doren, M. Nash, R. F. Lobo, J. Phys, Chem. C 2007, 111, 1776-1782.
[21] M. N. Ismail, N. D. Fraiman, D. M. C. Jr, G. Gursoy, E. Viveiros, O. Ozkanat, J. Ji, R. J. Willey, J. Warzywoda, A. Sacco Jr., Micropor. Mesopor. Mater. 2009, 120, 454-459.
[22] Their Sanderson's electronegativities of the cations are K$^+$: 0.445, Na$^+$: 0.560, Ba$^{2+}$: 0.651, Sr$^{2+}$: 0.721, Ca$^{2+}$: 0.946, Mg$^{2+}$: 1.318, Pb$^{2+}$: 1.900, Cd$^{2+}$: 1.978, and Zn$^{2+}$: 2.223, respectively. Sanderson, R. T, J. Am. Chem. Soc., 1983, 105, 2259-2261.
[23] X. Wang, A. J. Jacobson Chem. Comm. 1999, 973-974.
[24] C. Prestipino, P. L. Solari, C. Lamberti, J. Phys. Chem. B 2005/109, 13132-13137.
[25] X. Wang, L. Liu, A. J. Jacobson, Angew. Chem. Int. Ed. 2003, 42, 2044-2047.
[26] X. Wang, L. Liu, A. J. Jacobson, J. Am. Chem. Soc., 2002, 124, 7812-7820.

[27] X. Wang, L. Liu, A. J. Jacobson, Angew. Chem. Int. Ed. 2001, 113, 2232-2234.
[28] P. Brandao, A. Philippou, N. Hanif, P. R. -Claro, A. Ferreira, M. W. Anderson, J. Rocha, Chem. Mater. 2002, 14, 1053-1057.
[29] C.-Y. Li, C.-Y. Hsieh, H.-M. Lin, H.-M. Kao, K. W. Lii, Inorg. Chem. 2002, 41, 4206-4210.

What is claimed is:

1. A method of preparing a vanadosilicate molecular sieve, comprising:
forming a vanadosilicate molecular sieve by a hydrothermal reaction of a reaction mixture containing a silicon source, a base, a $V^{5+}$-containing compound as a vanadium source, a reducing agent, a salt and water, wherein the $V^{5+}$-containing compound is reduced by the reducing agent,
wherein in the reaction mixture, a mole ratio of $SiO_2$ derived from the silicon source: $V_2O_5$ derived from the $V^{5+}$-containing compound: the reducing agent: the base: the salt: water ($H_2O$) is about 4 to about 10: about 0.1 to about 1: about 1 to about 50: about 1 to about 20: about 1 to about 20: about 30 to about 450.

2. The method of claim 1, wherein the reducing agent includes a combination of an organic reducing agent, and an inorganic reducing agent.

3. The method of claim 1, wherein the reducing agent includes an organic reducing agent and the organic reducing agent includes one or more organic reducing agents having a functional group selected from a group consisting of a carboxyl group, a hydroxyl group, an aldehyde group, an amine group, a sulfite group, a bisulfite group, a carbonate group, a bicarbonate group, a phosphorous acid group, a hypophosphorous acid group, a thiol group, a cyan group, a thiocyan group, a sulfide group, a bisulfide group, an ammonium group, a hydrazinyl group, a borohydride group, an amide group, a silane group, an amino group, a carbamoyl group, an urea group, and combinations thereof.

4. The method of claim 1, wherein the reducing agent includes an organic reducing agent and the organic reducing agent includes a compound represented by the following chemical formula 1 or 2:

R—COH          [Chemical formula 1]

R'—COOH         [Chemical formula 2]

wherein, in the chemical formulas 1 and 2, R and R' independently include hydrogen; or a linear or branched alkyl group having about 1 to about 20 carbon atoms, a linear or branched alkenyl group having about 1 to about 20 carbon atoms, a linear or branched alkynyl group having about 1 to about 20 carbon atoms, a cycloalkyl group having about 3 to about 20 carbon atoms, a cycloalkenyl group having about 3 to about 20 carbon atoms, a cycloalkynyl group having about 3 to about 20 carbon atoms, a linear or branched alkoxy group having about 1 to about 20 carbon atoms, an amine group, an aryl group or aralkyl group having about 6 to about 20 carbon atoms, a carboxyl group, a hydroxyl group, an aldehyde group, a sulfite group, a bisulfite group, a carbonate group, a bicarbonate group, a phosphorous acid group, a hypophosphorous acid group, a thiol group, a cyan group, a thiocyan group, an ammonium group, a hydrazinyl group, a borohydride group, an amide group, a silane group, a amino group, a carbamoyl group or an urea group containing one or more substituents selected from the following group A:
[Group A]
a substituent group consisting of a linear or branched alkyl group having about 1 to about 20 carbon atoms, a linear or branched alkenyl group having about 1 to about 20 carbon atoms, a cycloalkenyl group having about 3 to about 20 carbon atoms, a cycloalkynyl group having about 3 to about 20 carbon atoms, a linear or branched alkynyl group having about 1 to about 20 carbon atoms, a cycloalkyl group having about 3 to about 10 carbon atoms, a linear or branched alkoxy group having about 1 to about 20 carbon atoms, halogen, a carboxyl group, a hydroxyl group, an aldehyde group, an amine group, a sulfite group, a bisulfite group, a carbonate group, a bicarbonate group, a phosphorous acid group, a hypophosphorous acid group, a thiol group, a cyan group, a thiocyan group, an ammonium group, a hydrazinyl group, a borohydride group, an amide group, a silane group, an amino group, a carbamoyl group, and an urea group.

5. The method of claim 1, wherein the reducing agent includes an organic reducing agent and the organic reducing agent is includes a compound represented by the following chemical formula 3:

R"—OH           [Chemical formula 3]

wherein, in the chemical formula 3, R" includes a linear or branched alkyl group having about 1 to about 20 carbon atoms, a linear or branched alkenyl group having about 1 to about 20 carbon atoms, a linear or branched alkynyl group having about 1 to about 20 carbon atoms, a cycloalkyl group having about 3 to about 20 carbon atoms, a cycloalkenyl group having about 3 to about 20 carbon atoms, a cycloalkynyl group having about 3 to about 20 carbon atoms, a linear or branched alkoxy group having about 1 to about 20 carbon atoms, an amine group, an aryl group or aralkyl group having about 6 to about 20 carbon atoms, a carboxyl group, a hydroxyl group, an aldehyde group, a sulfite group, a bisulfite group, a carbonate group, a bicarbonate group, a phosphorous acid group, a hypophosphorous acid group, a thiol group, a cyan group, a thiocyan group, an ammonium group, a hydrazinyl group, a borohydride group, an amide group, a silane group, an amino group, a carbamoyl group or an urea group containing one or more substituents selected from the following group B:
[Group B]
a substituent group consisting of a linear or branched alkyl group having about 1 to about 20 carbon atoms, a linear or branched alkenyl group having about 1 to about 20 carbon atoms, a cycloalkenyl group having about 3 to about 20 carbon atoms, a cycloalkynyl group having about 3 to about 20 carbon atoms, a linear or branched alkynyl group having about 1 to about 20 carbon atoms, a cycloalkyl group having about 3 to about 10 carbon atoms, a linear or branched alkoxy group having about 1 to about 20 carbon atoms, halogen, a carboxyl group, a hydroxyl group, an aldehyde group, an amine group, a sulfite group, a bisulfite group, a carbonate group, a bicarbonate group, a phosphorous acid group, a hypophosphorous acid group, a thiol group, a cyan group, a thiocyan group, an ammonium group, a hydrazinyl group, a borohydride group, an amide group, a silane group, an amino group, a carbamoyl group and an urea group.

6. The method of claim 1, wherein the reducing agent includes an inorganic reducing agent and the inorganic reducing agent includes a compound selected from a group consisting of an inorganic acid, halide of metal, thiosulfate of metal, sulfite of metal, bisulfite of metal, ferrite, sulfate of metal, metal hydride, metal borohydride, an ammonium salt of metal, persulfate of metal, periodate of metal, a hypophosphorous acid, an ammonium hypophosphite, hypophosphite of metal, and combinations thereof.

7. The method of claim 1, wherein the reaction mixture further includes an acid.

8. The method of claim 1, further comprising:
aging the reaction mixture before the hydrothermal reaction.

9. The method of claim 1, wherein the forming the vanadosilicate molecular sieve includes:
preparing a first solution containing the silicon source, the base and water;
preparing a second solution containing the $V^{5+}$-containing compound as the vanadium source, the reducing agent and water;
preparing the reaction mixture by mixing the first and second solutions and the salt; and
forming the vanadosilicate molecular sieve by a hydrothermal reaction of the reaction mixture.

10. The method of claim 7, wherein in the reaction mixture, a mole ratio of $SiO_2$ derived from the silicon source: $V_2O_5$ derived from the $V^{5+}$-containing compound: the reducing agent: the acid: the base: the salt: water($H_2O$) is about 4 to about 10: about 0.1 to about 1: 1 to about 50: about 1 to about 20: about 1 to about 20: about 1 to about 20: about 30 to about 450.

11. The method of claim 1, wherein the formed vanadosilicate molecular sieve does not substantially contain a $V^{5+}$ion.

12. The method of claim 1, wherein the silicon source includes a silicate salt, a silicon oxide, or a silicon compound represented by the following chemical formula 4:

[Chemical formula 4]

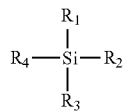

wherein, in the chemical formula 4, $R_1$ to $R_4$ independently represent hydrogen, a hydroxyl group, a carboxyl group, an element of a halogen family, an alkyl group or an alkoxy group having $C_1$ to $C_{22}$, an aralkyl group or an aryl group, and $R_1$ to $R_4$ respectively include one or more oxygen, nitrogen, sulfur or metal atoms.

13. A vanadosilicate molecular sieve prepared by the method in accordance with claim 1, the vanadosilicate molecular sieve having a structure in which a $SiO_4$ tetrahedron is connected with a $VO_6$ octahedron, and not substantially containing a $V^{5+}$ ion and containing a $V^{4+}$ ion.

14. The vanadosilicate molecular sieve, which is obtained by oxidizing a $V^{4+}$ion in the vanadosilicate molecular sieve in accordance with claim 13 to a $V^{5+}$ion.

15. The vanadosilicate molecular sieve of claim 14, wherein a $V^{4+}$ ion in the vanadosilicate molecular sieve is oxidized to a $V^{5+}$ ion by an oxidizing agent including an organic oxidizing agent, an inorganic oxidizing agent, or a combination thereof.

16. The method of claim 1, wherein the reducing agent includes a metal salt of ethylenediaminetetraacetic acid.

17. A vanadosilicate molecular sieve by the method in accordance with claim 1, having a composition represented by the following formula 1, a structure in which a tetrahedron is connected with a $VO_6$ octahedron and a powder X-ray diffraction pattern including one or more peaks at a diffraction angle (2Θ) in a range of from about 5° to about 10°:

$A_r[(VO)_s(Si_nO_{2n+2})] \cdot tH_2O;$ [Formula 1]

wherein, in the formula 1, A denotes an univalent or a bivalent metal cation selected from a group consisting of an alkali metal, an alkali earth metal and a combination thereof, and r is from about 0.5 to about 3, s is from about 0.5 to about 2, n is from about 1 to about 6, and t is from about 0.1 to about 2, and
wherein the vanadosilicate molecular sieve does not substantially contain a $V^{5+}$ion and contains a $V^{5+}$ion.

18. The vanadosilicate molecular sieve of claim 17, having the powder X-ray diffraction pattern including peaks at the diffraction angle (2θ) of 5.26°, 5.90°, 5.92°, 5.98°, 6.65°, 7.04°, 7.48°, 7.60° or 7.64°.

19. The vanadosilicate molecular sieve of claim 18, having a cubic-, truncated cubic- or brick-shaped crystal.

* * * * *